(12) United States Patent
Georgi

(10) Patent No.: US 10,157,400 B1
(45) Date of Patent: Dec. 18, 2018

(54) INTEROPERABLE REWARD CURRENCY SYSTEM, METHOD, AND APPARATUS

(71) Applicant: Randolph Georgi, Mill Valley, CA (US)

(72) Inventor: Randolph Georgi, Mill Valley, CA (US)

(*) Notice: Subject to any disclaimer, the term of this patent is extended or adjusted under 35 U.S.C. 154(b) by 671 days.

(21) Appl. No.: 14/633,012

(22) Filed: Feb. 26, 2015

(51) Int. Cl.
  *G06Q 30/00* (2012.01)
  *G06Q 30/02* (2012.01)

(52) U.S. Cl.
  CPC .................. *G06Q 30/0227* (2013.01)

(58) Field of Classification Search
  CPC .................................................. G06Q 30/0227
  USPC ........................................................... 705/14
  See application file for complete search history.

(56) References Cited

U.S. PATENT DOCUMENTS

| | | | |
|---|---|---|---|
| 5,987,606 A | 11/1999 | Cirasole et al. | |
| 6,151,604 A | 11/2000 | Wlaschin et al. | |
| 8,620,738 B2* | 12/2013 | Fordyce, III | G06Q 30/02 705/14.3 |
| 8,800,857 B1* | 8/2014 | Butler | G06Q 30/0212 235/375 |
| 8,880,905 B2 | 11/2014 | Colclasure et al. | |
| 2004/0117261 A1 | 6/2004 | Walker et al. | |
| 2008/0154726 A1* | 6/2008 | Bennett | G06Q 30/02 705/14.1 |
| 2009/0030793 A1* | 1/2009 | Fordyce, III | G06Q 20/12 705/14.27 |
| 2009/0063345 A1* | 3/2009 | Erikson | G06Q 20/10 705/44 |
| 2010/0023430 A1 | 1/2010 | Hunter et al. | |
| 2010/0145778 A1* | 6/2010 | Fordyce, III | G06Q 30/02 705/14.3 |
| 2010/0145786 A1* | 6/2010 | Fordyce, III | G06Q 30/02 705/14.27 |

(Continued)

OTHER PUBLICATIONS

Butler, Sheila S; Schwartz, Charles E, Jr., System and Method for Crediting Loyalty Points and Providing Loyalty Rewards by Use of an Electronic Tag, (Year: 2014).*

(Continued)

*Primary Examiner* — Matthew L Hamilton
(74) *Attorney, Agent, or Firm* — Heimlich Law, PC; Alan Heimlich, Esq.

(57) ABSTRACT

An interoperable reward currency apparatus, system, and method comprising a proprietary general interoperable reward currency comprising voucher-tag-objects; a network of reward systems that generate and use the interoperable reward currency; reward system members; a network processor; physical tags, tag-objects and apparatuses including modules configured for identification, qualification, generation, aggregation, detection, and redemption of elements including the interoperable reward currency in accordance with interoperability rules; a process to identify transactions instead of consumers for qualifying for and using the interoperable reward currency; reward providers configured to redeem the interoperable reward currency; consumers that receive and redeem the interoperable reward currency in exchange for a reward; a process to collect value to pay for the interoperable reward currency generated; and a process to disburse value to reward providers that redeem the interoperable reward currency.

38 Claims, 13 Drawing Sheets

Example Interoperable Reward Currency System

CURRENCY SYSTEM 100

(56) References Cited

U.S. PATENT DOCUMENTS

| | | | | |
|---|---|---|---|---|
| 2011/0055231 | A1* | 3/2011 | Huck | G06F 17/30545 |
| | | | | 707/751 |
| 2011/0087530 | A1* | 4/2011 | Fordyce, III | G06Q 10/00 |
| | | | | 705/14.17 |
| 2011/0225064 | A1* | 9/2011 | Fou | G06Q 20/12 |
| | | | | 705/26.41 |
| 2011/0307318 | A1* | 12/2011 | LaPorte | G06Q 20/209 |
| | | | | 705/14.33 |
| 2012/0066051 | A1* | 3/2012 | Black | G06O 30/0233 |
| | | | | 705/14.33 |
| 2012/0130536 | A1 | 5/2012 | Canter et al. | |
| 2012/0166264 | A1* | 6/2012 | Shum | G06Q 30/02 |
| | | | | 705/14.17 |
| 2013/0262198 | A1* | 10/2013 | Chung | G06Q 30/0226 |
| | | | | 705/14.1 |
| 2014/0222539 | A1* | 8/2014 | Scholz | G06Q 30/0226 |
| | | | | 705/14.27 |
| 2015/0161596 | A1* | 6/2015 | McCarthy | G06Q 20/02 |
| | | | | 705/67 |
| 2017/0031963 | A1* | 2/2017 | Merz | G06F 17/30312 |

OTHER PUBLICATIONS

Notice of Allowance and Fee(s) Due, dated Sep. 20, 2017, for U.S. Appl. No. 13/959,393. Includes Detailed Action.
*BASCOM Global Internet Services* v. *AT& T Mobility LLC*, 827 F.3d 1341 (Fed. Cir. 2016). 2015-1763. Decided: Jun. 27, 2016.
Memorandum to Patent Examining Corp, by Robert Bahr, Nov. 2, 2016 re: Recent Subject Matter Eligibility Decisions.
URL: http://searchoracle.techtarget.com/definItion/record Oracle Corporation definition of "record".
URL: https://en.wikipedia.org/wiki/Record_(computer_science) Wikipedia definition of database "record".
URL: https://en.wikipedia.org/wiki/Metadata Wikipedia definition of "metadata".
URL: https://en.wikipedia.org/wiki/Tag Wikipedia definition of "tag".
URL: https://en.wikipedia.org/wiki/Tag_(metadata) Wikipedia definition of "tag (metadata)".
URL: https://en.wikipedia.org/wiki/Cryptographic_hash_function Wikipedia definition of "Cryptographic hash function".
URL: http://www.aspencrypt.com/crypto101_hash.html Persits Software, Inc. New York, NY 10018. Chapter 3 One-way Flash Functions.
*Enfish, LLC* v. *Microsoft Corp*, U.S. Pat. No. 6,163,775, Case 2015-1244, Decided: May 12, 2016; pp. 5, 7, 9-20, 30.
U.S. Appl. No. 13/959,393, filed Feb. 6, 2014, Georgi, Randolph.
Paul E. Black (ed.), Dictionary of Algorithms and Data Structures. U.S. National Institute of Standards and Technology. Dec. 15, 2004.
National Information Standards Organization (NISO) (2001). Understanding Metadata (PDF). NISO Press. ISBN 1-880124-62-9. 18 PP.
USPTO Information Technology Standards and Guidelines Program, Electronic Records Management, Technical Standard and Guideline IT-212.03-15. Jul. 2002, 58 pages, p. 2-6.
URL: http://www.uspto.gov/web/patents/classification/uspc707/sched707.htm USPTO Description of Class 707, subclasses E17.095, E17.143.
URL: http://www.uspto.gov/web/patents/classification/uspc707/sched707.htm USPTO Description of Class 707, subclass 736.

\* cited by examiner

Example Databases
in Currency System 100

4200 →

REFERENCE QUALIFYING EVIDENCE 86 TAGS 47 DATABASE 921

|  | REFERENCE QUALIFYING EVIDENCE 86 TAG 47 |
|---|---|
| 430 | QE1 |
|  | QE2 |
|  | QE3 |
|  | QE4 |

REFERENCE INTEROPERABILITY TAGS 31 DATABASE 922

|  | REFERENCE INTEROPERABILITY TAG 31 | TIMESTAMP |
|---|---|---|
| 440 | i4 | 1/5/2015 0300 |
|  | i5 | 1/6/2015 0300 |
|  | i6 | 1/7/2015 0300 |
|  | i7 | 1/8/2015 0300 |

REFERENCE VOUCHER IDENTITY TAGS 15 DATABASE 923

|  | REFERENCE VOUCHER IDENTITY TAG 15 |
|---|---|
| 450 | vid1 |
|  | vid2 |
|  | vid3 |
|  | vid4 |

FIG. 4C

INTEROPERABLE REWARD CURRENCY SYSTEM, METHOD, AND APPARATUS

CROSS REFERENCE TO RELATED APPLICATIONS

This application is related to U.S. patent application Ser. No. 12/942,693, filed Nov. 10, 2010 titled, "Electronic Reward Generation" which claims priority to U.S. Provisional Patent Application No. 61/264,610, filed Nov. 25, 2009, titled "Electronic Reward Generation," both of which are fully incorporated herein. This application is also related to U.S. patent application Ser. No. 13/959,393, filed Aug. 5, 2013, titled "Universal Transaction Associating Identifier" which claims priority to U.S. Provisional Patent Application No. 61/680,131, filed Aug. 6, 2012, titled, "Systems and Methods for Electronic Reward Generation with Universal Transaction Identifier," both of which are fully incorporated herein. All such provisional and non-provisional patent applications are herein incorporated by reference in their entirety for all purposes.

FIELD OF THE INVENTION

The disclosure generally relates to the field of electronic incentives, and more specifically, to a reward currency system comprising disparate entities in a network.

BACKGROUND OF THE INVENTION

Unless otherwise indicated, the approaches described in this section are not prior art to the claims in this application and are not admitted to be prior art by inclusion in this section.

Conventional reward systems commonly use, issue, and redeem points, credits, miles, cash back, vouchers, or a comparable self-issued proprietary reward currency that can be exchanged for selected products or services offered within each reward system.

The primary purpose of a reward system is to evoke reward-qualifying behaviors, for example, spending at least a certain amount or using a particular payment card. Value for the reward issuer is generated in the qualifying behavior (spending), not in issuing the reward itself.

One deficiency of such reward systems is that a plurality of unaffiliated reward systems, apparatuses, and reward currencies are not connected or configured for interoperability. Therefore a common currency cannot be processed among disparate unaffiliated reward systems.

Another deficiency is that a person who qualifies in one reward system, for example in a shopping center, cannot redeem earned points in another reward system, such as an airline's. Points cannot be aggregated with points earned in a different reward system to enable a consumer to accumulate points to get a more desirable, valuable, motivating, single reward. Behavior-motivating power is diminished if points cannot be combined, which limits reward choice and yields less marketing effectiveness within each reward system.

Another deficiency is that redemption terms can render earned points within a single reward system of little value to a recipient when points must be earned through considerable spending and redeemed for only a narrow selection of unappealing goods. Such points are widely perceived as unredeemable or not a good deal for a consumer.

Another deficiency is that points in reward or loyalty systems can compel a recipient to return to an issuer for repeat business, intended to entice more spending. Since a consumer can only patronize the same business so often, consumers perceive this as a marketing ploy that has little to do with truly rewarding their spending in the first place.

Multi-provider reward systems often piggyback reward processing onto payment processing systems in the absence of a viable alternative networked electronic solution, not because payment processing itself is required for reward processing.

To address these issues, albeit ineffectively, various schemes exist for point recipients to convert, trade, barter, exchange, or transact points or a reward currency between different rewards or loyalty systems that each issue their own currency. Such exchange schemes can give recipients part of their value, but at a cost, and are cumbersome.

In view of the above, reward systems commonly offer rewards that do not motivate behaviors as effectively as they could, while costing issuers more than they need to. Consumers are less motivated to patronize reward issuers than they would be if better rewards were available using a shared interoperable currency.

BRIEF DESCRIPTION OF THE DRAWINGS

Disclosed embodiments have other advantages and features that will be more readily apparent from the detailed description, the appended claims, and the accompanying figures.

FIG. 4C illustrates, generally at 4200, three example databases in the system shown in FIG. 1.

FIG. 5B further comprises a flowchart, generally at 5200, illustrating an example process designed for requesting issuance of a voucher-tag-object in the system shown in FIG. 1.

SUMMARY OF THE INVENTION

Figure 1:
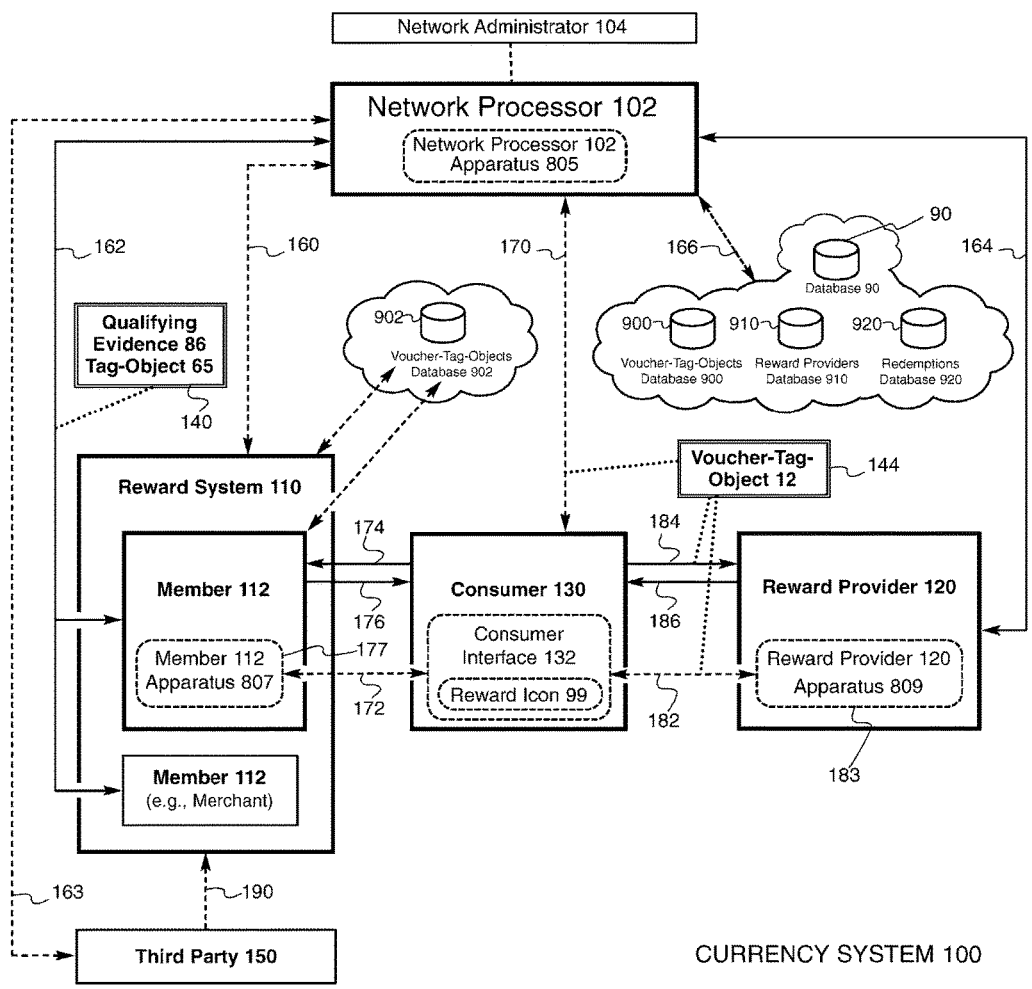
FIG. 1 illustrates, generally at currency system 100, one embodiment of an interoperable reward currency system.

The present invention discloses a general reward currency in an interoperable reward currency system comprising: 1) a proprietary general reward currency such as voucher-tag-objects; 2) a network of reward systems configured for generating and using the reward currency; 3) a set of members per reward system, such as merchants in a shopping center; 4) a network (system) processor; 5) physical tags and tag-objects, used for interoperability, identification, and other purposes; 6) apparatuses including specialized hardware and modules for generating and detecting tags and tag-objects, enrolling system participants, configuring apparatuses, and performing other functions; 7) interoperability rules applied to apparatuses, modules, tags, tag-objects, and processes; 8) a process to identify transactions instead of consumers; 9) a set of reward providers configured to exchange the reward currency for a reward; 10) consumers that receive and redeem the reward currency; 11) a process to collect value, e.g., to pay for voucher-tag-objects generated; and 12) a process to disburse value to reward providers that redeem them.

The general reward currency of the present invention is called herein a voucher-tag-object, which is a unit of exchange. A voucher-tag-object is a voucher, associated with a currency system-generated interoperability tag, that can be aggregated with voucher-tag-objects from the same or one or more unaffiliated reward systems to exchange for a reward.

The term reward system shall mean a reward, loyalty, or incentive system, a marketing system, or similar system, and is further described below.

The present invention discloses a general reward currency suitable for use in a proprietary network comprising a plurality of reward systems, each consisting of members.

The present invention provides for interoperability among its voucher-tag-objects, processes, apparatuses, modules, tags, and other elements. The present invention is further intended to be configured for interoperability and integration with third party systems, devices, networks, software, and technologies, for example, in payment and transaction processing systems (offline and online), point-of-sale (POS) systems, and among near field communications (NFC)-enabled mobile devices, Internet of Things (or Everything) ("IoT") devices, and the like.

The reward currency is intended for use and can be interchangeable in any reward, currency, loyalty, or other type of system for any purpose for which it may be suited.

The present invention provides elements for business (or merchant)-consumer, peer-to-peer, employer-employee, charity-donor, teacher-student, doctor-patient, arts organization-volunteer, and similar types of reward systems.

The present currency system provides an unprecedented marketing tool for reward systems and reward providers. For example, the currency system can attract increased spending, new business, and visitor traffic, or reduce fulfillment costs. Its purposes can include marketing, commercial, social, networking, cost-reduction, motivational, behavioral, and other objectives.

DETAILED DESCRIPTION

Embodiments of the present invention include a general reward currency in an interoperable reward currency system (hereinafter "currency system 100") that has particular application in a network, including reward systems and reward providers, that incentivizes human behaviors desirable to participating entities. A reward system can offer incentives to consumers to purchase goods and services or engage in non-monetary transactions in accordance with reward system rules, and generate the general reward currency to exchange for rewards.

Embodiments of the present invention provide for application of interoperability rules 71 among tag-objects 60, tags 35, and other elements and processes, as set forth below.

In various embodiments, the present reward currency and currency system yield several advantages. One advantage enables unaffiliated reward systems to participate in a secure electronic reward currency system and network, associated with a common reward currency and an apparatus, wherein the unaffiliated reward systems and their members can operate interoperably for enabling issuance, use, and redemption of a common reward currency. Another advantage enables a consumer to aggregate voucher-tag-objects from one or more unaffiliated reward systems so as to obtain a single more desirable or valuable reward than may be available in an individual reward system. A further advantage enables a reward system or member to offer rewards, and a wider selection of more motivating rewards, that it may not otherwise be able to offer, engendering a more effective marketing tool. Another advantage enables a consumer to receive voucher-tag-objects for a compelling reward without necessarily enrolling, providing personal identification, or meeting requirements imposed by a payment network (or processor) or other entity. Another advantage enables reward providers to employ a novel no-risk marketing system to attract voucher-tag-object redeemers as new visitors and spending customers. Another advantage provides for collecting fees to pay reward providers to offset costs of providing rewards, thereby endowing the reward currency with tangible, reimbursable value. Another advantage enables reward systems to (i) adjust reward qualification requirements (such as a spending threshold or completing a survey), (ii) influence timing of consumer spending, (iii) determine reward-eligibility for specific goods and services, (iv) control the volume of rewards issued in a time period, and (v) control reward system costs. Another advantage provides for an enrollment module to enroll existing and new reward systems, and their members, and to configure enrollees to participate interoperably. A further advantage facilitates useful customer sharing, to drive consumers to and among reward system members and to reward best customers for desired behaviors. A further advantage can enlarge the reward systems market wherein many businesses in diverse industries, needing effective marketing tools, presently lack the capacity to offer rewards that would be feasible and effective by using a common interoperable reward currency and an independent networked electronic reward processing system.

One embodiment provides an advantage that enables issuance of voucher-tag-objects without a requirement for a consumer's prior enrollment, use of a card, an account, a personal identification, or a payment method or device. An advantage enables reward currency handling to permit anonymity wherein a voucher-tag-object is not necessarily associated with or tracked to a consumer's behavioral history or personal identity. An advantage provides for identifying transactions instead of personally identifying consumers, enabling privacy and other advantages.

An advantage enables a merchant to participate in a reward system comprising unaffiliated members without constraints associated with payment network's requirements that differ among multiple merchants. Another advantage enables participants to operate in a reward system not dependent upon a payment network or subject to payment network-imposed rules, payment methods, fees, and self-directed marketing objectives and, further, without regard to any member's relations with its own payment processor. A further advantage enables a payment network to adopt a common reward currency, integrate payments with an interoperable reward currency network, and offer currency system 100 rewards, reward providers, and benefits.

In one embodiment, networks and groups such as shopping centers can associate disparate transactions among unaffiliated merchants, wherein transaction association determines reward qualification. Transaction association is a principle mechanism by which indicators of consumer behavior (e.g., spending) can be tracked and processed. An advantage provides independent transaction associating to qualify consumers in multi-provider reward systems.

An advantage provides currency and reward system organizing, enrollment, and configuration functions. In one embodiment of the present invention, payment and transaction processors are motivated to undertake certain functions such as organizing unaffiliated members, e.g., merchants in reward systems, and operating a competitive reward provider market and system that can control costs and drive redemption traffic to reward providers.

In one embodiment of the present invention, for purposes of qualifying for a reward, an advantage enables a merchant to itemize reward-eligible charges, resulting in a distinct reward-related data stream containing those charges to be transmitted to a reward processor independently of different data transmitted to a payment network (or processor) that can include a different total for a different purpose (for example, credit authorization), and further enabling product- and service-specific marketing in an electronic currency system.

In one embodiment, an advantage provides more attractive and motivating rewards from a greater variety of reward providers to a larger market of consumers, while improving marketing tools among the reward providers.

An example reward system in the present currency system attempts to modify shopping behavior through rules requiring a consumer (i) to purchase at least $120 worth of products and services within a one-week period within a group of enrolled merchants, or (ii) to purchase lines of products produced by two or more enrolled manufacturers. In another example embodiment, a currency system network is deployed by a shopping mall owner to operate a rewards-based promotion wherein the rules are configured to entice consumers to patronize multiple enrolled merchant tenants or to visit the mall preferentially during slow hours or days.

In one embodiment, the present currency system can be configured to motivate behaviors relating, for example, to shopping, employee productivity, conservation, education, weight loss, and the like. In one embodiment, each reward system can impose specific rules to be satisfied before a consumer is issued a reward currency. This specification refers mainly to shopping behavior, however the reward currency system 100 is not so limited and can apply to any human behavior subject to modification by employing a reward currency wherein voucher-tag-object qualification, generation, use, or redemption can be processed as disclosed herein.

NOMENCLATURE

To explain the nomenclature of reference numerals used in the Figures and described in the specification, each element to which a number is assigned is illustrated as a singular item, but one or more of that element can be present. For example, reward system 110 is one of a possible plurality of reward systems 110. As such, drawing elements 12, 65, 102, 104, 110, 112, 120, 130, 132, 150, 807, 809, 90, 900, 902, 910, and 920 in FIG. 1 are illustrated as a singular item, but indicate one or more elements can be present. Numbered lines with arrows represent the transfer of voucher-tag-objects 12, payments, tags 35, tag-objects 60, or data, including, but not limited to, financial and non-financial transaction 80 data, tags 35, and messages 91.

Overview of the Reward Currency System 100

FIG. 1 is a diagram depicting one example embodiment of an interoperable reward currency system 100 (a network) comprising, among other entities, at least one network processor 102, at least one network administrator 104 associated with a network processor 102, at least one reward system 110, at least one member 112 associated with a reward system 110, and at least one reward provider 120. In addition, interoperable reward currency system 100 can include at least one consumer 130, at least one consumer interface 132 that can be associated with a consumer device (not shown in FIG. 1) and can include a reward icon 99 (FIG. 1) and a printer (not shown in FIG. 1), at least one voucher-tag-object 12 (a unit of a general reward currency 11), an optional qualifying evidence 86 tag-object 65, and at least one third party 150 such as a sponsor. Further, interoperable reward currency system 100 can include at least one voucher-tag-objects database 900, at least one voucher-tag-objects database 902, at least one reward providers database 910, at least one redemptions database 920. While FIG. 1 depicts a generic database 90, additional databases not shown in FIG. 1, and generally described herein as a database 90, can be included. One or more of the databases herein can be associated with the network processor 102 as well as with a reward system 110, a member 112, a reward provider 120, or a third party 150 wherein similar databases associated with these entities may or may not be identical, each entity having its own data requirements. Participants 101, comprising the entities set forth above, can maintain different data sets, or versions of a database, as needed. For example, voucher-tag-objects database 900 is intended to depict a variation that can differ from voucher-tag-objects database 902. A network processor 102 apparatus 805 can be associated with a network processor 102. A member 112 apparatus 807 can be associated with a member 112. A reward provider 120 apparatus 809 can be associated with a reward provider 120. A currency outputting module 840 (not shown in FIG. 1) can be associated with a network processor 102, a reward system 110, a member 112, or a third party 150. A currency redemption module 850 (not shown in FIG. 1) can be associated with a reward provider 120. Other apparatuses (not shown in FIG. 1) and modules (not shown in FIG. 1) can be associated with one or more participants 101.

Currency system 100 elements are defined below by category.

Participating Entities in Currency System 100

A network processor 102 (FIG. 1) can comprise one or more of an apparatus 800, a server, a database 90, a data network, a website 888, and other elements for communicating, transmitting in a non-transitory medium, storing, analyzing and otherwise processing voucher-tag-objects 12, tag-objects 60, tags 35, transactions 80, qualifying evidence 86, data, enrollments, qualifications, rules 70, rewards 16, redemptions, messages 91, and the like, and for engaging in processes and methods in currency system 100. A network processor 102 can further comprise a network administrator 104, a rule 70 implementer 106 (not shown in FIG. 1), a reward system 110, a reward provider 120, a shopping center 114 (not shown in FIG. 1), a payment network (or processor) 118 (not shown in FIG. 1), a third party 150, and the like. Functions of a network processor 102 can be divided among several entities.

A network administrator 104 (FIG. 1) is an administrator of currency system 100.

A reward system 110 (FIG. 1) can comprise a group or network of one or more members 112 (FIG. 1), businesses (not shown in FIG. 1), enterprises (not shown in FIG. 1), or collaborations (not shown in FIG. 1), a reward network (not shown in FIG. 1), a system (not shown in FIG. 1), a promotion (not shown in FIG. 1), or an organization (not shown in FIG. 1) or entity (not shown in FIG. 1) that generates, authorizes, honors, exchanges, or uses voucher-tag-objects 12 or other elements associated with currency system 100. A reward system 110 can further comprise: 1) a multi-provider system, such as a shopping center 114, described below, 2) an individual company or organization, such as a merchant or chain, 3) a reward processor, such as a system having enrolled merchants, consumers, clients, or members, 4) an individual, such as a sole proprietor or practitioner, a parent, or a coach, 5) a payment network (or processor) 118, aggregator, or system, 6) businesses in a building, neighborhood, or area, 7) a loyalty, incentive, or marketing system; 8) a group comprising retail (merchants) or non-retail members, or 9) one or more of a plurality of disparate participants 101 associated with a reward or marketing system.

A reward system 110 can further comprise any system that generates, uses, honors, or redeems a proprietary currency of any type, or a currency processing apparatus, system, or method, that is incompatible or not interoperable with similar elements of an unaffiliated system, and wherein use of a voucher-tag-object 12 or an element of the present currency system 100 would render the system interoperable with the unaffiliated system.

Further, a reward system 110 can be affiliated or unaffiliated with any other reward system, can have any formal or informal organizational structure, can be organized for any incentive-related purpose, can be located anywhere, and can be permanent or temporary.

In various embodiments, a reward system 110 can further consist of a shopping center 114 (not shown in FIG. 1), or a network of shopping centers 116 owned, for example, by a real estate investment trust (REIT). A shopping center 114 includes any venue, center, zone, shopping mall of any type, and grouping of merchants engaging in consumer 130 transactions 80 or otherwise organized for marketing purposes. Further, a reward system 110 can comprise one or more businesses, professionals, merchants, services, providers, manufacturers, nonprofits, governments, persons, or entities; a website 888; a payments or financial services firm; an airline; a chain of stores or franchises; a trade association; a league; a consortium; a contractual group; a media, marketing, or advertising organization; a representative, agent, or distributor; a processor, aggregator, or other service firm; a collaborative or collective effort; and the like, or any combination thereof. A shopping center 114 further comprises a "shopping center" as set forth in U.S. patent application Ser. No. 12/942,693, which is hereby fully incorporated, or a system as set forth in U.S. patent application Ser. No. 13/959,393, which is hereby fully incorporated.

Further regarding a reward system 110, a payment network (or processor) 118 (not shown in FIG. 1), such as Visa®, MasterCard®, American Express® and others, can operate as and comprises a type of a reward system 110, for example, associated with its own payment or reward card or system. A payment network (or processor) 118 is regarded herein as a single reward system 110 having its own currency (e.g., points), and that does not use a common currency interoperable with unaffiliated reward systems 110 as disclosed herein. A payment network 118 reward system can comprise a network of (enrolled) cardholders that can use a payment card at payment network 118-enrolled merchants, wherein the payment network 118 is primarily directed toward consumers' use of a card rather than merchants' marketing interests. A payment network 118's currency can be proprietary to its own system, accessible by enrolled cardholders, but not interoperable with other reward systems. Any system, including a loyalty system, having a non-interoperable proprietary currency is similarly regarded herein as a single reward system 110. Such a system can serve as a reward system 110 in currency system 100.

A member 112 (FIG. 1) is a member, participant, or merchant in a reward system 110 that participates in currency system 100. For example, each of several merchants can be a member 112 of a reward system 110 associated with a shopping center 114. A member 112 can further include 1) a merchant, an organization, a professional, a person, a provider directly or indirectly of goods or services to consumers, a non-retailer entity, a business, or any entity offering incentives or issuing or authorizing voucher-tag-objects 12 or contributing thereto; 2) an owner or operator of a kiosk, a vending machine, a ticketing machine, an automated teller machine (ATM), and the like; 3) a manufacturer, a distributor, an agent, a broker, a producer, a marketer, and a service provider; 4) a nonprofit organization, an institution, an association, an organization, a sponsor, an employer, a sole proprietor, a professional, a website 888 host, an operator of a marketplace, and a government entity; 5) a payment network (or processor) 118, a payment association, and a payment gateway; and 6) an individual who wishes to reward behavior among friends, in a social network, or for any purpose. Examples of a member 112 can include a provider of goods or services, in a physical location or on a website 888, in one or more of a profession or an industry including financial services, retail, communications, transportation, automotive, health care, education, employment, energy, utility, advertising, media, market research, real estate, electronics, Internet services, website 888 operations, food, restaurant, grocery, pharmaceutical, social networking, charity, legal, travel, hospitality, gaming, and entertainment.

A reward system 110 can adopt the currency system 100 on behalf of all, or a group or subset, of its members 112, wherein the reward system 110 can comprise only enrolled members 112 and can exclude merchants that do not enroll. For example, spending at members 112 can qualify for a reward 16, while spending at unenrolled merchants may not qualify.

A consumer 130 (FIG. 1) is a person or persons who (i) engages in one or more transactions 80 or behaviors in currency system 100, (ii) qualifies or tries to qualify for a voucher-tag-object 12 or reward, or (iii) receives or redeems one or more voucher-tag-objects 12 or reward. A consumer 130 can include one or more of a customer, a client, a visitor, an individual, a family, a group, a company, and a voucher-tag-object 12 recipient or redeemer. Further, a consumer 130 may or may not qualify for a voucher-tag-object 12, yet can take steps leading toward earning a voucher-tag-object 12 such as spending without yet qualifying, or receiving messages 91 such as advertising during those steps.

Figure 6:
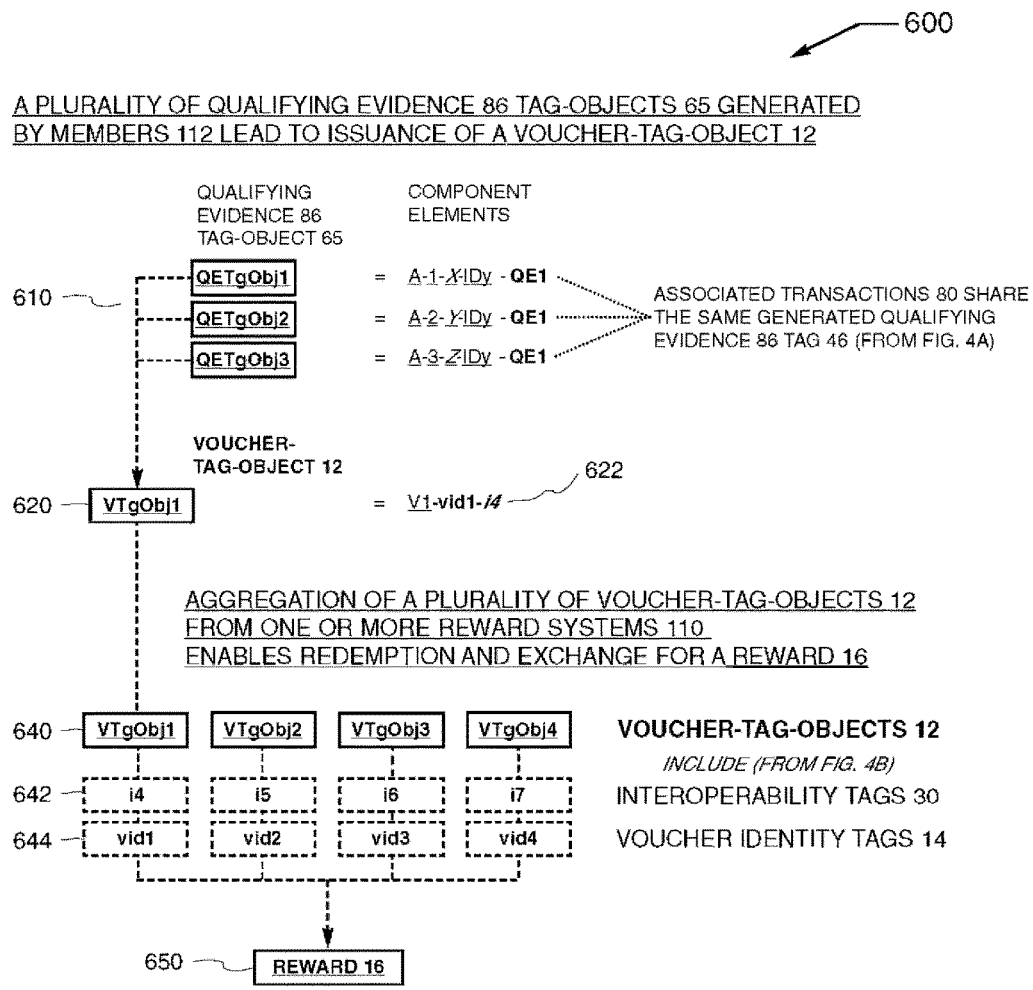
FIG. 6 illustrates, generally at 600, example elements of a simplified voucher-tag-object generation-redemption process in the system shown in FIG. 1.
Figure 7:
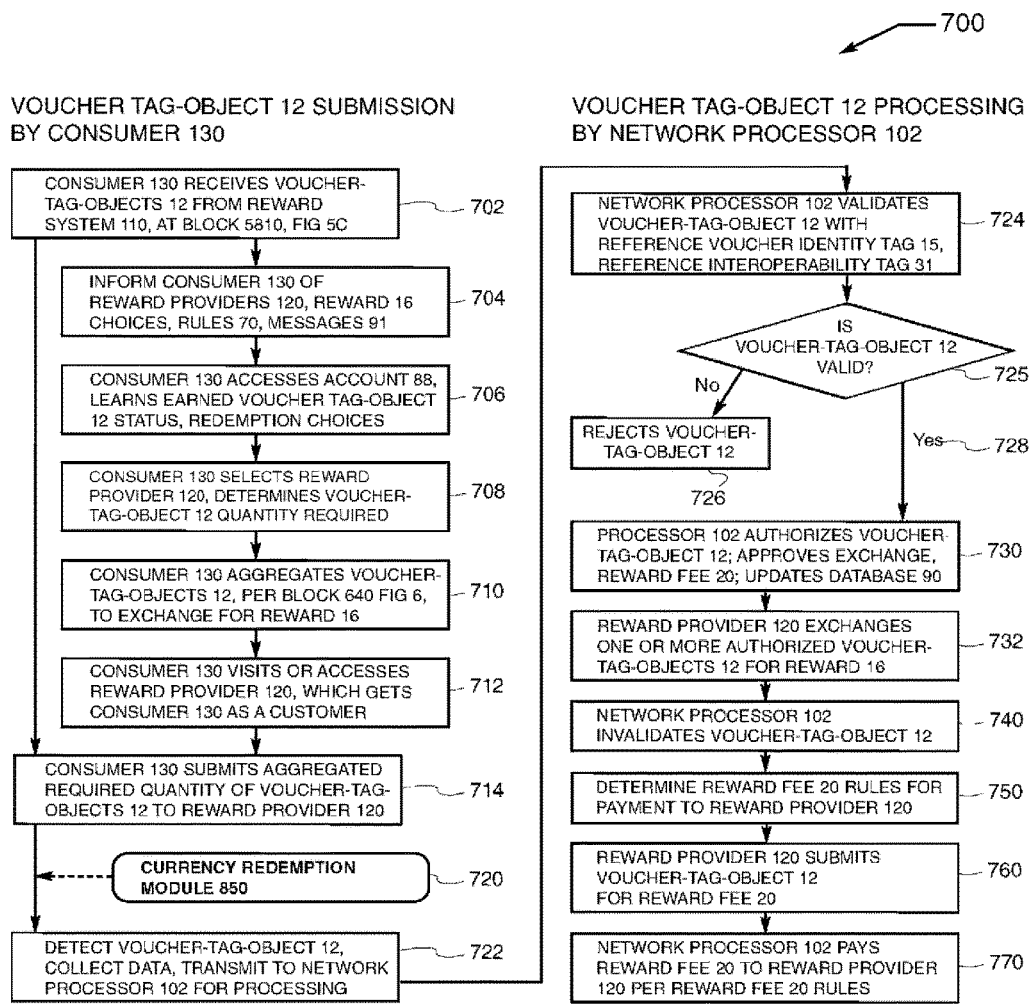
FIG. 7 is a flowchart illustrating, generally at 700, a detailed example process designed to redeem voucher-tag-objects in the system shown in FIG. 1.

A reward provider 120 (FIG. 1) is an entity that can exchange a reward 16 for voucher-tag-objects 12 (shown generally in FIGS. 6 and 7). A reward provider 120 can include a participant 101, a website 888 operator, and any other entity; can be located anywhere; and can be unaffiliated with a reward system 110. A reward provider 120 serves a different role than a member 112, however it can be a member 112, serving both roles in currency system 100.

A third party 150 (FIG. 1) can be a third party entity associated with currency system 100, for example, a data processing service, a sponsor, a manufacturer, an advertiser, a website 888 operator, a printer, an affiliate, or a co-promoter.

A rule 70 implementer 106 (not shown in FIG. 1) is a participant 101, entity, or apparatus 800 that implements one or more rules 70.

A participant 101, a categorical term, in currency system 100 comprises, but is not limited to, one or more of a network processor 102, a network administrator 104, a reward system 110, a shopping center 114, a payment network (or processor) 118, a member 112, a reward provider 120, a rule 70 implementer 106, a consumer 130, and a third party 150.

Computing Machine Architecture

Figure 2A:
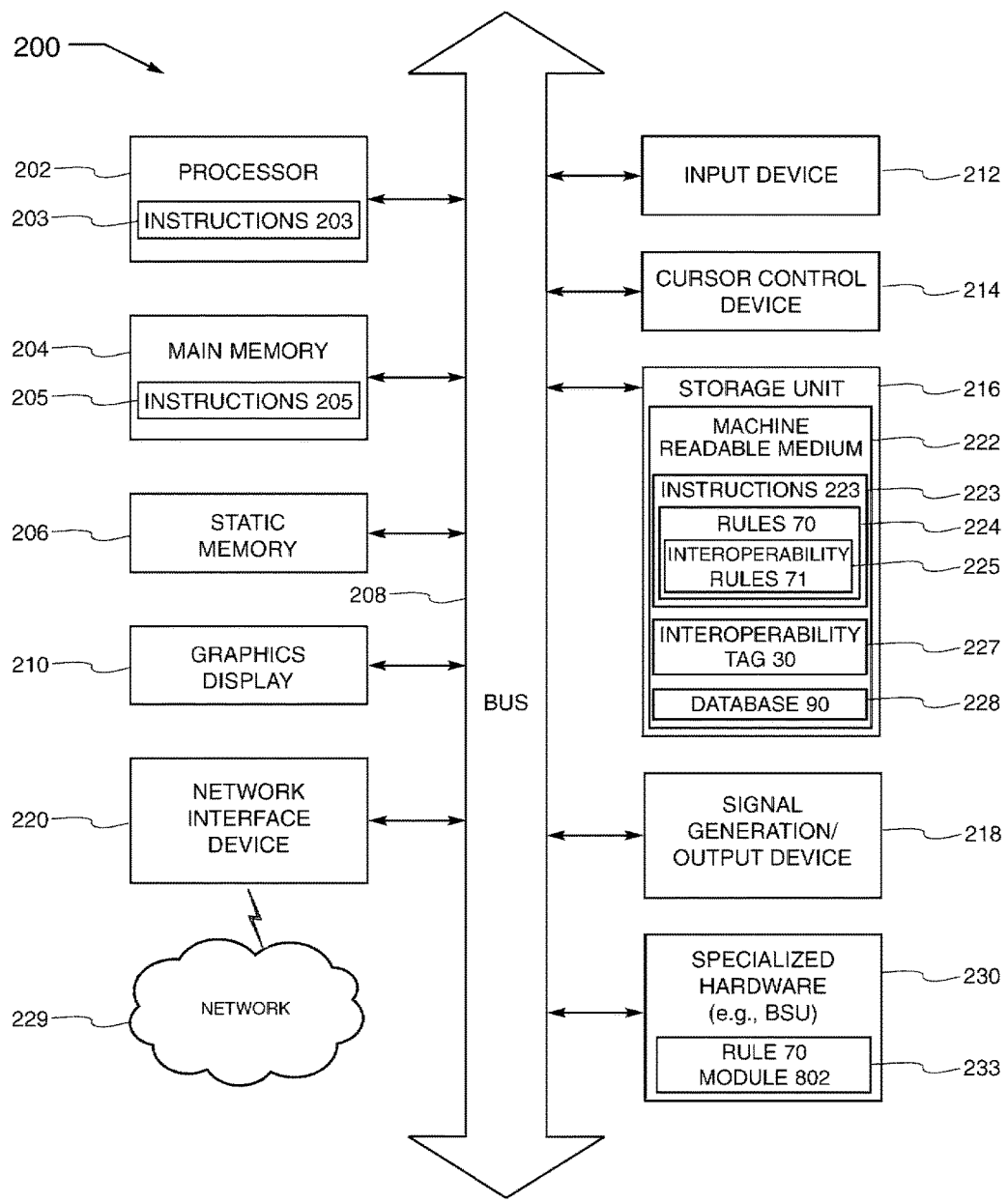
FIG. 2A illustrates, generally at 200, one embodiment of components of an example machine able to read instructions from a non-transitory machine-readable medium and execute them in a processor (or controller) utilizing specialized hardware.

FIG. 2A is a block diagram illustrating components of an example machine, including an apparatus 800 or an article of manufacture, able to read instructions from a machine-readable medium and execute them in a processor (or controller). This machine exemplifies apparatuses 800 in currency system 100 including a network processor 102 apparatus 805, a member 112 apparatus 807, a consumer 130 apparatus 808 (block 260, FIG. 2B), a reward provider 120 apparatus 809, a third party 150 apparatus, and other apparatuses, devices, and modules 801 described herein. This example machine provides a context for machine structure when configuring processes as described herein. Specifically, FIG. 2A shows a diagrammatic representation of a machine in the example form of a computer system 200 within which instructions 203, 205, and 223 (e.g., software) for causing the machine to perform any one or more of the methodologies discussed herein can be performed. Instructions 203, 205, and 223 shall include rules 70 and interoperability rules 71. In alternative embodiments, the machine operates as a standalone device or can be connected (e.g., networked) to other machines. In a networked deployment, the machine can operate in the capacity of a server machine or a client machine in a server-client network environment, or as a peer machine in a peer-to-peer (or distributed) network environment. Each apparatus 800 is configured to operate in accordance with interoperability rules 71 as provided below. The present invention requires specialized hardware 230, specifically either a barrel shifter unit ("BSU") or a random tag generator is required for the transformations, or generation of tags 35 and tag-objects 60, discussed herein.

The machine can be a server computer, a client computer, a personal computer (PC), a tablet PC, a set-top box (STB), a personal digital assistant (PDA), a point of sale (POS) computing system or device, a mobile device, a cellular telephone, a smartphone, a tablet, a wearable or implantable computing device, a web appliance, a network router, switch or bridge, an apparatus 800 as defined above, or any machine capable of executing instructions 203, 205, and 223 (sequential or otherwise) that specify actions to be taken by that machine. Further, while only a single machine is illustrated, the term "machine" shall also be taken to include any collection of machines that individually or jointly execute instructions 203, 205, and 223 to perform any one or more of the methodologies discussed herein.

The example computer system 200 includes a processor 202 (e. g., a central processing unit (CPU), a graphics processing unit (GPU), a digital signal processor (DSP), one or more application specific integrated circuits (ASICs), one or more radio-frequency integrated circuits (RFICs), or any combination of these), a main memory 204, and a static memory 206, which are configured to communicate with each other via a bus 208. The computer system 200 can further include graphics display unit 210 (e. g., a plasma display panel (PDP), a liquid crystal display (LCD), a projector, or a cathode ray tube (CRT)). The computer system 200 can also include an input device 212 (e.g., an alphanumeric keyboard, a scanner, a detector, a NFC transponder, an element of a currency redemption module 850), a cursor control device 214 (e.g., a mouse, a joystick, a motion sensor, or other pointing instrument), a storage unit 216, a signal generation/outputting device 218 (e.g., a speaker, an element in a currency outputting module 840), a network interface device 220 (including for outputting and communicating), and specialized hardware 230, which also are configured to communicate via the bus 208.

The storage unit 216 includes a machine-readable medium 222 on which is stored instructions 223 (e.g., software) at block 223, rules 70 at block 224, interoperability rules 71 at block 225, interoperability tags 30 at block 227, and databases 90 (at block 228), embodying any one or more of the methodologies or functions described herein. The instructions 223 (e.g., software) can also reside, completely or at least partially, within the main memory 204 at 205 or within the processor 202 at 203 (e.g., within a processor's cache memory) during execution thereof by the computer system 200, the main memory 204 and the processor 202 also constituting physical machine-readable media. The instructions 203, 205, and 223 can be transmitted or received over a network 229 via the network interface device 220.

While machine-readable medium 222 is shown in an example embodiment to be a single physical medium, the term "machine-readable medium" should be taken to include a single medium or multiple media (e.g., a centralized or distributed database 90, or associated caches and servers) able to store instructions (e.g., instructions 203, 205, and 223). The term "machine-readable medium" shall also be taken to include any medium that is capable of storing non-transitory instructions (e.g., instructions 203, 205, and 223) for execution by the machine and that cause the machine to perform any one or more of the methodologies disclosed herein. The term "machine-readable medium" includes, but is not limited to, data repositories in the form of solid-state memories, optical media, and magnetic media.

Overview and Definitions of Additional Elements

Sections below describe elements shown in FIG. 2B, generally at 240, which illustrates relationships among example elements in currency system 100. An element in a nested box comprises a type or subset of an element in a larger box that contains it. An element illustrated as a larger box includes all nested boxes (elements) that it contains. A dotted line box indicates an element, while a solid line box indicates a category or generic type of element.

Apparatuses 800

An apparatus 800 (block 260, FIG. 2B) can include a server computer, a client computer, a personal computer (PC); a smartphone, a mobile device; a tablet PC; a wearable or implantable device, including a watch; an appliance; a robot; a kiosk; an automated teller machine (ATM); a ticketing, vending, or gaming machine; a set-top box (STB), a personal digital assistant (PDA), a communications device; a point-of-sale (POS) terminal; a swipe card reader; a scanner, a detector or sensor; a transponder, a beacon; a dongle; a Bluetooth-, RFID-, a near field communications (NFC)-enabled device, an Internet of Things (IoT) or global positioning system (GPS)-equipped device; a vehicle; a web appliance, a network router, switch or bridge; any device communicatively coupled to a participant 101 apparatus 800 or a corresponding website 888, including said website 888; a consumer interface 132; a reward icon 99; an issuance apparatus as set forth in U.S. patent application Ser. No. 12/942,693, which is hereby fully incorporated; or any machine capable of executing instructions (sequential or otherwise) that specify actions to be taken by that machine. An apparatus 800 can comprise or be associated with specialized hardware 230 and a module 801.

A member 112 apparatus 807 (block 260, FIG. 2B) can be an apparatus 800 of any type configured for member 112, business, or online operations; transactions 80; payment handling including billing; communicating, processing, and storing data; networking; and the like. Said functions can include detecting, writing, transmitting via a non-transitory medium, receiving, issuing, and outputting of a tag 35, a voucher-tag-object 12, an interoperability tag 30, payments, messages 91, transaction data 87, and the like. In one embodiment, a consumer 130 apparatus 808 can perform functions of a member 112 apparatus 807.

A consumer 130 apparatus 808 (block 260, FIG. 2B) can be a consumer 130-associated apparatus 800 configured for currency system 100 functions including to (i) engage in transactions 80 and reward-eligible transactions 92 (not shown in Figures), (ii) transmit and receive information, (iii) receive or redeem a voucher-tag-object 12, and the like.

A consumer interface 132 (at arrows 172, 182, FIG. 1) is a screen or display for communication of voucher-tag-objects 12, messages 91, account 88 information, transaction data 87, and the like, that can be associated with, for example, a member 112 apparatus 807 display screen, a consumer 130 apparatus 808 such as a mobile device, a reward provider 120 currency redemption module 850, or a network processor 102 apparatus 805 such as a kiosk. A reward icon 99 (FIG. 1), described below, can be an element of the consumer interface 132. A printer can serve as part of consumer interface 132 wherein a message 91 or indicator including a voucher-tag-object 12, a receipt 77, a bar code, and the like can be printed. Various functions associated with a consumer 130 can be implemented by using a consumer interface 132.

Specialized hardware 230 (block 260, FIG. 2B) is required for several transformations discussed herein. A barrel shifter unit 231 (block 260, FIG. 2B) can be used for generating a voucher identity tag 14 (block 5610, FIG. 5C). The BSU can be between 4-16 bits wide. In one embodiment multiple BSUs can be required or a BSU with a wider width of, for example, 64 bits or more. A random tag generator 232 (block 260, FIG. 2B) that generates a ten-digit pseudorandom tag comprising numbers and characters can be used for generating an interoperability tag 30 (block 5006, FIG. 5A). One or more random tag generators 232 can be required or a different number of digits required in a string, for example, sixteen or more. A rule 70 module 802 at block 233 is described below. Specialized hardware 230 and modules 801 do not comprise a generic computer.

Figure 5A:
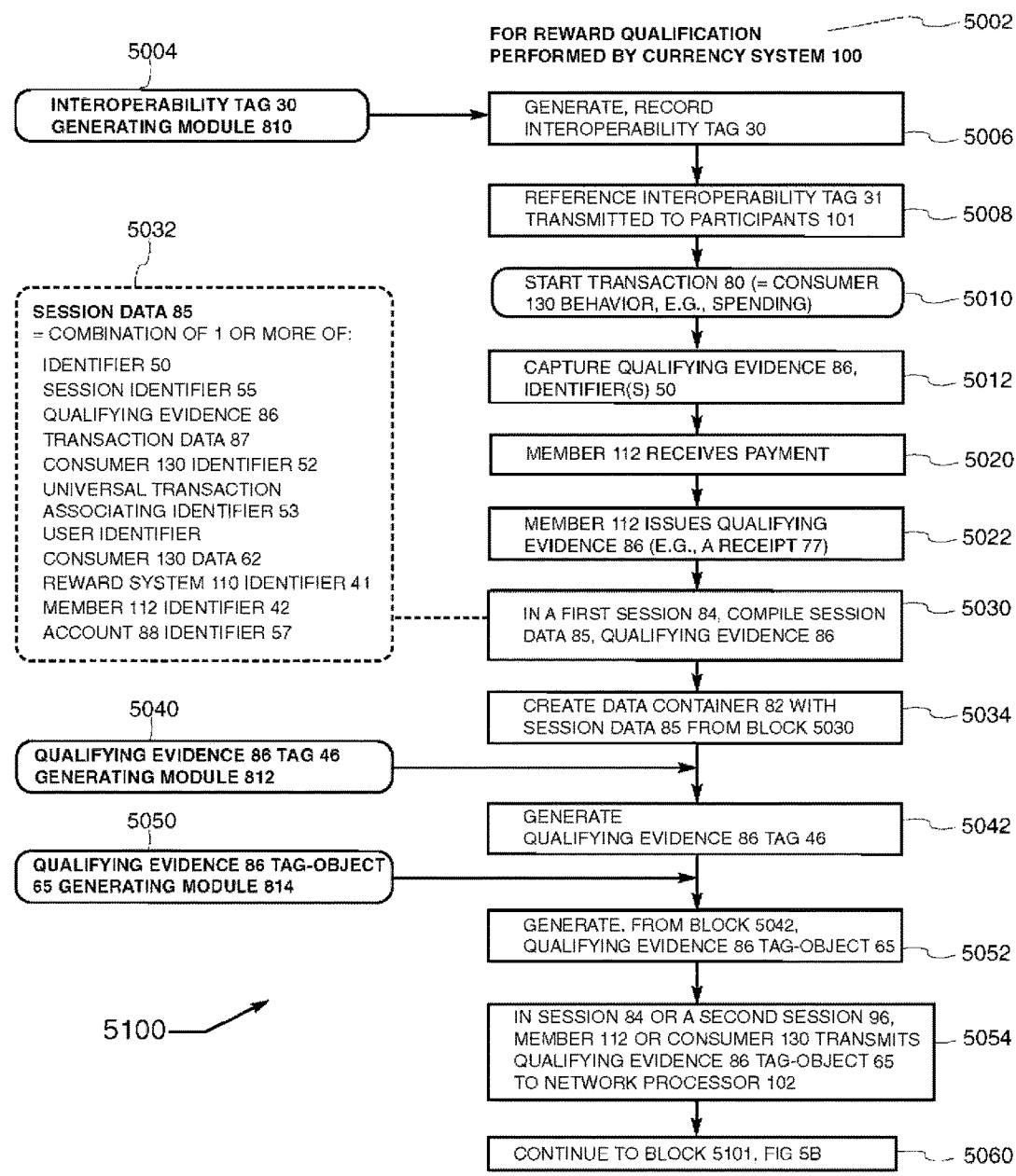
FIG. 5A is a flowchart illustrating, generally at 5100, an example process, in a first part, designed for qualification for a voucher-tag-object in the system shown in FIG. 1.

A module 801 (block 260, FIG. 2B), a categorical term, associated with an apparatus 800 and a computer system 200 in FIG. 2A, is configured to perform specific operations set forth below. Different modules 801 including specialized hardware 230 can be associated with different participants 101 for different purposes. Modules 801 can include dedicated devices or components for generating, capturing, collecting, replicating, and detecting tag-objects 60, tags 35, and objects 61. Exemplary modules 801 are illustrated in FIG. 5A at process blocks 5004, 5040, 5050; in FIG. 5B at 5110; in FIG. 5C at 5600, 5800, and in FIG. 7 at 720, described below. One or more modules 801 can be included in or associated with an apparatus 800.

An enrollment module 803 (block 260, FIG. 2B, and block 308, FIG. 3B), a type of module 801, provides for creating or maintaining a record of each participant 101 and enables associating currency system 100 elements with a participant 101 and its database 90 record. An enrollment module 803 comprises one or more apparatuses 800 and databases 90 for data entry and applying tags 35. Enrollment data can include contacts, enrollee information; terms and conditions of participation, and the like. In an example of an enrollment module 803, a shopping center 114, a neighborhood commercial district, a tailor, a homeowner, a teacher, a team coach, a league, and a government can each form and enroll in currency system 100 a new reward system 110, and can each enroll members 112 associated with their respective reward systems 110.

A configuration module 804 (block 260, FIG. 2B; block 309, FIG. 3B), a type of module 801, provides for each enrollee to be equipped with an apparatus 800 and modules 801 configured interoperably to perform functions of currency system 100. A configuration module 804 can install hardware or instructions for an apparatus 800 as needed for an enrollee's role, for example, to generate or redeem a voucher-tag-object 12. Configuring apparatuses 800 and modules 801 can entail installing and configuring hardware, detectors, software, and other elements, in existing or in new equipment for each participant 101. For example, hardware and software can be installed that is configured to associate an interoperability tag 30 with data or an element, transmit transaction 80 and voucher-tag-object 12 data to a network processor 102, associate transactions 80, generate tags 35 and voucher-tag-objects 12, and the like. Configured software can comprise a standalone program, can be downloaded or transmitted from a website 888 or the "cloud," or can be integrated with a member 112's POS or other software.

A currency outputting module 840 (block 260, FIG. 2B, and block 5800, FIG. 5C), a type of module 801, is configured to output an interoperable physical voucher-tag-object 12 or other reward currency 11 associated with a voucher identity tag 14 and an interoperability tag 30.

A currency redemption module 850 (block 260, FIG. 2B, and block 720, FIG. 7), a type of module 801, is configured to detect a voucher-tag-object 12, a voucher identity tag 14 and an interoperability tag 30, and redeem (exchange) a voucher-tag-object 12 for a reward 16.

Currency system 100 can provide for additional modules 801 including but not limited to: 1) an interoperability tag 30 generating module 810 (block 413, FIG. 4B, and block 5004, FIG. 5A); 2) a qualifying evidence 86 tag 46 generating module 812 (block 406, FIG. 4A, and block 5040, FIG. 5A); 3) a qualifying evidence 86 tag-object 65 generating module 814 (block 408, FIG. 4A, and block 5050, FIG. 5A); 4) a qualifying evidence 86 tag-object 65 detecting module 822 (block 5110, FIG. 5B); 5) a reward eligibility detecting module 826 (not shown in Figures); 6) a voucher identity tag 14 generating module 830 (block 411, FIG. 4B, and block 5600, FIG. 5C); 7) a transaction 80 module (not shown in Figures) for capturing qualifying evidence 86 or transaction data 87, for example at a member 112's POS terminal; 8) a qualification requirement 89-setting module (not shown in Figures); 9) a transaction associating module (not shown in Figures); and other modules 801 as required.

A session 84 (block 261, FIG. 2B) is an interaction at any time with an apparatus 800, a module 801, a consumer interface 132, a voucher-tag-object 12, a website 888, software, or other element of currency system 100 by a consumer 130, a participant 101, or a user of currency system 100 or any of its elements. A session 84 can generate data, identifiers 50, tags 35, and tag-objects 60. In various embodiments, a session 84 can occur, for example, at a member 112's POS terminal upon a transaction 80 or later at a kiosk, a website 888, or a consumer 130 device.

Transaction 80-Related Elements

A transaction 80 (block 250, FIG. 2B) is a behavior or act associated with two or more entities, including a purchase or exchange of money or value for a good, a service, an experience, and the like. A transaction 80 can include a behavior or act, including a non-monetary act, interaction, or exchange, undertaken by a consumer 130 to satisfy rules 70 in a rewards program 108, for example, completion of a survey, visiting a shopping center 114, using a device, clicking a website 888 icon, engaging in a session 84 for any purpose, or trying a product.

A reward-eligible transaction 92 (block 250, FIG. 2B) is a type of transaction 80 wherein some items can be designated as eligible for reward qualification and others ineligible.

A transaction-in-common 81 (block 250, FIG. 2B) refers to one of a plurality of disparate transactions 80 in a reward system 110, or an associated rewards program 108, wherein the transactions 80 can be associated for qualification purposes to earn a voucher-tag-object 12.

Data-Related Elements

Session data 85 (block 251, FIG. 2B; block 404, FIG. 4A; and block 5032, FIG. 5A), as disclosed in U.S. patent application Ser. No. 12/942,693 (herein '693) and in U.S. patent application Ser. No. 13/959,393 which are hereby fully incorporated, comprises a combination of one or more elements that can include data, identifiers, and tags, the combination enabling unique identification of a session 84 or a transaction 80 and further enabling association with a consumer 130 without necessarily requiring an enrolled account, a proprietary identifier (e.g., associated with a payment network), or personally identifying a consumer 130. Session data 85 comprises but is not limited to one or more of qualifying evidence 86 (block 403, FIG. 4A), session-associated information, transaction data 87, consumer 130 data, a tag 35, and an identifier 50 (block 252, FIG. 2B, which is further described below).

Qualifying evidence 86 (block 251, FIG. 2B, and block 403, FIG. 4A) can comprise any indication of a consumer 130 behavior or a transaction 80 that can provide evidence that a consumer 130 can qualify for a reward 16 if qualification requirements 89 are satisfied. Qualifying evidence 86 can comprise data in a record, a document 78, a paper or electronic purchase receipt 77, and the like, comprising transaction data 87 including a spending amount for goods or services, or other qualifying behavior such as visiting, taking a survey, or performance. Qualifying evidence 86 can be contained in a data container 82 (block 254, FIG. 2B) and can exist in any form, medium, or format. Qualifying evidence 86 further comprises an identifier 50 as disclosed herein and qualifying evidence as disclosed in U.S. patent application Ser. No. 12/942,693.

Transaction data 87 (block 251, FIG. 2B) is a type of qualifying evidence 86 comprising data or an identifier 50 associated with a transaction 80. Transaction data 87 can be used for any purpose including identifying a participant 101 associated with a transaction 80, determining a transaction 80 amount, qualifying a consumer 130, data analytics, and the like.

Consumer 130 data comprises data associated with a consumer 130.

Session information comprises information associated with a session 84.

A string 83 (not shown in FIG. 2B) is a series of characters or code, including alphabetical and numerical, that incorporate or represent text, a number, a graphic, a symbol, a biometric indicator, or other currency system 100 element, or a combination thereof, that is capable be being digitized or rendered in a digital format. A string 83 can comprise session data 85, qualifying evidence 86, an identifier 50, a tag 35, and other data and elements. Examples include 1) an account number encoded in a non-transitory medium on a swipe card magnetic stripe, 2) a phone number, 3) a device identification code; 4) a digitized representation of a fingerprint; or 5) a tag 35. Further, a string 83 can be a source for generating a tag 35 that can be used as a physical element embodied in a non-transitory medium associated with a tag-object 60.

Identifiers 50

An identifier 50 (block 252, FIG. 2B), a categorical term, comprises a diverse class of identifiers, any one or more of which can identify elements associated with currency system 100 such as a member 112 or a consumer 130, and enable various functions. An identifier 50 can, for example, 1) uniquely identify a transaction 80 without necessarily personally identifying a consumer 130; 2) enable transaction associating and related functions; and 3) enable access to an account 88. Examples of an identifier 50 include a consumer 130 identifier 52, a universal transaction associating identifier 53, a device identifier 54, an account 88 identifier 57, a "user identifier," a qualifying evidence 86 identifier 51, session data 85 (when configured as an identifier), a session identifier 55, a reward system 110 identifier 41, a member 112 identifier 42, an RFID identifier, and a tag 35 (e.g., pre-issued to a consumer 130), and the like. A "user identifier" includes an issuance apparatus, a mobile phone, an e-mail account, and the like. An identifier 50 further includes 1) a "user identifier" and a "consumer identifier" as disclosed in U.S. patent application Ser. No. 12/942,693 and in U.S. patent application Ser. No. 13/959,393, which are hereby fully incorporated; 2) "session data," "issuance apparatus identification" (a type of device identifier 54), a "retail sales data identifier," "retailer identification," "transaction identification," and an "RFID identifier" as disclosed in U.S. patent application Ser. No. 12/942,693, and 3) a "universal transaction associating identifier" as disclosed in U.S. patent application Ser. No. 13/959,393.

In connection with the absence of a requirement in currency system 100 to personally identify a consumer 130, an important aspect of the qualification process 5100 and other functions is to be able to identify qualifying evidence 86 tied to a transaction 80, and to associate a plurality of disparate transactions 80 without requiring 1) a Payment Card Industry Data Security Standards (PCI DSS)-controlled credit or debit card ID, or other identifier subject to a proprietary third party restriction; 2) prior enrollment or satisfaction of third party eligibility requirements for a card, identifier, or account such as a loyalty or payment account; 3) use of a specified type of device such as a branded smart phone; or 4) use of a particular payment method or system, such as a branded credit or debit card or account. Avoiding such conditions can require an alternative identification method for, for example, identifying and associating qualifying evidence 86 corresponding to each of a plurality of transactions 80 while providing for anonymity and privacy of a consumer 130. Currency system 100 provides many ways to do so while avoiding the conditions cited above, wherein it can generate a unique tag 35 as disclosed herein comprising one or more elements of an identifier 50 (such as session data 85) or a combination of said elements. For example, a device identifier 54 associated with a consumer 130 smart phone that does not personally identify a consumer 130 1) can be associated with a plurality of transactions 80 transacted with the smart phone, 2) is suitable for transaction associating among transactions-in-common 81, and 3) can be used to access an account 88, enabling reward 16 qualification, issuance, and redemption as provided herein. A said identifier 50 is owned or controlled by currency system 100 or a participant 101, not a payment network.

If a consumer 130 elects to present an unrestricted identifier 50 for transaction 80 identification that discloses the consumer 130's identity, said identity disclosure is due to the consumer 130's choice of identifier 50, not a currency system 100 requirement for identification.

A said third party restricted identifier can be used with third party consent.

An identifier 50 can comprise one or more of a string 83 that can serve as a source for generating a tag 35. An identifier 50 from various sources may or may not be in a suitable physical, encoded, or interoperable form for use, and can be transformed by currency system 100 into a tag 35 that comprises a standardized, usefully configured physical embodiment in a non-transitory medium regardless of the original source, form, or method of capture of an identifier 50, wherein a corresponding generated said tag 35 1) comprises a transformed string 83; 2) does not necessarily comprise an exact copy of a source identifier 50, 3) can add a code for any purpose; and 4) can be configured for combining with an object 61 to generate a machine-detectible tag-object 60 of several types that are useful for various purposes disclosed herein.

A consumer 130 identifier 52 (block 252, FIG. 2B, and block 404, FIG. 4A), which can uniquely identify a transaction 80 associated with a consumer 130 who need not be personally identified, shall mean a first form of consumer identification in a form typically presented by a consumer 130 in a transaction 80, and further comprises a type of identifier 50.

A universal transaction associating identifier 53 (block 252, FIG. 2B), a type of unique proprietary identifier 50, comprises a string 83, and further comprises a consumer 130 identifier 52 for identifying a transaction 80, and further comprises a transformed string 83 generated by currency system 100 that masks a source identifier submitted by a consumer 130 including 1) a digital string contained in a non-transitory machine-readable medium associated with an object 61, e.g., a credit/debit or library card; 2) a data entry using an input device (e.g., a phone number); 3) a pattern detectible in an object (e.g., a graphic image, a photograph, or a bar code); 4) a pattern or a string 83 conveyed by a mobile device; and 5) biometric information. A universal transaction associating identifier 53 can be associated with an object 61, and is disclosed in U.S. patent application Ser. No. 13/959,393, which is hereby fully incorporated.

A device identifier 54 (block 252, FIG. 2B), a type of identifier 50, comprises for example an object 61 identifier, a smart phone identifier, a device account number, or the like, associated with a device such as a smart phone typically associated with a consumer 130 that need not be personally identified. A device identifier 54 is disclosed in U.S. patent application Ser. No. 13/959,393, which is hereby fully incorporated. A "user identifier" can identify a device.

An account 88 identifier 57 (block 252, FIG. 2B) a type of identifier 50, is associated with an account 88, for example tied to a consumer 130 not necessarily personally identified.

A session identifier 55, a type of identifier 50, is an identifier of a session 84.

Tags 35

A tag 35 (block 253, FIG. 2B), a categorical term, is a class of tags that are physical entities generated or transformed by currency system 100 from one or more strings 83, as a source element, into a transformed string (a tag 35). Upon recording in a database 90 or object 61, a tag 35 comprises a non-transitory string 83 comprising an entity or element tangibly embedded or embodied in a physical memory or other medium and configured for use in currency system 100. Tags 35 comprise an interoperability tag 30, a qualifying evidence 86 tag 46, a voucher identity tag 14, and other types. A tag 35 is further described below.

A qualifying evidence 86 tag 46 (block 253, FIG. 2B; block 407, FIG. 4A; and block 5042, FIG. 5A) is a type of tag 35 generated and configured in the qualification process 5100 that uniquely identifies one or more transactions 80 associated with a consumer 130 that need not be personally identified, that is detectible by a participant 101 apparatus 800, and that can be used to associate said transactions 80 and perform other currency system 100 functions.

A reference qualifying evidence 86 tag 47 (block 253, FIG. 2B) comprises an entry in a database 90 that is used to validate a corresponding a qualifying evidence 86 tag 46.

An interoperability tag 30 (block 227; FIG. 2A; block 253, FIG. 2B; block 414, FIG. 4B; block 5006, FIG. 5A) is a type of tag 35 associated with voucher-tag-objects 12, apparatuses 800, objects 61, elements, data, or participants 101 that are configured for currency system 100 interoperability in part by applying an interoperability tag 30 responsive to requirements associated with interoperability rules 71. An interoperability tag 30 is further described below.

A reference interoperability tag 31 (block 253, FIG. 2B), a type of tag 35, comprises an entry in a database 90 that is used to validate a corresponding interoperability tag 30.

A voucher identity tag 14 is a type of tag 35 that is associated with and uniquely identifies a voucher-tag-object 12; and is further described below.

A reference voucher identity tag 15, a type of tag 35, comprises an entry in a database 90 and is used to validate a corresponding voucher identity tag 14, and is described below.

Objects 61

An object 61 (block 254, FIG. 2B), a physical entity, is at least one of 1) a portable physical object, 2) an article of manufacture containing or associated with a non-transitory machine-readable medium that can contain a string 83, and 3) a data container 82, described below. An object 61 is disclosed in U.S. patent application Ser. No. 13/959,393, which is hereby fully incorporated. Exemplary objects 61 include a voucher 10 (without a tag 35), a swipe card, a receipt 77, a document 78, a data container 82, a smart phone, and an electronic device. A tag 35 can be associated with an object 61 to form a tag-object 60, which is described below.

A data container 82 (block 254, FIG. 2B; block 405, FIG. 4A; and block 5034, FIG. 5A) is a type of object 61 comprising a receipt 77, a document 78, a record, a data file 59, and the like, that contains or is associated with one or more of qualifying evidence 86, transaction data 87, an identifier 50, a tag 35, data, or a combination thereof.

A data file 59 (block 254, FIG. 2B; and block 405, FIG. 4A) is a type of data container 82, such as an electronic document 78 or a receipt 77, that contains data in electronic or digital format, the data comprising session data 85, transaction data 87, an identifier 50, a tag 35, a string 83, and other data. A data file 59 is a physical entity embedded in or associated with a physical non-transitory medium, and can be recorded, transmitted, stored, or remotely reproduced, while several iterations can exist at once in several locations or databases 90.

A voucher 10 (block 254, FIG. 2B, and block 410, FIG. 4B), a type of object 61, is a generic voucher and a type of reward currency 11 that is not associated with an interoperability tag 30 or a voucher identity tag 14. When combined with these elements, it is transformed into a voucher-tag-object 12.

Tag-Objects 60

A tag-object 60 (block 255, FIG. 2B), a categorical term, is a composite entity comprising a tag 35 and an object 61, wherein a tag 35 is affixed or appended to, embedded in, or otherwise associated with an object 61. A tag-object 60 is a physical entity and is further described below. Examples include a voucher-tag-object 12 and a qualifying evidence 86 tag-object 65.

A voucher-tag-object 12 (block 255, FIG. 2B; block 416, FIG. 4B; and block 5810, FIG. 5C) is the term designated herein for one embodiment of the reward currency 11 of currency system 100. Each reference to voucher-tag-object 12 means the reward currency 11, or a unit thereof. The term voucher-tag-object 12 is meant herein only as the reward currency 11 of the present invention, and not as a voucher may be known in the art wherein it has a different meaning. Voucher-tag-objects 12 include vouchers as disclosed in U.S. patent application Ser. No. 12/942,693 and U.S. patent application Ser. No. 13/959,393. A voucher-tag-object 12 is a currency system 100-generated composite physical entity comprised of elements (described in FIG. 4B), in one embodiment, including a voucher 10, a voucher identity tag 14, and an interoperability tag 30. Voucher-tag-objects 12 are further described below.

An adaptive voucher-tag-object 22 (block 255, FIG. 2B, and arrows 5452, 5454, FIG. 5B) is a type of tag-object 60, analogous to a coupon, that is generated in response to (adaptive to) a currency system 100 element or process associated with a tag-object 60, a tag 35, a calculation, data, or processing, and is intended to promote a behavior, for example, to qualify for a reward 16 by added spending, as further described below.

Figure 4A:
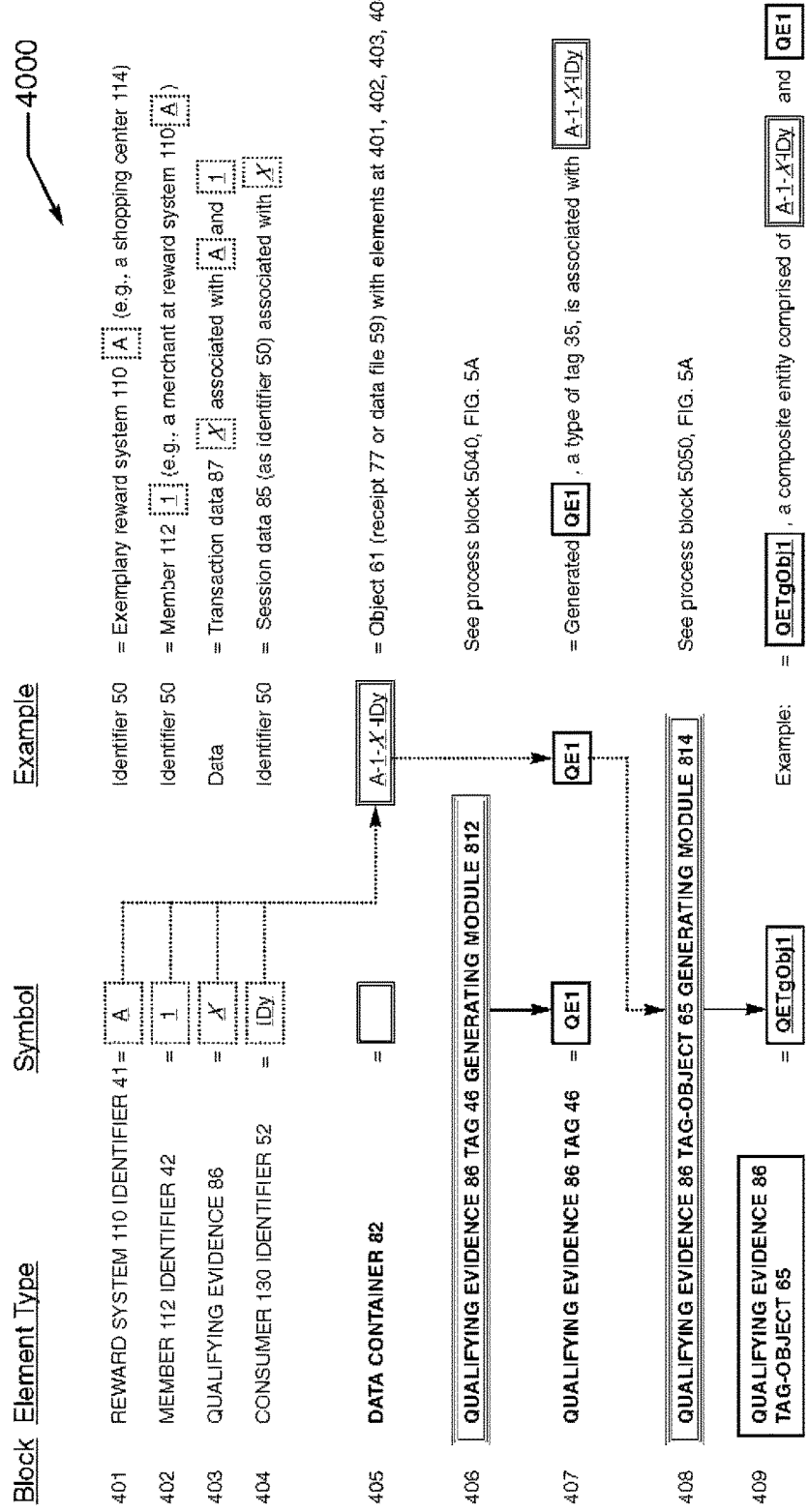
FIG. 4A illustrates, generally at 4000, an example process and selected elements for generating a qualifying evidence tag-object in the system shown in FIG. 1.
Figure 5B:
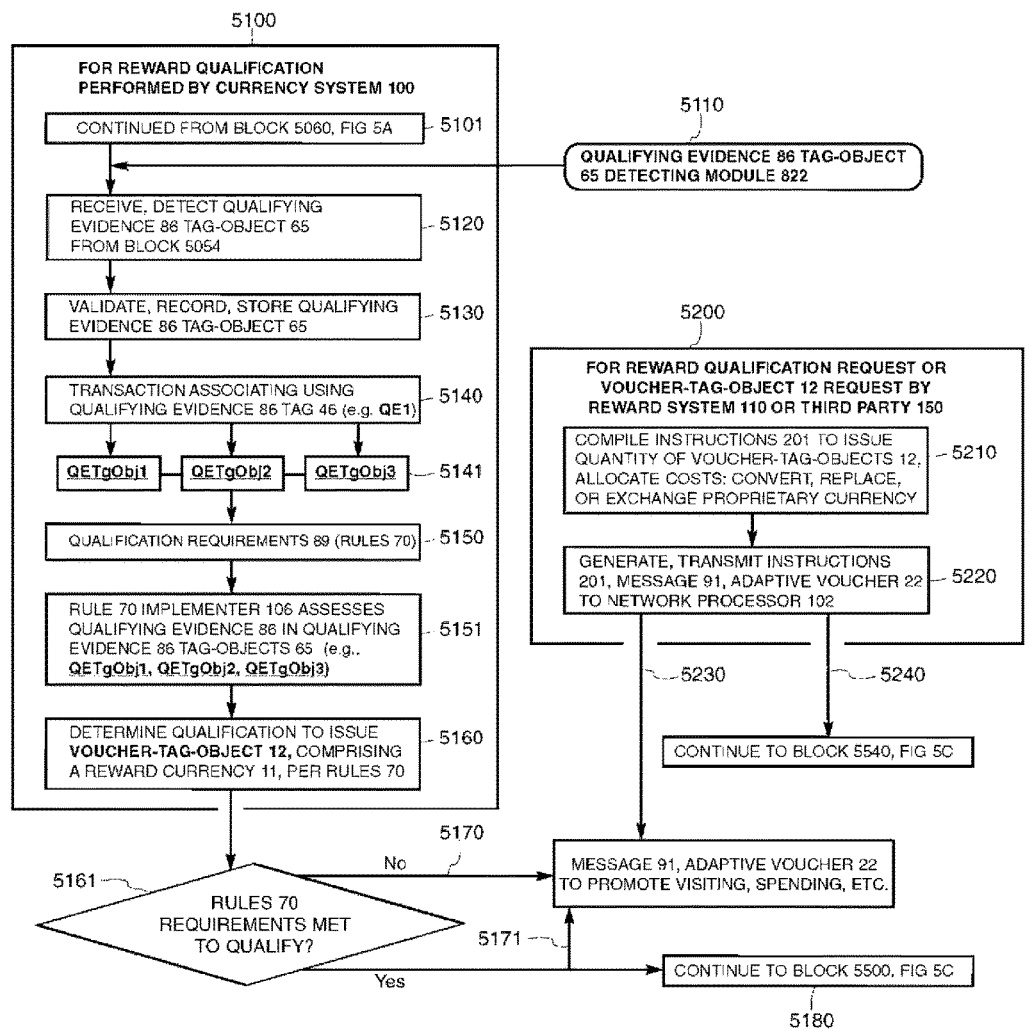
FIG. 5B is a flowchart, generally at 5100, in a second part as a continuation of FIG. 5A, illustrating an example process designed for qualification for a voucher-tag-object.

A qualifying evidence 86 tag-object 65 (block 255, FIG. 2B; block 409, FIG. 4A, and block 5052, FIG. 5A), a type of tag-object 60, is a currency system 100-generated composite physical entity comprised of elements (described in FIG. 4A) that can include a data container 82, qualifying evidence 86, a consumer 130 identifier 52 or other session data 85, and a qualifying evidence 86 tag 46; and is used in reward qualification process 5100 (FIGS. 5A, 5B).

Additional Elements in Currency System 100

Reward currency 11 is a generic term for the general (or common) reward currency of the currency system 100. A reward currency 11 can exist in various forms as described herein, including voucher-tag-objects 12 (block 144, FIG. 1), points, and merchant dollars.

A reward 16 (block 732, FIG. 7) can be any reward, inducement, or incentive that serves to modify human behavior, including any consideration, value, recognition, or benefit. A reward 16 can further comprise any value employed for any purpose, including a product, a service, a meal, food, an experience, entertainment, information, a ticket, an entry (e.g., an event or a sweepstakes), a ticket, a coupon, a discount, cash, a credit, cash back, points, miles, data, or anything of real or perceived value to a consumer 130. Data as a reward 16 can include a download (e.g., a movie, music, or image) or a service such as analyses, information, advice, and news. A reward 16 can consist of one or more items, partial items, enhancements, and the like. In some embodiments, a reward 16 can be tangible, real, or yield a real tangible result. Each reward 16 comprises or can be associated with a physical or tangible voucher-tag-object 12, a tag 35, an object 61, or an element. Purposes of rewards 16 comprise incentives, inducements, motivators, payments, compensation, bonuses, remuneration, or honors for engaging in desired tangible behaviors, e.g., spending, visiting, performing, acting, achieving goals, refraining from acting, acts, services, volunteering, compliance, and the like, wherein the physical element or aspect of a reward 16 is directed toward one or more tangible results.

A rewards program 108 (not shown in Figures) can be any promotion, program, system, procedure, or endeavor wherein a reward system 110 establishes parameters, including qualification requirements 89, rules 70, a time period, and the like, that enable issuance of a voucher-tag-object 12 exchangeable for a reward 16.

A rule 70 (block 5510, FIG. 5C) is a generic term comprising at least one rule, fact, priority, mutual exclusion, precondition, and similar criterion or function to implement or determine currency system 100 processes, properties, methods, or elements. Example rules 70 are interoperability rules 71, qualification requirements 89, and quantity allocation rules. Rules 70 can be established by any participant 101, and can be revised or updated at any time.

A qualification requirement 89 (block 5210, FIG. 5B), a type of rule 70, can be established to determine whether a consumer 130 qualifies for a reward, for example, achieving a spending threshold or engaging in a desired behavior and can be embedded in an instruction 201.

A voucher fee 18 (block 5830, FIG. 5C) is a fee collected to cover costs and provide financial backing for voucher-tag-objects 12, a reward currency 11, and the currency system 100.

A reward fee 20 (blocks 750, 760, 770, FIG. 7) is a fee disbursed to a reward provider 120, as described below.

A database 90 (FIG. 1), a categorical term, comprises a network processor 102-operated master database and associated databases. A database 90 can consist of a single database 90 or distributed databases 90 associated with a central server or an apparatus 800 in any location, and is associated with a physical non-transitory medium that can store or process data, identifiers 50, tags 35, tag-objects 60, or a record thereof. A database 90 can be associated with the network processor 102 and authorized entities including a participant 101, a fee depository, or a bank. Example databases 90 include voucher-tag-objects database 900, reward providers database 910, redemptions database 920 (FIG. 1), and databases shown in FIG. 4C.

An account 88 is a currency system 100 account established for a participant 101, for example, a consumer 130 account, a member 112 account, and a reward system 110 account.

A message 91 (at arrows 5452, 5454, FIG. 5B) is a message, notice, advertisement, offer, or communication, in any non-transitory medium, conveyed or transmitted to or from any participant 101, including a consumer 130. Messages 91 are further described below.

Interoperability

The present invention provides that its currency system 100 is interoperable. The term interoperable applies to currency system 100, its voucher-tag-objects 12, apparatuses 800, tags 35, databases 90, software, and other system elements, processes, methods, and functions.

The terms interoperable, interoperably, and interoperability in their respective contexts shall mean herein: providing or configuring a coherent set of elements relating to the ability to share or exchange voucher-tag-objects 12, tags 35, transaction data 87, instructions 201, messages 91, and the like, and to provide interconnectivity between different apparatuses 800 and participants 101 associated with the currency system 100. A coherent set of elements can include a tag-object 60, a tag 35, an interoperability tag 30, a voucher identity tag 14, software, components, formats, and features that contribute toward interoperability. Currency system 100 is interoperable if two or more participants 101 are capable, by their configuration, of communicating, transmitting, receiving, or exchanging one or more said elements.

Participants 101 can use currency system 100 resources to generate and use tangible voucher-tag-objects 12, rewards 16, and marketing or other results by implementing the coherent set of elements disclosed herein.

Interoperability in currency system 100 is directed toward functions comprising generation, redemption (exchange), trade, and use of voucher-tag-objects 12; rendering available rewards 16 and reward providers 120 for voucher-tag-object 12 redeemers; enrollment of participants 101; and configuration of apparatuses 800. In addition to interoperability tags 30, interoperability can be achieved in part by configuring currency system 100's architecture, apparatuses 800, databases 90, software, and elements using specialized hardware 230 as described herein and in connection with FIGS. 1, 2A, 2B, 3B, 4A, 4B, 5A, 5B, 5C, and 7.

In currency system 100, interoperability is significantly more than an abstract idea. A key purpose of interoperability is not only to enable machines to communicate with one another, but to enable affiliated and unaffiliated reward systems 110 and members 112 to use and share a reward currency 11, participate in a networked currency system 100, drive spending and traffic in new ways, and acquire unprecedented marketing and other capabilities. Interoperability for generation and redemption of voucher-tag-objects 12 differs from commonplace interoperability of data among databases. Unlike currency system 100, conventional reward systems do not associate their currencies (e.g., points) with interoperability tags 30 to enable currency aggregation and redemption for a reward 16 among unaffiliated reward systems 110, while currency system 100 is directed toward such tangible results, further described below.

Interoperability is achieved in accordance with pre-determined interoperability rules 71. A rule 70 module 802 (block 233, FIG. 2A; block 260, FIG. 2B) is associated with the network processor 102, a centralized computer server, or any apparatus 800 and embodied at least in part in a physical memory or other machine readable medium, and can be used to execute rules 70 comprising requirements and the interoperability rules 71. The interoperability rules 71 can control the interoperability between any currency system 100 elements, can describe bidirectional interoperability between any two elements at any step. The interoperability rules 71 can be implemented by a software-implemented process executing on specially designed hardware 230 associated with the rule 70 module 802 wherein, for example, a voucher-tag-object 12 or any element can be associated with an interoperability tag 30 that signifies that it satisfies the interoperability rules 71. The interoperability rules 71 are executed to enable generation, issuance, trading, and redemption of voucher-tag-objects 12, and associated functions including voucher fee 18 and reward fee 20 management, messaging, and the like. As can be appreciated by those skilled in the art, any number of combinations of functions can be accommodated.

One example interoperability rule 71 provides for a message buffer wherein data lacking a required interoperability tag 30 is not transmitted from a non-currency system 100-interoperable machine to a currency system 100 apparatus 800. A second example interoperability rule 71 provides that an incoming message buffer is not accepted if data does not have a recognized interoperability tag 30 attached comprising a valid a tag 35 or encryption and is routed to a process requiring the interoperability tag 30. A third example interoperability rule 71 provides that a generated voucher-tag-object 12 that is determined to be valid, having a valid voucher identity tag 14 associated with a valid interoperability tag 30, is accepted if a reward provider 120 requires the interoperability tag 30 upon redemption, wherein voucher-tag-object 12 issuance and redemption among disparate participants 101 are interoperable.

Interoperability in the present invention can provide: 1) the ability of one set of participants 101 to exchange voucher-tag-objects 12, tags 35, data, and messages 91 with other participants 101; 2) the ability for participants 101 to automatically interpret meaningfully and accurately voucher-tag-objects 12, tags 35, data, or messages 91 exchanged for producing useful results; 3) the ability of diverse business processes to conform to standards that enable participants 101 to achieve objectives regardless of ownership, location, make, version, formats, or design of apparatuses 800, tags 35, or data used, or of voucher-tag-objects 12 generated or redeemed; and 4) the ability for a plurality of diverse commercial, organizational, legal, and other entities to operate effectively together or reciprocally (inter-operate) for a common interest.

Interoperability can be achieved 1) directly among or between participant 101s' apparatuses 800 that can be connected or that interact, or 2) by directing tags 35, data, instructions 201, elements, and other resources to a network processor 102, as an intermediary, in order to achieve interoperability and to perform any currency system 100 function.

Interoperability is a limiting condition tied in part to currency system 100's architecture. Its architecture comprises a networked, distributed technology comprising specifically configured, integrated apparatuses 800 corresponding to differentiated participant 101 roles and responsive to tags 35 and tag-objects 61. Architecturally, unlike known systems, currency system 100 uses a one-to-many relationship between a consumer 130 and multiple members 112, for example, for qualifying for a reward currency 11 in a single reward system 110, as well as between a consumer 130 and multiple unaffiliated reward systems 110, for example, for aggregating and redeeming a reward currency 11 for a greater reward 16. Currency system 100 interoperability, and interoperability rules 71, operate in this architectural context for a network of reward systems 110 or a currency generating system.

Currency system 100 further provides that differently configured apparatuses 800, modules 801, and elements can be required respectively among different participants 101 to achieve interoperability. Currency system 100 is configured as a unified system having multiple parts, while each participant 101's apparatus 800 and other elements is configured in accordance with its distinct role. Interoperability is not a result then of installing the same instructions in multiple apparatuses 800, but of distinguishing roles and configuring currency system 100 to serve as a single integrated interoperable machine. As a result, dissimilar parts operate together and the machine as a whole works and is useful, while voucher-tag-objects 12, tags 35, data, and messages 91 serve as resources that move among the various parts. The technological innovation herein is to be seen as a single unified system including apparatuses 800, modules 801, and elements, considered individually and in combination.

Interoperability of the present invention is further intended to enable any payment network to offer rewards 16 and to integrate payments, apparatuses 800, and other elements with currency system 100, to generate rewards 16 for users of their payments and other systems.

Interoperability herein does not necessarily denote an open standard that is freely available to any entity without restriction. The present invention is configured as a proprietary system. In one embodiment, the currency system 100 can provide an open standard interface.

Certain apparatuses, processes, or elements need not be interoperable among participants 101 in currency system 100. For example, the collection of qualifying evidence 86 at a member 112's POS, associating transactions 80, and determining qualification can be accomplished by any technique by a reward system 110 or the network processor 102, wherein instances of certain functions may not be interoperable among unaffiliated reward systems 110, while currency system 100 still generates interoperable voucher-tag-objects 12.

Properties of Tags 35 in Currency System 100

A tag 35 (block 253, FIG. 2B) is analogous to a taggant. A taggant is a physical marker added to a material to detect, identify, or verify the material, which are analogous mechanical functions that a tag 35 can perform in connection with an object 61.

An exemplary tag 35 is described with an analogy. Baggage handlers at an airport need to direct suitcases to a destination. Each suitcase, analogous to a data container 82, contains articles, analogous to qualifying evidence 86 such as transaction data 87. The contents (data) in a suitcase (a data container 82) are irrelevant to directing a suitcase to a destination. Each suitcase has affixed a generated "destination tag," analogous to a tag 35, that is separate from an owner's nametag that serves a different purpose and is also affixed to each suitcase, without regard to articles in a suitcase. Some destination tags are labeled LAX, SFO, etc. for various airports. A baggage handler can locate, select, and sort all suitcases destined for LAX by selecting the destination tags labeled LAX, SFO, etc. A tag 35 enables analogous functions, such as locating, selecting, or screening transaction 80 records, and enabling transaction associating which, by analogy, groups all LAX suitcases for one flight, SFO suitcases for another flight, etc. The destination tags are also independent of the personal identity of an owner of a suitcase. Currency system 100 identifies and processes transactions 80, not consumers 130, which is analogous to processing suitcases and not suitcase owners. This analogy further applies, using different types of tags 35 and tag-objects 60, to reward qualification functions tied to qualifying evidence 86 associated with transactions 80 and, separately, to reward currency functions tied to generation and redemption of voucher-tag-objects 12.

Three exemplary types of tags 35 are disclosed: 1) a qualifying evidence 86 tag 46 that is used only when currency system 100 performs qualification in process 5100 (FIGS. 5A, 5B) (and not in process 5200, FIG. 5B, or process 5300, explained below); 2) a voucher identity tag 14 for uniquely identifying and tracking each voucher-tag-object 12; and 3) an interoperability tag 30 for rendering voucher-tag-objects 12 interoperable among unaffiliated reward systems 110 and other participants 101, enabling their aggregation and redemption with any reward provider 120 anywhere in currency system 100. The three types of tags 35 share common characteristics, however are generated differently as described below. Other currency system 100 elements that require identification can utilize an identifier 50 and not a tag 35.

A tag 35 can be a generated string 83, symbol, or similar token that can be associated with an object 61 such as a data container 82. Each tag 35 is further tied to a particular apparatus 800 configured in an interoperable architecture and network and having components not found in a generic computer, for example, specialized hardware 230 and modules 801. A generated tag 35 is transformed into, and configured in a useful standardized form, as a physical embodiment in a physical non-transitory medium, whereas a string 83 that can be a source for a tag 35, such as an entered phone, an account number, a biometric signature, or a conventional database key for interoperability, 1) may or may not be physical or suitably configured or standardized, 2) is not necessarily generated by currency system 100 processing, and 3) can lack a useful code.

Several types of tag 35 can produce useful tangible results when combined, for example, enabling elements to be both interoperable and identified for various functions.

The various types of tags 35 each solve a technological problem using a technical means to render a technical solution, yielding tangible useful results. An exemplary problem is to associate disparate transactions 80 among unaffiliated members 112 and thereby to generate interoperable voucher-tag-objects 12, while operating independently of payment processing and without requiring a payment account identifier. Another exemplary problem is achieving interoperability of a reward currency among unaffiliated reward systems 110. The technical solution disclosed does not comprise a commonplace or fundamental economic practice prevalent in our system of commerce or a building block of the modern economy.

A tag 35 is not itself manipulated by a currency system 100 data processing operation, nor is it intrinsic to a result, however it can be directed toward a tangible result.

Each instance of a tag 35 is to be seen in its context in an ordered combination as set forth in the claims, not merely as a standalone element, wherein a tag 35 plays a role in a larger process and is associated with, yet is differentiated from, dissimilar elements such as qualifying evidence 86, devices, consumers 130, and voucher-tag-objects 12 that can also be part of the ordered combination. In this context, a tag 35 can contribute to currency system 100's architecture, network, and framework for processing data and a reward currency 11.

A tag 35 can exist or not exist. A tag 35 that exists can be deemed to be present or not present (e.g., detected) in a process. A tag 35 that is present can be deemed to be valid or invalid. A tag 35's functionality arises as a result of processing that detects or does not detect a present and valid tag 35 associated, for example, with data subject to processing. A tag 35 and corresponding data can be determined to be valid by correlating it to a stored reference tag.

It is useful to describe what a tag 35 is not. A tag 35 does not comprise "ethereal" data, such as qualifying evidence 86 or transaction data 87 that corresponds to a consumer 130, a transaction 80, a participant 101, a device, and the like. A tag 35 does not exist as a result of currency system 100 data processing, wherein data processing comprises a software-executed operation such as applying a formula, an algorithm, or a mathematical principle to transaction data 87 that is operated upon. Nor does a tag 35 comprise newly organized or manipulated data after processing. Nor do any tags 35 serve as an operator in a mathematical formula or algorithm, nor are they software code used to calculate or manipulate data.

A tag 35 comprises a distinctive entity category that stands apart from data, information, software, an algorithm, or mathematical processing to organize it, yet it possesses an informational aspect. A tag 35 can be applied or used in conjunction with currency system 100 software, rules 70, an apparatus 800, an object 61, or other element. Specific programming and specialized hardware 230 is required to apply, detect, and use a tag 35.

Qualifying Evidence 86 Tag 46

A qualifying evidence 86 tag 46 (block 407, FIG. 4A, shown as QE1; and block 5042, FIG. 5A), a type of tag 35, is typically associated with the qualification process 5100 (FIGS. 5A, 5B). It uniquely identifies qualifying evidence 86, enabling several functions. A qualifying evidence 86 tag 46 can be created when any identifier 50 1) needs to be transformed and configured into a suitable form from an unsuitable form, 2) needs to be attached to an object 61 to create a tag-object 60, for identification, association, etc.; or 3) needs to be detected, recognized, or processed by a participant 101 apparatus 800 or module 801. Consistent with tag 35 requirements, a qualifying evidence 86 tag 46 can comprise a unique string 83.

A qualifying evidence 86 tag 46 is generated by a qualifying evidence 86 tag 46 module 812 (block 406, FIG. 4A) in one of several ways including 1) by transforming a string 83 comprising a source element, described below, or 2) by generating and issuing a qualifying evidence 86 tag 46 (that is, a pre-issued tag) to a consumer 130 before its use in transactions 80.

A said source element can comprise an identifier 50, session data 85, a consumer 130 identifier 52, a device identifier 54, a universal transaction associating identifier 53, and the like, none of which are required to reveal a consumer 130's personal identity but instead can identify a transaction 80 and its qualifying evidence 86. For example, a consumer 130 can present a string 83 contained in a loyalty card, a library card, a payment card, a phone number, an object 61, or a biometric signature, that can be used, in combination with other elements in FIG. 4A, to generate and later replicate a unique qualifying evidence 86 tag 46 that can be associated with each of a plurality of disparate transactions 80. In one embodiment, a qualifying evidence 86 tag 46 can comprise a composite entity such as session data 85 consisting of several elements.

A qualifying evidence 86 tag 46 generating module 812 is configured to transform one or more said source elements into a qualifying evidence 86 tag 46, the transformation comprising generating, formatting, and encoding it to conform to rules 70 and requirements including embodiment in a non-transitory physical medium regardless of the properties of said source elements. As a composite entity, a qualifying evidence 86 tag 46 can further contain a code configured to provide for functions that enable identifying, sorting, selecting, anti-fraud measures, security, analytics, and other functions related to a voucher-tag-object 12, a consumer 130, a participant 101, restrictions, terms, and the like.

A qualifying evidence 86 tag 46 can be associated with, delivered by, or accessed from, any medium, object 61, operating system, transmission, or device, including a card, a printed sheet, a smart phone or mobile device, and the like. For example, a unique qualifying evidence 86 tag 46 can be printed or encoded on a multi-use card having two or more identifiers, or stored in a magnetic stripe, an electronic device, an account 88 database, or in a website 888.

A qualifying evidence 86 tag 46 differs from a conventional identifier in a database at least by 1) its distinctive source elements and generation method as disclosed herein, 2) its commonality among a plurality of disparate transactions-in-common 81, 3) its physical and other properties set forth herein, 4) its absence of a requirement to personally identify a consumer 130, and 5) its association with an object 61 to form a qualifying evidence 86 tag-object 65.

A qualifying evidence 86 tag 46 can be used for qualification and related purposes, including transaction 80 identification and associating, voucher fee 18 allocation, and the like. It can be used to determine a quantity of voucher-tag-objects 12 to issue. With a qualifying evidence 86 tag 46, a consumer 130 can engage in transactions 80 in various reward systems 110 and access and retrieve information in a consumer 130's account 88, for example, about qualification status. A qualifying evidence 86 tag 46 can be used for 1) an audit of a member 112's account 88; 2) cost sharing by a member 112 with a third party 150; 3) restricting voucher-tag-object 12 redemptions; 4) marketing, security, analytics; 5) association of a voucher-tag-object 12 with members 112 for collection of voucher fees 18; and the like.

Figure 3A:
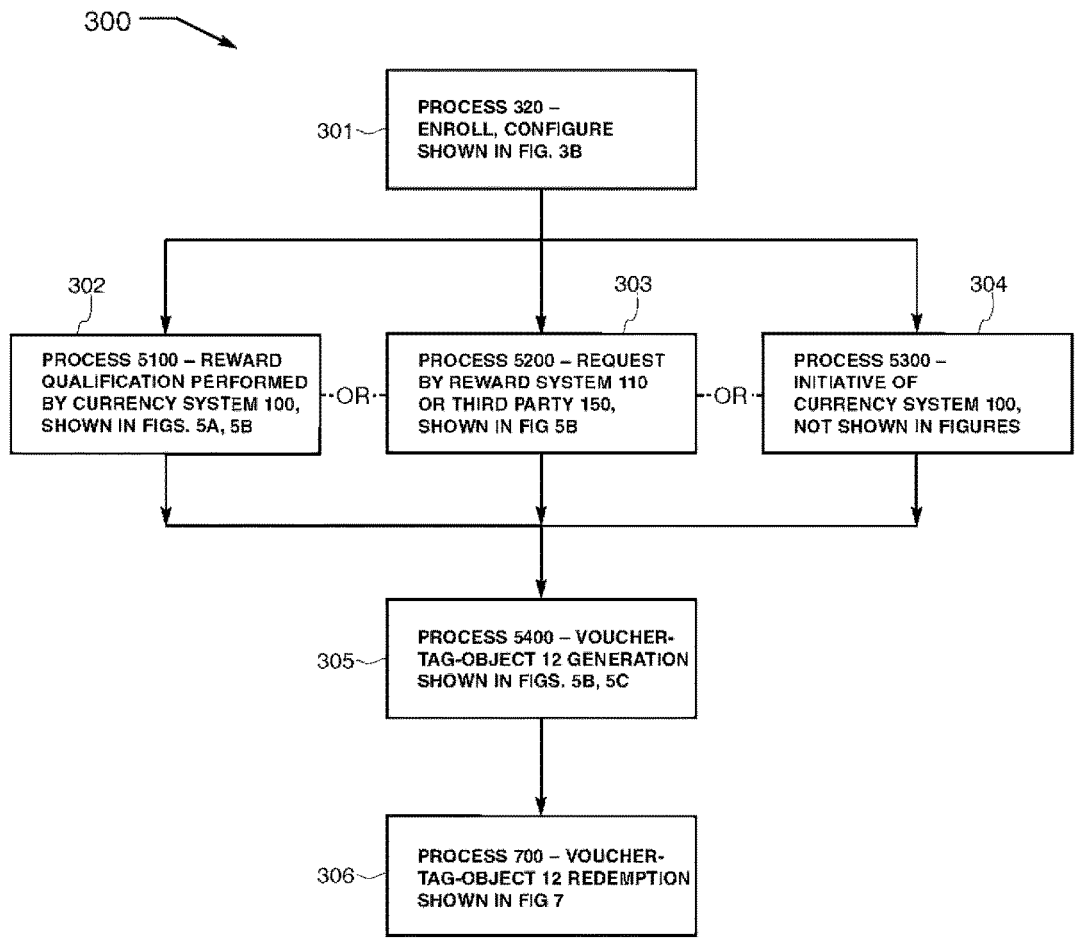
FIG. 3A is a flowchart illustrating, generally at 300, an overview of example processes in the system shown in FIG. 1.

A qualifying evidence 86 tag 46 is not required when a voucher-tag-object 12 can be generated from other processes (without performing qualification by currency system 100), such as processes 5200 and 5300 described in FIGS. 3A and 5B.

A reference qualifying evidence 86 tag 47 (block 253, FIG. 2B, and block 430, FIG. 4C), which is a copy of a qualifying evidence 86 tag 46, can be recorded in a physical medium such as a database 90 to a validate qualifying evidence 86 tag 46.

Interoperability Tag 30

An interoperability tag 30 (block 227, FIG. 2A; block 253, FIG. 2B; block 414, FIG. 4B; block 5006, FIG. 5A), a type of tag 35, is principally directed toward rendering elements interoperable for qualifying, generating, redeeming, and funding a voucher-tag-object 12 in a network of unaffiliated reward systems 110. An interoperability tag 30 can be associated with a voucher identity tag 14, session data 85, qualifying evidence 86, transaction data 87, participants 101, an object 61, an apparatus 800, and other elements subject to interoperability.

An interoperability tag 30 is embedded in a physical memory, medium, or object 61. An interoperability tag 30 can comprise, subject to requirements of a tag 35, an alphanumerical element, a code, a string 83, pattern, a graphical element, an image, or a biometric signature, or other token, and can contain a code or otherwise be configured to enable identifying, sorting, validating, and similar functions related to a voucher-tag-object 12 or other element.

In a typical embodiment, an interoperability tag 30 can be generated by an interoperability tag 30 generating module 810 comprising specialized hardware 230 comprising a random tag generator 232 that can 1) generate a pseudo-random string comprising an interoperability tag 30, or 2) utilize a suitable external source to generate an interoperability tag 30. Use of a pseudorandom interoperability tag 30 reduces the chance that someone attempting to counterfeit or fraudulently use a tag-object 60 will be able to predict which tag will be used.

An interoperability tag 30 can be transmitted, recorded, detected, or stored in a non-transitory medium associated with an object 61, an apparatus 800, or a database 90, and can be generated periodically or updated from time to time.

An interoperability tag 30 further differs from a conventional identifier at least by 1) its association with a voucher 10, a reward currency 11, or a voucher-tag-object 12 that can be shared interoperably by and among unaffiliated reward systems 110 and reward providers 120; 2) its generation and redemption by specialized hardware 230 as described herein; 3) its physical properties set forth herein; 4) its association with an object 61 to form a tag-object 60; and 5) its ability to validate any currency system 100 element as compliant with interoperability rules 71. An interoperability tag 30 1) further differs from a conventional interoperability key associated with a database by enabling unaffiliated participants 101 to participate in currency system 100 while using incompatible equipment, databases, POS systems, and the like, and 2) is not directed toward enabling participants 101 to directly exchange or process data (which is directed to a network processor 102). Instead an interoperability tag 30 enables the shared generation and use of voucher-tag-objects 12 and more generally a reward currency 11 and related elements.

A reference interoperability tag 31 (block 253, FIG. 2B; block 440, FIG. 4C; block 5008, FIG. 5A, and block 724 FIG. 7), which is a copy of an interoperability tag 30, can be recorded in a physical medium such as a database 90 to validate an interoperability tag 30 and can be used, for example, for validating a voucher-tag-object 12 upon its redemption. An element associated with an interoperability tag 30 can be self-authenticating to any apparatus 800 or element, wherein a said apparatus 800 can itself contain an updated reference interoperability tag 31 for validation, or a communication link can be used for remotely validating it.

Voucher Identity Tag 14

A voucher identity tag 14 (block 253, FIG. 2B, and block 412, FIG. 4B), a type of tag 35, is principally directed toward uniquely identifying a voucher-tag-object 12.

A voucher identity tag 14 applies to a particular voucher-tag-object 12. In contrast, an interoperability tag 30 can be associated with a plurality of currency system 100 elements corresponding for example to a timestamp associated with an interoperability tag 30. In one embodiment, an interoperability tag 30 can itself serve as a voucher identity tag 14, or vice versa.

Upon generation of a voucher-tag-object 12, a voucher identity tag 14 is generated by a voucher identity tag 14 generating module 830 comprising specialized hardware 230 further comprising a barrel shifter unit 231 (BSU), wherein a BSU can generate a unique trackable string 83 or code (comprising a voucher identity tag 14) for each voucher-tag-object 12.

A voucher identity tag 14 can be configured for functions including 1) identifying, sorting, and similar functions related to a voucher-tag-object 12, a corresponding issuing participant 101, a consumer 130, and the like; 2) enabling a consumer 130 to receive, redeem, aggregate, or trade a corresponding voucher-tag-object 12; 3) tracking voucher-tag-objects 12; 4) associating redeemed voucher-tag-objects 12 with transactions 80 and participants 101; 5) allocating costs among participants 101; 6) cost sharing with third parties 150; 7) maintaining histories; 8) auditing accounts 88; 9) anti-fraud measures; 10) analytics; and similar purposes.

A voucher identity tag 14 further differs from a conventional identifier at least by 1) its association with a voucher 10, a reward currency 11, or a voucher-tag-object 12 that can be shared interoperably by and among unaffiliated reward systems 110 and reward providers 120; 2) its generation by specialized hardware 230 described herein; 3) its physical and other properties set forth herein; and 4) its combination in a voucher-tag-object 12 with an interoperability tag 30, wherein said combination comprises a typical embodiment.

In one embodiment, a reward currency 11 may not be associated with a voucher identity tag 14, for example, if it exists in the form of points, wherein a set of points can share a single tag 35 or no identity tag.

A reference voucher identity tag 15, (block 253, FIG. 2B; block 450, FIG. 4C; block 5620, FIG. 5B, and block 724 FIG. 7), a copy of a voucher identity tag 14, can be recorded in a physical medium such as a database 90 and can be used, for example, for validating a voucher identity tag 14 and a corresponding voucher-tag-object 12 upon its redemption.

Tag-Objects 60

A tag-object 60 (block 255, FIG. 2B), a categorical term, is a generated composite entity comprising a currency system 100-generated tag 35 coupled with an object 61. Different types of tags 35 and objects 61 can be combined to generate a tag-object 60. Several types of tag-object 60 are illustrated in block 255, FIG. 2B and described below. Each instance of a tag-object 60 is a machine-detectible physical entity. Detection of a tag-object 60 enables functions that correspond to each type of tag 35, for example, interoperability, selecting a transaction 80, transaction associating, and redeeming a voucher-tag-object 12 for a reward 16.

Any type of object consistent with an object 61, coupled with any type of tag or identifier consistent with a generated tag 35, is regarded as a tag-object 60 as provided herein.

Voucher-Tag-Objects 12

Figure 2B:
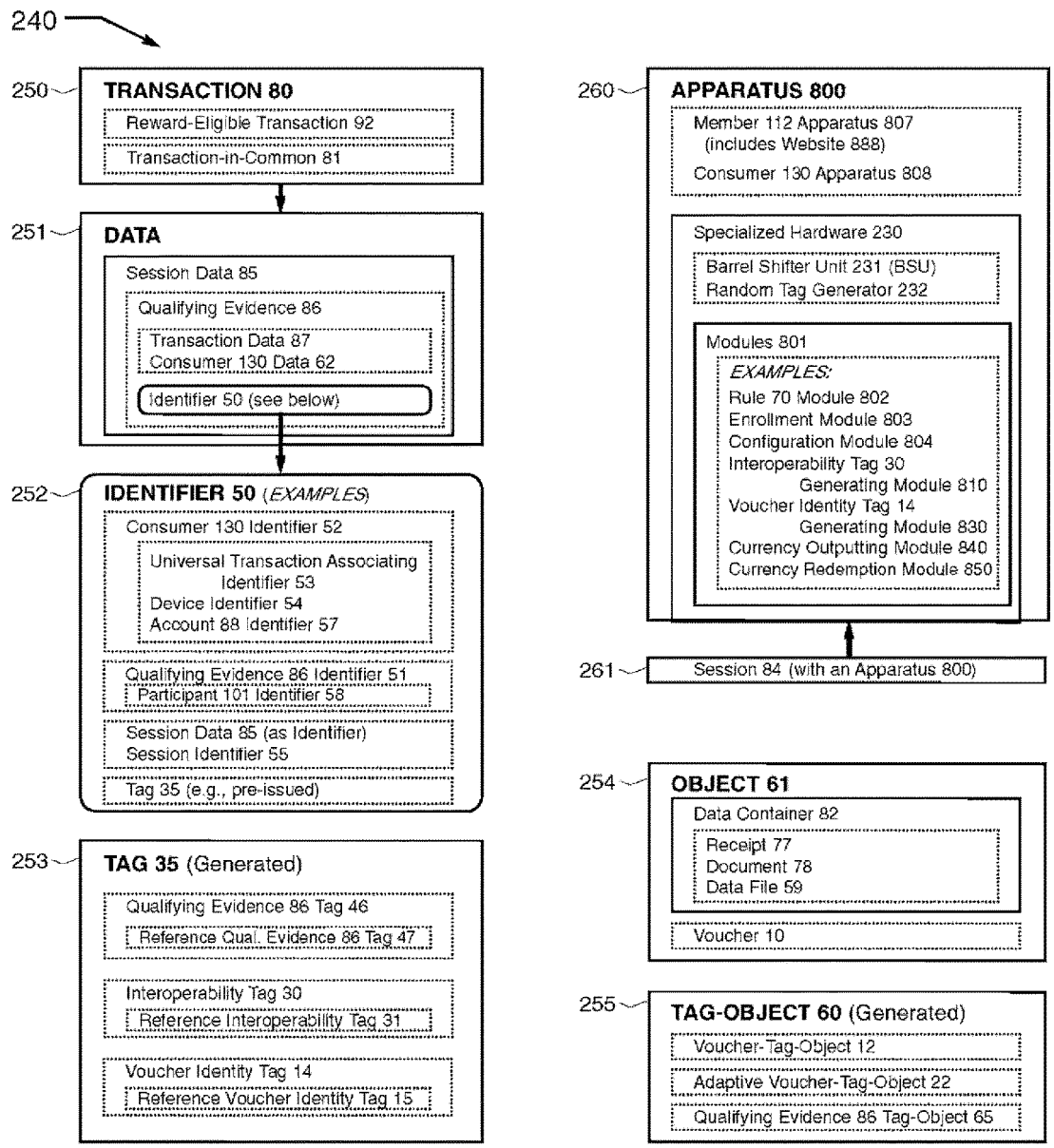
FIG. 2B illustrates, generally at 240, one embodiment of relationships among example elements in the system shown in FIG. 1.
Figure 4B:
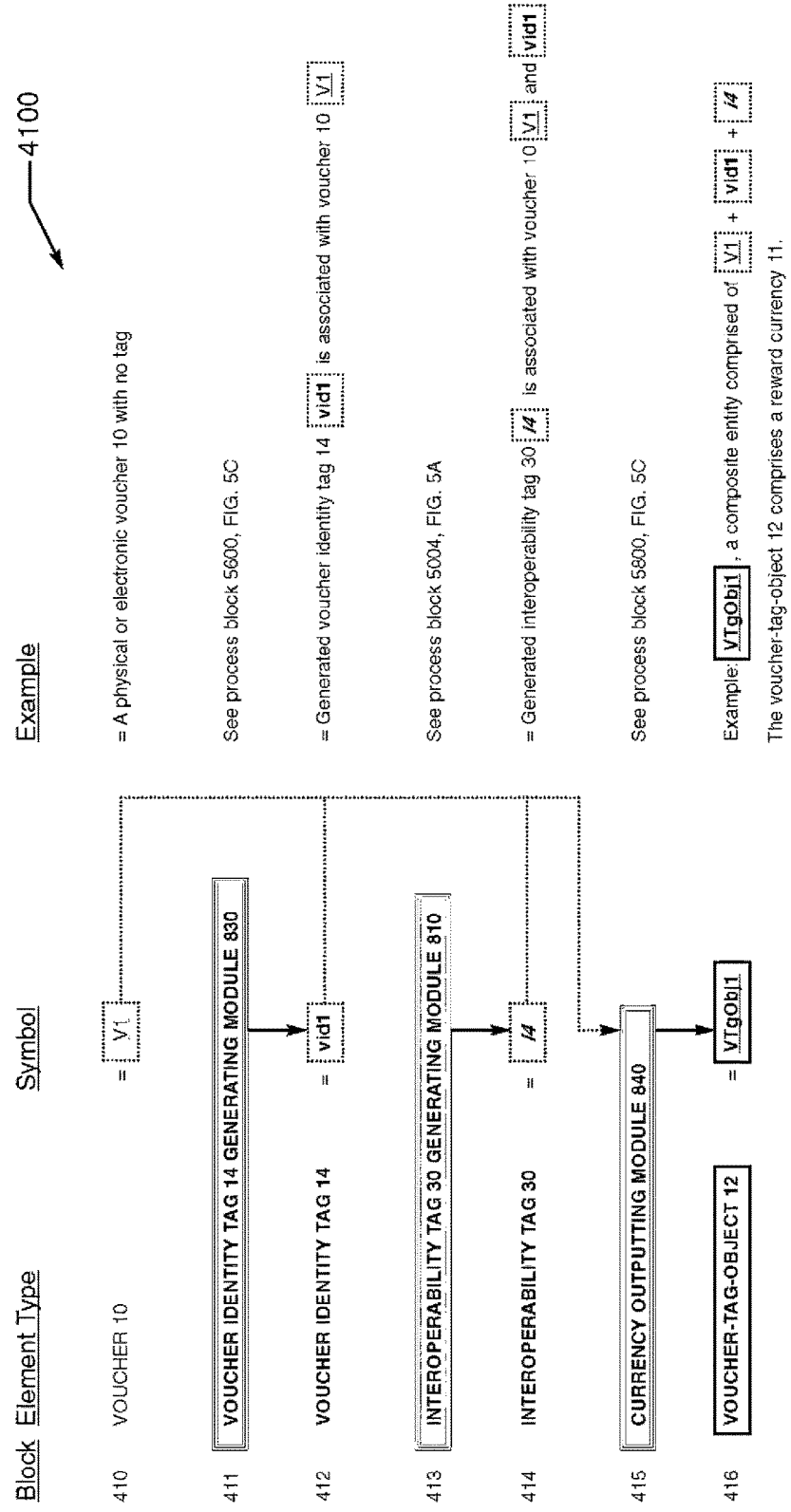
FIG. 4B illustrates, generally at 4100, an example process and selected elements for generating a voucher-tag-object in the system shown in FIG. 1.
Figure 5C:
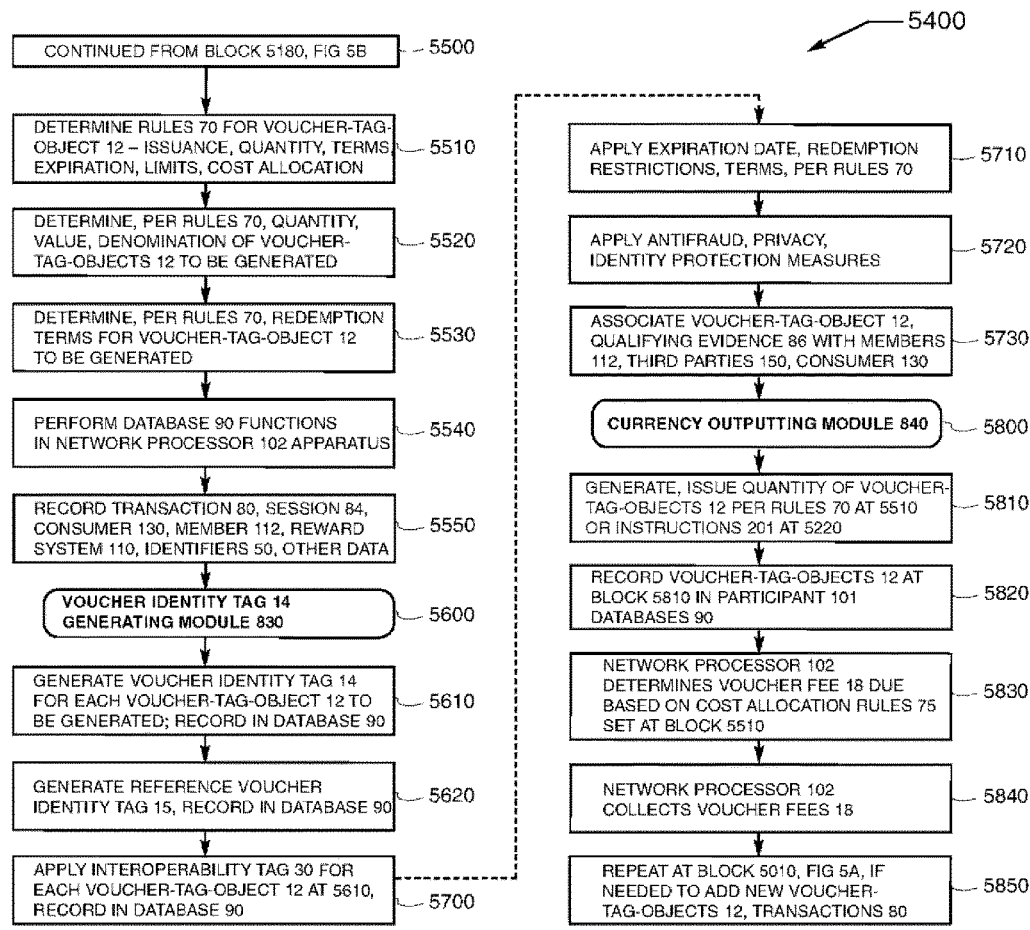
FIG. 5C is a flowchart, generally at 5400, as a continuation of processes 5100 and 5200 in FIG. 5B, illustrating an example process designed for generating a voucher-tag-object in the system shown in FIG. 1.

A first exemplary type of tag-object 60 is a voucher-tag-object 12 (block 144, FIG. 1; block 255, FIG. 2B; block 416, FIG. 4B; and block 5810, FIG. 5C). A voucher-tag-object 12 comprises an interoperable unit of exchange and represents an embodiment of value wherein a reward 16 can be exchanged in the currency system 100. It is comprised of a voucher 10 (an untagged type of object 61) coupled with a generated interoperability tag 30, and further associated with a generated voucher identity tag 14. A voucher-tag-object 12 is used, for example, in processes 5400 and 700 for generation and redemption, respectively, of a reward currency 11. A reward system 110 can enroll and adopt the currency system 100 and its voucher-tag-objects 12 as a mechanism by which it issues and redeems rewards 16.

A voucher 10, which has no tag 35, is transformed by applying an interoperability tag 30 and a voucher identity tag 14 to it, wherein it is transformed into an interoperable voucher-tag-object 12. Any embodiment of an interoperable voucher-tag-object 12 can be interchangeable with any other embodiment of an interoperable voucher-tag-object 12.

A voucher-tag-object 12 can consist of a physical electronic voucher-tag-object 12 or a purely physical voucher-tag-object 12 (e.g., paper) as a currency exchangeable for a reward 16. Upon issuance, a voucher-tag-object 12 or its voucher identity tag 14 is tangibly embodied in a physical memory or other medium or object 61 associated with one or more participants 101 or a consumer 130. A voucher-tag-object 12 can be generated and identified, detected, authorized, transmitted, traded, redeemed, or otherwise processed or stored in or by any apparatus 800, database 90, website 888, network, storage device, and the like, or any combination thereof.

A voucher-tag-object 12 can be passed from one participant 101 or apparatus 800 to another, and can be represented simultaneously in several locations in currency system 100, in each instance tangibly embodied in a physical memory or other medium or object 61. In one embodiment, a first voucher-tag-object 12 can be created in one location and reconstituted into a second voucher-tag-object 12 comprising a manifestation (or representation) of the first voucher-tag-object 12 in a remote apparatus by copying it. The first and second exemplary voucher-tag-objects 12 are functionally equivalent and regarded as the same voucher-tag-object 12 for currency system 100 purposes. By this method, more than one manifestation of the same voucher-tag-object 12 can be created for record-keeping, validation by various parties, convenient use, etc. Similarly, a representation of the same voucher-tag-object 12 can be contained in one or more databases 90, records, accounts 88, objects 61, and non-transitory mediums. The same as described herein applies to an adaptive voucher-tag-object 22.

Voucher-tag-objects 12 can be generated, processed, stored, used, or converted in any form including points, miles, credits, discounts, cash back, vouchers, Bitcoins, digital currency, virtual currency, wallets, social media credits, "likes" (as on Facebook websites), merchant dollars, coupons, or similar forms of value. A voucher-tag-object 12 can further include any currency associated with any rewards program 108, or reward or loyalty system, including units for barter, trade, incentives, payment, and the like. A voucher-tag-object 12 can be denominated in any value and can be used for any purpose in accordance with provisions set forth herein.

A voucher-tag-object 12 can be generated in any form, including any format, pattern, or material, or in any physical digital, physical electronic, physical optical, physical magnetic, printed, physical graphic, biological, or physical technological embodiment, or any combination thereof. A voucher-tag-object 12 can be produced using any physical medium including paper, plastic, metal, mixed media, and the like, and can be printed on a sheet or embedded in an object 61, for example, a card, a receipt 77, a ticket, a key fob, a memory stick, and the like.

The life cycle of a voucher-tag-object 12 can begin 1) before its issuance, such as upon a first transaction 80 in a reward system 110 that leads, coupled with other transactions 80, toward qualification; or 2) after qualification, such as upon voucher-tag-object 12 issuance.

Each voucher-tag-object 12 is associated with a unique voucher identity tag 14 which can be detected upon redemption and, for validation, can be compared to a valid reference voucher identity tag 15 stored in a reference voucher identity tags 15 database 923 (block 450, FIG. 4C), a type of database 90. A voucher identity tag 14 and related data can be marked on or associated with a physical voucher-tag-object 12, or for electronic voucher-tag-objects 12, can be displayed on a consumer interface 132 or other display upon access or use.

A voucher identity tag 14 corresponds to a "voucher identifier" as set forth in U.S. patent application Ser. No. 12/942,693 and U.S. patent application Ser. No. 13/959,393, wherein a voucher-tag-object 12 is distinguished as an element from its voucher identity tag 14.

Data associated with a voucher-tag-object 12 and its voucher identity tag 14 can comprise one or more of information corresponding to a participant 101; a consumer 130 having a consumer 130 identifier 52, whether or not that consumer 130 is personally identified; a reward 16; a voucher fee 18; a reward fee 20; a redemption; qualification; issuance; qualification requirements 89; rules 70; transactions 80; payment methods; a sweepstakes entry; a sponsor or underwriter; anti-fraud measures; biometric data; encryption; invalidation and voiding; fraudulent use; terms, expirations, restrictions; messaging, advertising, coupons; territories; marketing purposes; and the like. Data associated with a voucher-tag-object 12 can correspond to a behavior, step, process, session 84, or event associated with currency system 100.

Voucher-tag-objects 12 are subject to terms, restrictions, or authorization of currency system 100 and its participants 101. Different classes of voucher-tag-objects 12 can have different terms, restrictions, or uses, for example, in a particular reward system 110.

A consumer 130 can aggregate valid, unexpired voucher-tag-objects 12 obtained from any source, including reward systems 110, trades, and purchases, in order to build a larger value or quantity of voucher-tag-objects 12 redeemable for a greater or more valuable reward 16.

To access a voucher-tag-object 12 received and related information for redemption or any purpose, a consumer 130 can perform certain steps including accessing an apparatus 800, a website 888, or using a consumer 130 identifier 52 or an account 88. Other access approaches can include entering a personal identification number (PIN), a code, a digital key, or biometric data (such as a fingerprint) associated with a corresponding qualifying evidence 86 tag 46.

Voucher-tag-objects 12 are proprietary to currency system 100, a closed system.

A currency as provided herein is legal in view of California Assembly Bill No. 129, approved Jun. 28, 2014, with respect to legal currencies comprising points, digital currencies, and the like. Such currencies are distinct from legal tender and fiat currencies. In any jurisdiction in which a "currency" may not be legal, the present invention shall refer to voucher-tag-objects and equivalents, as disclosed herein, and not a currency. While a voucher-tag-object 12 has currency-like properties and uses, it is not legal tender or United States currency.

Voucher-tag-objects 12 may not have a cash value except as provided herein when a voucher-tag-object 12 is submitted to a network processor 102 in exchange for a reward fee 20.

In one embodiment, a monetary voucher-tag-object 23, a certain type of voucher-tag-object 12, can be denominated with a monetary value called herein its face value, for example, $1, $5, $10, or $100, or any amount. If it is redeemed as partial payment toward a reward 16, a reward provider 120 can determine the amount or terms of any additional payment required.

In another embodiment, a non-monetary voucher-tag-object 24, another type of voucher-tag-object 12, can have no monetary value, yet can serve as an exchangeable general reward currency 11 wherein, upon qualifying, a qualifier can receive as a reward 16, for example, recognition, congratulations, gratitude, accolades, a hug, and the like. A non-monetary voucher-tag-object 24 can serve as a motivational driver for a desired tangible behavior.

Qualifying Evidence 86 Tag-Object 65

A second exemplary type of tag-object 60 is a qualifying evidence 86 tag-object 65 (block 140, FIG. 1; block 409, FIG. 4A; block 5052 et. seq., FIG. 5A, and block 610, FIG. 6), comprised of a data container 82 that can contain qualifying evidence 86 and various identifiers 50, coupled with a qualifying evidence 86 tag 46. A qualifying evidence 86 tag-object 65 is used primarily in process 5100 for qualifying a consumer 130 for a reward 16 (such as transaction associating) and can also be used for fee allocation and other purposes. It can be 1) a member 112-issued paper or electronic receipt 77 comprising a data container 82 (block 405, FIG. 4A) that can contain 2) transaction 80-related elements (shown at blocks 401, 402, 403, and 404, FIG. 4A) coupled with 3) an appended generated qualifying evidence 86 tag 46 (block 407, FIG. 4A) that corresponds to a transaction 80. In one example (as further explained below in FIG. 5A and FIG. 6), three qualifying evidence 86 tag-objects 65 can include and share the same consumer 130 identifier 152 IDy (block 404, FIG. 4A) and a corresponding qualifying evidence tag QE1 (block 407, FIG. 4A) generated from the said IDy. Transaction associating is enabled by matching the qualifying evidence 86 tag 46 QE1 contained in a detected qualifying evidence 86 tag-object 65 for a first transaction 80 with one or more identical QE1s previously captured and stored that correspond to a second and a third transaction 80, comprising a set of transactions-in-common 81. Generally, the same matching qualifying evidence 86 tag 46 can be associated with each eligible transaction 80 in a given time period, while non-matching records can be screened out. For each iteration of this step, which can be repeated for each transaction 80, a network processor 102 can determine that each qualifying evidence 86 tag-object 65 is valid, for example, that it has not been previously rewarded and that its interoperability tag 30 is valid.

A third exemplary type of tag-object 60 is a card tag-object (not shown in Figures), wherein a generated tag 35 is coupled with a physical card such as a credit card that can be used for identifying transactions-in-common 81. In one embodiment, a card tag-object can contain two identifiers 50 comprising two identification elements such as a third party account identifier and a separate consumer 130 identifier 52 generated into a tag 35.

In a fourth exemplary type of tag-object 60, a device tag-object (not shown in Figures) can be comprised of a smart phone or other device coupled with a generated qualifying evidence 86 tag 46. A card tag-object or a device tag-object can be presented by a consumer 130 to enable identifying each transaction 80 among several transactions-in-common 81, and can be used in process 5100 to qualify a consumer 130 for a reward 16.

Reward Providers 120

Currency system 100 provides for at least one of a plurality of reward providers 120 (FIG. 1) to fulfill rewards 16 in exchange for one or more redeemed voucher-tag-objects 12.

A reward provider 120 can be a merchant, business, or other entity that offers a reward 16. For example, a consumer 130 can earn one or more voucher-tag-objects 12 at one or more shopping centers 114 and redeem them at a reward provider 120 including a downtown restaurant, a local arts organization, or a movie theater not associated with a shopping center 114.

A reward provider 120 can be associated with a reward system 110 or can be independent and instead be authorized by a network administrator 104. Different reward providers 120 can serve different markets and can vary in local markets. Some can be local, while others can be regional or national or online. A reward provider 120 can offer rewards 16 remotely and need not be local, for example, by offering online downloads at a website 888 offering videos, music, or information, or by mail order.

A reward provider 120 is entitled by a contract with a network administrator 104, or is otherwise authorized, to honor, accept, and redeem voucher-tag-objects 12 and to receive payment of a reward fee 20 for voucher-tag-objects 12 it redeems. A contract can set forth certain rewards 16 a reward provider 120 can offer, authorization to redeem voucher-tag-objects 12, redemption terms, methods, a time period, and other terms that can be recorded in a database 90 for processing. A contract can, for example, set 1) a limit on how many rewards 16 a reward provider 120 offers in a given period, and 2) a reward fee 20 reimbursement rate schedule.

A reward fee 20 reimbursement rate determines how much a reward provider 120 can be paid upon submission of a valid redeemed voucher-tag-object 12 to a network administrator 104. For example, a reward provider 120 can receive 25% or 50% (or any agreed rate) of voucher-tag-object 12 face value upon submission for reimbursement, payable in cash (legal tender). A reward provider 120 can 1) be contracted to provide rewards 16 during a specified time period, 2) change rewards 16 from one time period to another, or from one contract to another, 3) serve periodically, but not necessarily continuously as a reward provider 120, and 4) serve one or more reward systems 110. A reward provider 120 is typically reimbursed with a reward fee 20 only when under active contract. A reward provider 120 can be contracted to provide any or all of its products or services as rewards 16. Reward providers 120 in several markets can be rotated from time to time. Rotation maintains fresh rewards 16 while offering regular opportunities for businesses to compete to serve as reward providers 120.

Before contracting, a reward provider 120 can be selected by a network administrator 104 or can be selected or nominated by a reward system 110 or a third party 150, based on its geographical territory, its category of rewards 16, or any criterion. A reward system 110 can arrange for a set of several reward providers 120 to enable a consumer 130 to choose a desirable reward 16 among a menu of rewards 16. For selecting reward providers 120, a network administrator 104 or an authorized entity can operate a reward provider competitive bidding system or market, as disclosed in U.S. patent application Ser. No. 12/942,693.

Reward providers 120 can be independent of members 112, that is, those businesses at which a consumer 130 can spend to qualify for a reward 16. Members 112 and reward providers 120 comprise different sets of businesses in currency system 100 by virtue of enrollments, roles, functions, benefits, contracts, and the like. A member 112 in a reward system 110 may or may not serve as a reward provider 120, and vice versa.

The present invention provides a marketing method for a reward provider 120 to drive traffic and spending to itself at a known cost and at little or no risk. A reward provider 120 pays and loses nothing if it does not receive redemptions, while each redemption constitutes a prospective new customer, a difficult and costly type of customer to acquire. Voucher-tag-object 12 redeemers can experience a business, a marketing advantage. The cost is known because the reward provider 120 negotiates or bids for the amount of a reward fee 20, and will know if it will receive 50% or 30% of voucher-tag-object 12 face value, so its costs can be planned.

A list of active authorized reward providers 120 and corresponding available rewards 16 can be published online, transmitted to consumer 130 devices, or communicated by any method for consumers 130 to redeem voucher-tag-objects 12. An app, or software, can be configured to transmit timely reward provider 120 information to consumers 130, e-mail accounts, social networks, by texting, and by similar methods.

Features, properties, steps, and elements relating to reward providers 120 in the present invention include all those aspects set forth in U.S. patent application Ser. No. 12/942,693.

Message 91

A message 91 can include one or more of (i) information about ways to satisfy rules 70 requirements, including an indication of qualification or non-qualification for a reward 16 or the remaining spending amount or other behavior required to earn a voucher-tag-object 12; (ii) a list of reward systems 110 and members 112 at which qualifying spending can be done to earn a voucher-tag-object 12, (iii) a list of available rewards 16 and active reward providers 120 at which to redeem a voucher-tag-object 12; (iv) an account 88 balance, voucher-tag-object 12 status, restrictions, etc.; (v) offers, discounts, advertising, incentives, and other messages 91 to enable or entice the consumer 130 to qualify, spend, and the like; and (v) other messages 91.

Adaptive Voucher-Tag-Object 22

An adaptive voucher-tag-object 22 is a type of voucher-tag-object, differing from a voucher-tag-object 12, that is generated, associated with, responsive to, contingent upon, or targeted as a result of a currency system 100 element, a calculation, or a process of a processor 202 associated with a tag 35, data, or a step, for example, a reward qualification determination, a voucher-tag-object 12, or a session 84. An adaptive voucher-tag-object 22, which also comprises a message 91, can serve as an added marketing tool associated with currency system 100. An adaptive voucher-tag-object 22 can be generated in the course of, prior to, or in the absence of qualification, which typically entails a series of purchases or steps before qualifying. An adaptive voucher-tag-object 22 1) comprises a physical entity associated with at least one tag 35 satisfying the interoperability rules 71; 2) can be exchanged (redeemed) for any offer indicated in the adaptive voucher-tag-object 22, wherein it comprises a type of currency; 3) is ultimately directed toward the generation of a voucher-tag-object 12 or a similar currency system 100 objective; 4) has tangible value; 5) can be generated by an apparatus 800 comprising a currency outputting module 840; 6) can be redeemed or exchanged by any participant 101 (not necessarily a reward provider 120); and 7) has an identifier 50 and satisfies the same criteria set forth above regarding a voucher-tag-object 12.

In an example of an adaptive voucher-tag-object 22, a network processor 102 can 1) calculate the amount spent by a consumer 130 in one or more transactions 80 in a reward system 110, 2) determine the remaining amount required to qualify for a reward 16, and 3) generate an adaptive voucher-tag-object 22 corresponding to that remaining amount. If a consumer 130 is required to spend an additional $26 to qualify, an adaptive voucher-tag-object 22 can be generated that directs the consumer 130 to designated members 112 to spend at least $26. If instead the remaining amount is $51, a different adaptive voucher-tag-object 22 (good for offers perhaps by different stores) can be generated. In this way, the currency system 100 enables a consumer 130 to earn a $10 voucher-tag-object 12 (upon qualifying) plus receive, say, an $8 discount using an adaptive voucher-tag-object 22, thereby obtaining both a discount and a reward 16 at once. An voucher-tag-object 12 can be paid for by a plurality of members 112, while an adaptive voucher-tag-object 22 can be paid for by a member 112 that sponsors it. Many variations of adaptive voucher-tag-objects 22 are feasible.

A message 91 or an adaptive voucher-tag-object 22 can be transmitted to one consumer 130 or can be broadcast to a plurality of targeted consumers 130, or to many consumers in a targeted set of reward systems 110. Transmission and targeting can be based on any criterion including geographical location or region of selected reward systems 110, types or categories of members 112 patronized, types of transactions 80, purchase or behavioral history, demographics, offers, timing, or any criteria associated with currency system 100. In this way currency system 100 comprises a machine that generates messages 91 and adaptive voucher-tag-objects 22 that enable selective targeting pursuant to or derived from tags 35, tag-objects 60, transactions 80, behaviors, processes, and methods associated with currency system 100.

A message 91 or adaptive voucher-tag-object 22 can generate a tangible result including to: 1) increase voucher-tag-object 12 volume in circulation; 2) promote consumer 130 spending, visiting, and the like; 3) generate revenue; 4) promote a reward system 110 or member 112; 5) control voucher fee 18, marketing, and other costs; and 6) induce a tangible behavior in pursuit of a reward 16. A message 91 or adaptive voucher-tag-object 22 can be delivered by any communications method including print, a sign, a website, an e-mail, mail, advertising, social media, the Internet, on a device, on a consumer interface 132, on a receipt 77, texting, and the like. A network processor 102 can maintain a database 90 of consumer 130 contact information for this purpose (for example, e-mail or social network addresses and phone numbers). Elements described herein as messages 91 and adaptive voucher-tag-objects 22 include those set forth in U.S. patent application Ser. No. 12/942,693 and U.S. patent application Ser. No. 13/959,393, hereby fully incorporated, wherein an adaptive voucher-tag-object 22 comprises an "adaptive message."

Currency System 100 is Directed Toward A Tangible Embodiment

By utilizing tags 35 and other elements in an ordered combination within the framework of a networked, distributed architecture under conditions of interoperability, currency system 100 is directed toward a physical tangible embodiment, namely a concrete or substantive reward 16 or an equivalent voucher-tag-object 12 exchangeable for a reward 16, and not merely information comprising organized or calculated data, nor a mathematical concept, nor an abstract idea. In one embodiment a reward 16 is physical, such as, but not limited to, merchandise or food, the reward 16 serving to motivate behavior that promotes the interests of an issuer. Behavior induced by the promise or gratification of a reward 16 is an additional tangible result with economic impact, including spending and similar actions undertaken in pursuit of a reward 16. A further tangible result is the aggregation of voucher-tag-objects 12 from unaffiliated reward systems 110, enabling a greater reward 16. A further tangible result is the availability of a novel practical marketing tool otherwise unavailable to many businesses. A further tangible result is the acquisition of a customer or client by a member 112 and further by a reward provider 120. A further tangible result is the payment of a reward fee 20 to a reward provider 120 upon redeeming a voucher-tag-object 12. A further tangible result enables a reward system 110 and members 112 to control expenditures in unprecedented and cost-effective ways.

In view of eligibility for a reward 16 by two or more people as disclosed in U.S. patent application Ser. No. 12/942,693 and U.S. patent application Ser. No. 13/959,393, the present currency system 100 is also directed toward physical rewards 16 for individuals and groups.

Financial Aspects of the Currency

The present invention provides for collection and disbursement of fees to back the voucher-tag-objects 12. A voucher fee 18 is collected upon voucher-tag-object 12 issuance. A reward fee 20 is paid upon voucher-tag-object 12 redemption, generally to a reward provider 120. Reward fees 20 can be funded by voucher fees 18 or other sources. These fees comprise a financial mechanism to sustain economic viability and other aspects of the currency system 100.

The present invention provides for apparatuses 800 to be configured to perform functions corresponding to voucher fees 18, reward fees 20, fee shares and allocations, collection, payments, transfers of voucher-tag-objects 12 and funds, reconciliation and settlement of accounts 88, and other financial aspects of the currency system 100.

In one embodiment, voucher fees 18 can be collected to cover costs associated with reward fees 20 payable to reward providers 120 for redeeming voucher-tag-objects 12, and for the cost of rewards 16, operations, and profits. Voucher-tag-objects 12 can be backed by cash value represented by voucher fees 18, while other funding methods are feasible. Voucher fees 18 can be collected from reward systems 110, members 112, and third parties 150 that can benefit from consumer 130 qualifying behaviors or transactions 80. A voucher fee 18 can be incurred when a voucher-tag-object 12 is generated and a corresponding database 90 record is created. A voucher fee 18 can be collected before, during, or after a voucher-tag-object 12 is redeemed. In one example, a voucher fee 18 is collected at the full face value of the corresponding voucher-tag-object 12; however any voucher fee 18 terms can be agreed between a network administrator 104, a member 112, and a reward system 110.

Voucher fees 18 can be a principal cost for a reward system 110 or its members 112 to participate in the currency system 100. The marketing value of the currency system 100 can be measured in terms of its effectiveness in evoking desired behaviors in relation to the cost of doing so, while measures to control costs are important factors. In one embodiment, a reward system 110 can set or limit its voucher fee 18 budget or costs for a given time period. To do so, the currency system 100 enables a reward system 110 to configure its apparatus 800 to adjust its qualification requirement 89 (e.g., a spending threshold), comprising rules 70, for consumers 130 to receive rewards 16 at a rate commensurate with the reward system 110's budget or cost goal.

For example, a reward system 110 wishing to control costs can set a goal to spend no more than $1000 in voucher fees 18 in a particular month. If its reward rate (its average voucher fee 18 as a proportion of qualifying spending) is set at, say, $10 worth of voucher-tag-objects 12 issued per $100 worth of spending, then the reward system 110 can, by configuring its apparatus 800, limit its total voucher fee 18 cost to the first $10,000 in reward-eligible spending in that month. To do so, the reward system 110 can cut off rewards 16 when the $10,000 spending goal is achieved. Alternatively, a reward system 110 can adjust qualifying requirements 89 upward and downward periodically within a time period, to generate more or fewer voucher-tag-objects 12 and thereby achieve a monthly cost of $1000. Upward adjustments reduce voucher-tag-object 12 issuance by making qualification harder to achieve, while downward adjustments increase voucher-tag-object 12 issuance by making qualification easier. Using this approach, a reward system 110 can further promote spending in the morning or on certain days when visitor traffic tends to be reduced, and increase it later in the day or on different days, all within a cost budget.

Another method to control costs is to control the quantity or value of voucher-tag-objects 12 issued in a time period. Another method is to control the number or percentage of customers that can receive a voucher-tag-object 12 in a time period. To achieve these goals to control costs, a participant 101 can adjust qualification requirements 89 as described above.

Another method to control costs and achieve goals is to configure a reward eligibility detecting module 826 (not shown in Figures) to detect, identify, or process reward-eligible transactions 92 for voucher-tag-object 12 qualification purposes. A reward eligibility detecting module 826 can screen transactions 80 to select tagged reward-eligible transactions 92 by detecting a reward-eligibility tag 33 (not shown in Figures), a type of tag 35. For example, a merchant 112 can promote certain merchandise by rewarding certain purchases by marking items as reward-eligible, while rendering other items reward-ineligible. To do so, a merchant 112 can 1) designate items with a reward-eligibility tag 33 on price tags, merchandise, receipts 77, signs, etc.; 2) configure its POS or inventory system to process products and services as reward-eligible in databases 90; 3) advertise items as reward-eligible; 4) selectively promote sales of specific items; and 5) collect funding for associated marketing costs from a third party 150.

In yet another approach to cost control, a member 112 can set a limit for reward-eligibility, for example, on a per product or per purchase basis. For example, a merchant 112 that sells high priced merchandise such as jewelry, or that has low margins on furniture, can establish a limit of reward-eligibility up to the first $200, wherein the merchant can pay a voucher fee 18 corresponding to that $200 amount, and not, say, a full $800 or $1500 retail price.

In one embodiment, a member 112 as a merchant can designate certain merchandise to be reward-eligible because a manufacturer, vendor, sponsor, or distributor offers to share or pay associated voucher fees 18. A similar approach for reward-eligibility can apply to non-spending behaviors, to promote performance, productivity, adherence to regulations, and the like.

Adjusting rules 70 and qualification requirements 89, setting limits, and reward-eligibility and redemption measures, as disclosed herein, enable a reward system 110 to control costs and achieve marketing, visitor traffic, and other goals, resulting in a reward-based marketing system and method that eliminates much risk. Risk is intrinsic to conventional advertising and marketing methods wherein results cannot be known in advance or before costs are incurred. Instead in currency system 100, a marketing objective can be achieved at a cost that is largely known and budgeted for a given time period.

The currency system 100 provides for payment of a reward fee 20 to an authorized reward provider 120 that redeems valid voucher-tag-objects 12 in exchange for rewards 16 and submits the redeemed voucher-tag-objects 12 to a network processor 102. A reward fee 20, generally payable in legal tender, can reimburse, compensate, or offset costs of a reward provider 120 associated with providing rewards 16. A reward fee 20 is the principal way by which a reward provider 120 can convert a redeemed voucher-tag-object 12 into legal tender.

In an example of a reward fee 20, a reward provider 120 can agree (or bid) to accept 50% of each voucher-tag-object 12's face value as a reward fee 20. The reward fee 20 for a $10 voucher, in this example, is $5 (50% of $10). A second reward provider 120 can bid to accept a lesser 25% of voucher-tag-object 12 face value, or a fixed amount per voucher-tag-object 12, or can use any other approach. A reward provider 120 has an incentive to negotiate or bid low in order to serve as a reward provider 120 and gain marketing benefits.

In one embodiment, a network processor 102, in order to reduce its reward fee 20 costs, can offer to a consumer 130 a reward 16 or redemption choice that results in a lower reward fee 20 or none. A class of voucher-tag-objects 12 can be restricted only to events, movies, or rewards 16 that can be associated with lower or no reward fees 20. A consumer 130 can submit a voucher-tag-object 12 as an entry in a sweepstakes or opportunity to win a prize 16 or exchange for a reward 16 that does not have a reward fee 20. In another embodiment, a reward system 110 wishing to control voucher fee 18 costs can generate or authorize voucher-tag-objects 12 that are restricted to certain types of rewards 16 or reward providers 120. A voucher-tag-object 12 can be restricted, for example, to an entry in a sweepstakes, wherein the voucher-tag-object 12 can be a sweepstakes-only voucher-tag-object 25 (not shown in Figures) that cannot be redeemed for any other reward 16. There may be little or no funding to pay a reward fee 20 for such a restricted type voucher-tag-object 12. Restrictions can be printed or otherwise conveyed to a consumer 130 recipient of a restricted type voucher-tag-object 12.

Accounts 88

An account 88 can be established upon enrollment or at any time for a participant 101, and can maintain and display data associated with an account 88 holder. Each account 88 can be accessed by an authorized account 88 holder to track activity relating to generation and redemption of voucher-tag-objects 12 and to perform other functions.

Different account 88 types can provide different data and functions. For example, a reward system 110 account can include reports, marketing results, member 112 and voucher-tag-object 12 data, fee status, and the like. A member 112 account can include qualifying evidence 86, transaction data 87, spending received, voucher fees 18 due and paid, contact data, and the like. A reward provider 120 account can include voucher-tag-object 12 redemption, reward fee 20, rewards 16, contract terms and period, and related data. A consumer 130 can access and use a consumer 130 account for various purposes, including 1) to determine account 88 status and track voucher-tag-objects 12, transactions 80, history, and related information; 2) to obtain voucher-tag-object 12 redemption information including a list of reward providers 120, where to redeem, what rewards 16 may be available, and the like; 3) to learn how much additional spending or other action is required to earn a voucher-tag-object 12; 4) to buy, sell, or trade voucher-tag-objects 12; 5) to redeem voucher-tag-objects 12 at a reward provider 120; or 6) to receive adaptive voucher-tag-objects 22, messages 91, offers, advertising, and other information. An account 88 can be accessed online, at a POS terminal, or by other methods. In various embodiments, a smart phone, computer, kiosk, or other device can be used to access an account 88 with an app or software, or by tapping an NFC-enabled device.

Data Mining, Analytics, and Reports

The currency system 100 provides for data mining, data analytics, and the like, associated with data collected, processed, analyzed, or stored for any purpose. During or after the life of a rewards program 108, a network processor 102 and other participants 101 can use one or more databases 90 to track and analyze data and the corresponding behavior of consumers 130, including their use of voucher-tag-objects 12 and adaptive voucher-tag-objects 22. A network processor 102 can analyze transactions 80 conducted at reward systems 110 and members 112, redemptions at reward providers 120, and usage of messages 91, to assess whether a rewards program 108 was cost-effective. An analysis can include 1) determining if the behaviors exhibited by consumers 130 met program objectives such as driving traffic and spending, and 2) testing marketing strategies, effectiveness of rewards 16, and the like.

Overview of Currency System 100 Processes

Referring to FIG. 3A, an overview of currency system 100 processes, generally at 300, is illustrated.

Figure 3B:
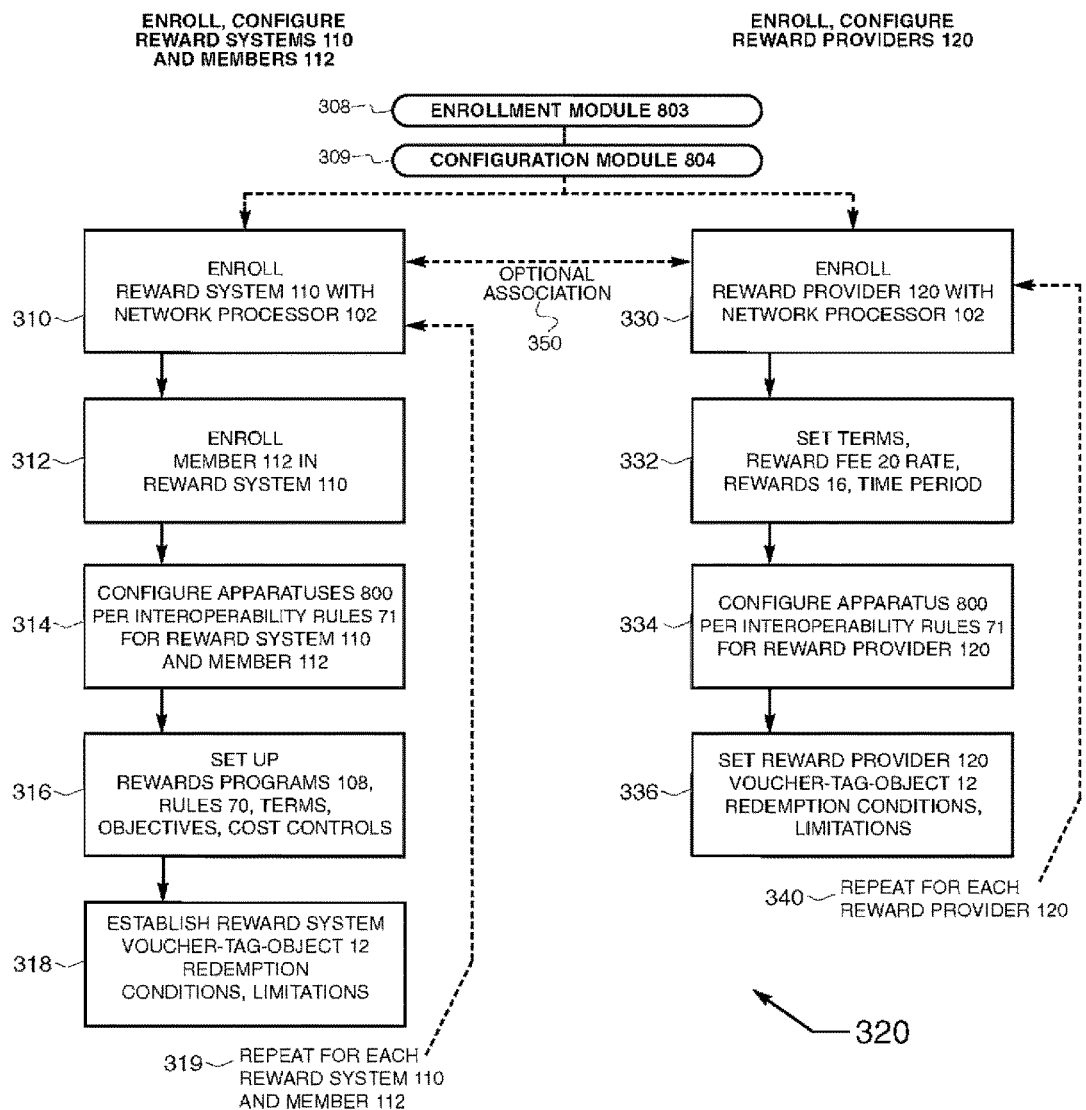
FIG. 3B is a flowchart illustrating, generally at 320, one embodiment showing example processes designed to enroll participants and configure the currency system 100.

In FIG. 3A, at process block 301, process 320 is illustrated in reference to enrollment and configuring processes set forth in FIG. 3B.

At process block 302, process 5100 is illustrated in reference to a reward 16 qualification process performed by currency system 100, as set forth in FIGS. 5A and 5B. Process 5100 is one of several processes by which currency system 100 can generate a voucher-tag-object 12, including processes 5200 and 5300, as follows.

At process block 303, process 5200 is illustrated in reference to a request to issue a voucher-tag-object 12 in accordance with an instruction 201 from a reward system 110 or a third party 150, as set forth in FIG. 5B.

At process block 304, process 5300 is illustrated in reference to issuance of a voucher-tag-object 12 generated at the initiative of the currency system 100.

At process block 305, process 5400 is illustrated in reference to generation of a voucher-tag-object 12, set forth in FIGS. 5B and 5C, pursuant to a process 5100, 5200, or 5300.

At process block 306, process 700 is illustrated in reference to redemption of a voucher-tag-object 12, set forth in FIG. 7.

Example Enrollment and Configuring Process

Referring to FIG. 3B, a simplified example process 320 is illustrated for enrolling participants 101, including a reward system 110, a member 112, a reward provider 120, and a third party 150, and for configuring a currency system 100.

At process block 308, an enrollment module 803 that enables enrollment is illustrated, as described above, and can be used for enrollment of any participant 101. An enrollment module 803 can be configured or accessible on any suitable apparatus 800 or website 888 by any authorized person. The same criteria apply to a configuration module 804 illustrated at process block 309, which is typically associated with an enrollment module 803.

At process block 310, a reward system 110 can enroll in currency system 100, with corresponding enrollment data recorded in databases 90 operated by a network processor 102.

At process block 312, one or more members 112 of a reward system 110 can be enrolled. In a typical embodiment, a plurality of members 112 is enrolled.

At process block 314 apparatuses 800 are provided or configured, executed by a configuration module 804 and a rule 70 module 802 in accordance with interoperability rules 71 as set forth above, for each enrolled participant 101.

At process block 316, a reward system 110 is configured to establish one or more rewards programs 108, rules 70, interoperability rules 71, cost controls as described above, marketing objectives, and the like. These provisions can enable a network processor 102 or a reward system 110 to determine qualification for a consumer 130 to receive a generated voucher-tag-object 12, to set a budget and qualification requirements 89, and the like. Similarly for a member 112, enrollment, limits, terms, and the like can be established, for example, the maximum amount of spending for which a member 112 will pay a voucher fee 18 in a time period, and the like. Upon its recording in a database 90, each currency system 100 element, including those at block 316, that can be configured, entered, or thereafter processed, modified, or transmitted, can be associated with an interoperability tag 30 as may be needed to ensure currency system 100 interoperability. The same applies to process blocks 332, 334, and 336.

At process block 318, one or more conditions or restrictions can be established for issuance, use, and redemption of voucher-tag-objects 12. For example, a reward system 110 can set an expiration date requiring voucher-tag-object 12 redemption within 120 days. In another example, a reward system can require that a voucher-tag-object 12 be redeemed at a certain set of reward providers 120 to drive traffic to a reward system 110. Said conditions are recorded in one or more databases 90 and associated with each voucher-tag-object 12 upon issuance and redemption. Information about said conditions can be conveyed to a voucher-tag-object 12 recipient consumer 130, for example, by printing conditions on a physical voucher-tag-object 12, or by providing an indication of said conditions using a device display such as consumer interface 132, at a terminal, a kiosk, a mobile device, or upon accessing an account 88.

At process block 320, if needed, steps 310 to 318 are repeated for any added reward system 110 or member 112, or change in elements, which can occur at any time, for example, as new members 112 are added or a qualification requirement 89 (rule 70) is adjusted.

At process block 330, a reward provider 120 can be enrolled in the same manner as described above for a reward system 110 at process block 310.

At process block 332, contract terms, reward fee 20 rates, time periods, redemption rules 70, and the like can be recorded for a reward provider 120. Each reward provider 120 can be associated with multiple contracts that can be individually identified and associated with its own terms. Contract terms are used by a network processor 102 to establish that a reward provider 120 is authorized to redeem voucher-tag-objects 12, to determine reward fee 20 rates, and to pay reward fees 20 to a reward provider 120. In one embodiment for setting terms and rates, a reward provider 120 can bid and win in a competitive bidding market as set forth above.

At process block 334, an apparatus 800 for a reward provider 120 is configured in the same manner as described at process block 314, however this configuration is designed for a reward provider 120 handling voucher-tag-object 12 redemptions, authorizations, and the like, wherein this step includes configuring a currency redemption module 850 (block 720, FIG. 7).

At process block 336, terms and conditions can be established for voucher-tag-object 12 redemptions by a reward provider 120, in analogous fashion to process block 318, and further entered in at least reward providers database 910. For example, a reward provider 120 that offers goods as a reward 16 can set a limit of how many rewards 16 it can issue in a time period, which can be tracked by a network processor 102 so that the reward provider 120's name is removed from a list of reward providers 120 available for voucher-tag-object 12 redemptions when the limit is reached. This feature further offers a reward provider 120 predictability to control costs, to order goods, etc. while enabling a network administrator 104 to ensure adequate availability of rewards 16 in view of the quantity and value of outstanding valid voucher-tag-objects 12.

At process block 340, if needed, steps 330 to 336 are repeated for any added reward provider 120 or change in elements, which can occur at any time, for example, as new reward providers 120 are added or a redemption condition or limitation is adjusted. A process link 350 is provided for an optional association between the enrollment and configuration of the reward systems 110 and members 112 at steps 310-320 and the enrollment and configuration of reward providers 120 at steps 330-340. For example, in one embodiment, a particular reward system 110 can be associated with a particular reward provider 120.

Example process 320 further provides for enrolling and configuring a third party 150 (not shown) in an analogous manner as above, in accordance with the role of the third party 150.

First Example Implementation

Referring again to FIG. 1, in a simplified first example embodiment in an interoperable currency system 100 populated and configured as provided in FIG. 3B, a reward system 110 comprising members 112 enrolls in currency system 100 and configures a rewards program 108 having rules 70. A network processor 102 arranges for at least one reward provider 120. Apparatuses 800 and databases 90 are configured and setup data entered. A consumer 130 can patronize one or more of a plurality of members 112 in a reward system 110, but need not transact at each or at any particular member 112 unless rewards program 108 rules 78 so require.

To determine who can receive a voucher-tag-object 12, a qualification function can entail 1) collecting qualifying evidence 86, and identifiers 50 corresponding to a plurality of transactions 80, 2) associating the collected data and identifiers 50 to assess a consumer 130's behavior, for example, to determine a spending total, 3) comparing the behavior data (e.g., a spending total) to qualification requirements 89 (rules 70), and 4) upon qualification, generating a voucher-tag-object 12 in accordance with predetermined rules 70 or conditions. Qualification requirements 89 can change from time to time. Determination of qualification to earn voucher-tag-objects 12 can further be accomplished in accordance with the apparatus, system, and method provided in U.S. patent application Ser. No. 12/942,693 or U.S. patent application Ser. No. 13/959,393, or in any other reward or loyalty system that issues a reward currency 11.

The present invention provides, in this first example embodiment, for a network processor 102 to perform the qualification function (in process 5100, FIGS. 5A/5B) to determine if a consumer 130 can earn a voucher-tag-object 12 as further described below. For example, a first reward system 110 may not have the necessary resources or electronic network for qualification or transaction associating among unaffiliated members 112, and can configure its apparatus 800 to have a network processor 102 qualify consumers 130. In another embodiment, a second reward system 110 or a third party 150 can perform its own qualification (in process 5200, FIG. 5B), for example, as disclosed in U.S. patent application Ser. No. 12/942,693, or in the case of a payment network 118 processing its own reward card or loyalty system transactions.

Referring again to FIG. 1, in the first example embodiment, upon qualification a voucher-tag-object 12 can be generated directly by a network processor 102. In another embodiment, a voucher-tag-object 12 can be generated by a reward system 110 or by a member 112. In yet another embodiment (in process 5200), a reward system 110 or a member 112 can authorize the network processor 102 to generate a voucher-tag-object 12 when instructed to do so. In another embodiment, a consumer can take an action, for example, by engaging an "app" or software, or by visiting a website 888, or by pressing a button or icon at a website 888 or on a device, wherein the action initiates processing of a request to determine qualification (in process 5100) and, upon qualification, to generate voucher-tag-objects 12, adaptive voucher-tag-objects 22, or to convey a message 91, as described below. Regardless of a qualification method, voucher-tag-object 12 issuance method, or issuer, the network processor 102 records the steps in its one or more databases 90 and ultimately controls processes within currency system 100.

Referring again to FIG. 1, in the first example embodiment, the reward program 108 rules 78 require purchases totaling at least $120 in a seven-day period for a reward 16 to be awarded. A transaction 80 begins when a consumer 130 wishes to purchase and then pays for (at arrow 174) goods or services offered by a member 112. In a transaction 80, a member 112 itemizes purchases, presents a total due to the consumer 130, and delivers the purchased goods or services (arrow 176). Itemization can distinguish reward-eligible from reward-ineligible items, as described above. The member 112 can further generate other financial and non-financial data. Other possible financial data can include sales tax, applied discounts such as coupons, and the like. Non-financial data can include a timestamp of a transaction 80, a member 112 identifier 42, a payment method, a consumer 130 identifier 52, and the like.

A consumer 130 can present payment by a payment card, a mobile device, cash, or any other payment method to a member 112 as tender for a transaction 80. A consumer 130 payment device includes a non-transitory machine-readable medium including a non-volatile memory to store information such as an account 88 number and, optionally a name of an account 88 holder. A consumer interface 132 associated with a consumer 130 device, a member 112 terminal, or other apparatus 800, can facilitate a transaction 80 and transfer of data and funds (at arrow 172). In various embodiments, qualifying evidence 86 including transaction data 87 and a consumer 130 identifier 52, can be captured by a detector 212 or a processor 202 in a member 112 apparatus 807 (block 177). The payment method can be recorded in one or more databases 90 (block 90) associated with a member 112, a reward system 110, a network processor 102, or a third party 150. In one embodiment, a payment can be processed by a payment network (or processor) 118. In one embodiment, disparate members 112 in a reward system 110 can engage different payment processors 118 independently of currency system 100.

In the first example embodiment, qualifying evidence 86 and related elements can be compiled by a member 112 apparatus 807 and generated as described below into a qualifying evidence 86 tag-object 65 (block 140) such as a tagged receipt 77 that can be transmitted to a network processor 102 (arrow 162). Upon processing, a reply can be transmitted from the network processor 102 apparatus 805 to a member 112 or a reward system 110, or both, indicating qualification or non-qualification for a voucher-tag-object 12 and additional information (arrows 160 and/or 162). Upon qualification, determined by associating previous and current transactions 80 and summing or assessing a consumer 130's spending or behavior in transactions 80 in a rewards program 108, totaling for example $125, and comparing a calculated result to the qualification requirements 89 (rules 70) of at least $120 spending in seven days, an interoperable voucher-tag-object 12 can be issued to a consumer 130 (arrow 170), wherein a voucher-tag-object 12 (at block 144) including a corresponding voucher identity tag 14 and an interoperability tag 30 can be generated (issued) by a network processor 102, as further described below, by embedding it in a non-transitory medium, for example, in a consumer 130 device. In another embodiment, a consumer 130 can receive a voucher-tag-object 12 from a reward system 110, a member 112, or a third party 150 that is communicatively coupled with a network processor 102 (at arrow 163), and that instructs the currency system 100 to issue a quantity of voucher-tag-objects 12 in process 5200 (block 5210 et. seq., FIG. 5B). A voucher-tag-object 12 record in voucher-tag-objects database 900 (FIG. 1) can be created or updated as needed (arrow 166), including a reference voucher identity tag 15, a reference interoperability tag 31, and corresponding data.

Referring again to FIG. 1, one or more reward providers 120 are enrolled and configured as provided above and in FIG. 3B, connected to a network processor 102 (arrow 164), and recorded in a corresponding reward providers database 910 (arrow 166).

In this first example embodiment, a consumer 130 can receive one or more voucher-tag-objects 12 (arrow 170, or alternatively arrow 176) and redeem them at a reward provider 120 (arrow 184) wherein, upon authorization by a network processor 102, a reward provider 120 can exchange the one or more voucher-tag-objects 12 for a reward 16 (arrow 186). To redeem one or more voucher-tag-objects 12, a consumer 130 can use a consumer interface 132, for example on a consumer mobile device, to interact (arrow 182) with a reward provider 120 apparatus 809 (at block 183).

Upon submission of a voucher-tag-object 12 for a redemption at arrow 182 or 184, a reward provider 120 apparatus 809 (block 183) detects a voucher identity tag 14 and an interoperability tag 30 associated with one or more submitted voucher-tag-objects 12, and transmits them to network processor 102 (arrow 164) in an authorization request. A network processor 102 compares the voucher identity tag 14 to a corresponding record in reference voucher identity tags 15 database 923 (block 450, FIG. 4C), and the interoperability tag 30 to its corresponding record in reference interoperability tags 31 database 922 (block 440, FIG. 4C), assesses whether the voucher-tag-object 12 is valid, and transmits a reply signal (arrow 164) to a reward provider 120 apparatus 809 indicating authorization or rejection. Authorization provides for an exchange of one or more voucher-tag-objects 12 for a reward 16 as well as approval of a reward fee 20, further described below. Additional data can be collected and transmitted between the parties to identify a reward 16 that is exchanged, a timestamp, confirmation of the exchange, and the like. The redemption data can be recorded in redemptions database 920 (arrow 166). Upon confirming the redemption, a voucher-tag-object 12 record in voucher-tag-objects database 900 is updated to invalidate the corresponding voucher identity tag 14 for a future redemption. The databases disclosed in this first example embodiment are intended to be illustrative only, as other databases 90 and data can be recorded in the steps described.

Further regarding the first example embodiment, a given rewards program 108 can be sponsored by a reward system 110, a member 112, a reward provider 120, or a third party 150 (at arrow 190) that can share costs. Each rewards program 108 can include rules 70 dictating conditions or actions required to earn a reward 16. The rules 70 can differ for each rewards program 108, but are generally designed to provide voucher-tag-objects 12 as incentives for behavior desired by entities associated with a rewards program 108.

Any competent participant 101 can serve as a network processor 102 and a rule 70 implementer 106. For any rewards program 108, one or more participants 101 can operate the rewards program 108 and track the associated information and voucher-tag-objects 12.

The above-described interoperable operational structure of currency system 100, use of interoperable voucher-tag-objects 12, and differentiation of roles, yield capabilities that enable participants 101 to form reward systems 110 and participate in rewards programs 108 for beneficial collective marketing purposes beyond what each participant 101 can do for itself.

With continued reference to FIG. 1, each participant 101 hopes to receive a benefit by modifying the behavior of consumers 130 participating in a rewards program 108. Reward systems 110 may wish to drive visitor traffic and commercial activity. Members 112 and reward providers 120 may wish to increase consumer traffic, spending, and market share, or achieve cost-effective marketing methods. A network processor 102 may wish to increase the number of transactions 80 to bolster traffic and to increase the market value of currency system 100.

Additional Example Implementations

Referring again to FIG. 1, in a simplified second example embodiment, the same process can occur as in the first example embodiment, however under process 5200, FIG. 5B, a reward system 110 performs the qualification function and authorizes the network processor 102 to generate a voucher-tag-object 12, following its own determination of qualification. In this second example embodiment, the qualification steps are excluded. Process 5200 (FIG. 5B) can be performed by a reward system 110 or third party 150 and not by a network processor 102.

In a third example embodiment, a payment network 118 that distributes rewards cards to consumers 130 such as cardholders can operate as a reward system 110 under process 5200, wherein a said consumer 130 can earn voucher-tag-objects 12 by any criteria of a payment network 118. Payment network 118 participation in currency system 100 can 1) broaden the scope of rewards it offers; 2) enable its cardholding consumers 130 to aggregate voucher-tagobjects 12 to obtain rewards 16; and 3) open greater access to a larger market. A payment network 118 can adopt the voucher fee 18/reward fee 20 model disclosed herein.

In a fourth example embodiment, one or more individuals and organizations in a community can each serve as a member 112 in their respective reward systems 110 wherein, for example, a sole proprietor as a member 112 can award clients as consumers 130, a teacher as a member 112 can award students as consumers 130, a charity operator as a member 112 can reward donors as consumers 130, and an event promoter as a member 112 can reward attendees as consumers 130. In each case a voucher-tag-object 12 serves as a mechanism by which an awarded reward 16 can be redeemed. The shared use of interoperable voucher-tag-objects 12 as a general reward currency 11 provides previously unavailable mutually beneficial marketing and reward-issuing capabilities and consumer incentives not otherwise feasible in the marketplace.

Example Qualifying Evidence 86 Tag-Object 65 Generation Process

Referring now to FIG. 4A, an example process 4000 is illustrated, generally at 4000, for generating a qualifying evidence 86 tag-object 65.

Process block 401 illustrates an exemplary reward system 110 identifier 41, such an identifier corresponding to a shopping center 114, symbolized as "A" (a capital letter underlined) which comprises a string 83. "A" can be an exemplary identifier of a first shopping center 114, "B" can be an identifier of a second shopping center 114, and "C" can be an identifier of a different type of a reward system 110.

Process block 402 illustrates an exemplary member 112 identifier 42, for example a merchant, associated with a shopping center 114 "A", and symbolized as "1" (a numeral underlined). "A-1" denotes a member 112 "1" in shopping center 114 "A". "1" can be included in a string 83 that includes A and 1. "1" can be an identifier of a first member 112, "2" can be an identifier of a second member 112, and "3" can be an identifier of a third member 112, where 1 and 2 and 3 can all be associated with a shopping center 114 A.

Process block 403 illustrates exemplary qualifying evidence 86 associated with said "A-1" and symbolized as "X" (italicized capital letter underlined). "X" can be included in a string 83 that includes A and 1 and X, comprising "A-1-X". "X" can be transaction data 87 in a first receipt 77 comprising qualifying evidence 86 associated with member 112 1, while "Y" can be an identifier of qualifying evidence 86 in a second receipt 77 associated with the same member 112 1 or with a different member 112 2, enabling capture of qualifying evidence 86 corresponding to each transaction 80 at one or more members 112 in one or more reward systems 110. The qualifying evidence 86 can itself be comprised of several elements, each a string 83 comprising data and identifiers 50 associated with a transaction 80, a participant 101, and other data, said elements further described below regarding session data 85 at process block 5032 in FIG. 5A.

Process block 404 illustrates an exemplary consumer 130 identifier 52, including session data 85 or an identifier 50, symbolized as IDy and included in a string 83 "A-1-X-IDy."

Process block 405 illustrates an exemplary data container 82 (a double line box), a type of object 61 that can comprise 1) a paper or electronic document 78 including a receipt 77; 2) an electronic data file 59, and the like, that contains elements from blocks 401, 402, 403, and 404.

Process block 406 illustrates an exemplary qualifying evidence 86 tag 46 generating module 812 (also at block 5040, FIG. 5A), a type of module 801, configured to transform session data 85 or identifiers 50 into and to generate a qualifying evidence 86 tag 46 (at block 407, FIG. 4A), as described herein. This module 812 requires specialized hardware 230 described above, and can be associated with a participant 101 apparatus 800, a kiosk, a vending machine, an ATM, a POS device such as a swipe card detector, an NFC-enabled transponder, a keypad, a POS terminal, a bar code or QR code scanner, a consumer 130 device such as a smart phone, a mobile device, a beacon, a GPS device, and the like.

Process block 407 illustrates an exemplary qualifying evidence 86 tag 46 as disclosed above and depicted as "QE1", that is generated by a qualifying evidence 86 tag 46 generating module 812 and that captures or is associated with elements in a data container 82 (block 405) comprising data and identifiers at blocks 401, 402, 403, and 404.

Process block 408 illustrates an exemplary qualifying evidence 86 tag-object 65 generating module 814 (also at block 5050, FIG. 5A), a type of module 801, configured to generate a qualifying evidence 86 tag-object 65 shown at block 409. This module is configured to transform a data container 82 (block 405) and its contents from block 401, 402, 403, and 404 into a type of tag-object 61 by associating it with a qualifying evidence 86 tag 46 (block 407). This module 814 can be associated with a participant 101 apparatus 800 at a member 112 site, or a kiosk, or in a consumer 130 device such as a smart phone, and the like.

Process block 409 illustrates an exemplary qualifying evidence 86 tag-object 65 (block 140, FIG. 1, and block 5052, FIG. 5A). As a composite entity, a qualifying evidence 86 tag-object 65 is generated and comprises an exemplary string "A-1-X-IDy-QE1" as set forth above. This composite object 61-tag 35 contains the data and identifiers 50 necessary to perform qualification in process 5100 (FIGS. 5A, 5B). A qualifying evidence 86 tag-object 65 is useful for identifying, selecting, and assessing a transaction 80 among transactions-in-common 81, screening unrelated transactions 80, transaction associating, qualifying, and other functions.

Example Voucher-Tag-Object 12 Generation Process

Referring now to FIG. 4B, an example process for generating a voucher-tag-object 12, generally at 4100, is illustrated.

Process block 410 illustrates an exemplary voucher 10, a physical or electronic form of a reward currency 11 with no tag 35 or identifier.

Process block 411 illustrates an exemplary voucher identity tag 14 generating module 830 (also at block 5600, FIG. 5C) configured to generate a voucher identity tag 14, and further configured as a barrel shifter unit 231. This module 830 can be administered by a network processor 102 or associated with a participant 101 apparatus 800.

Process block 412 illustrates an exemplary voucher identity tag 14 (also block 5610, FIG. 5C), described above, that is generated by a voucher identity tag 14 generating module 830.

Process block 413 illustrates an exemplary interoperability tag 30 generating module 810 (also at block 5004, FIG. 5A) that is configured to generate an interoperability tag 30. This module is configured as a random tag generator 232 as set forth above, and can be administered by a network processor 102 or associated with a participant 101 apparatus 800 that is communicatively coupled with a network processor 102 to ensure that an interoperability tag 30 is applied to each voucher-tag-object 12 upon its generation.

Process block 414 illustrates an exemplary interoperability tag 30 (also block 5006, FIG. 5A, and block 5700, FIG. 5C), described above, that is generated by an interoperability 30 generating module 810.

Process block 415 illustrates an exemplary currency outputting module 840 (also at block 5800, FIG. 5C) that is configured to generate a voucher-tag-object 12 (at block 416, FIG. 4B, and block 5006, FIG. 5A). This module 840 is configured to transform a voucher 10 into a type of tag-object 60 by associating it with a machine-detectible voucher identity tag 14 and an interoperability tag 30, all physical elements. This module 840 can be associated, for example, with a participant 101 apparatus 800 or a participant 101 website 888.

Process block 416 illustrates an exemplary voucher-tag-object 12, a reward currency 11 generated as described herein, and at block 144, FIG. 1 and block 5810, FIG. 5C. A voucher-tag-object 12, is useful in redemption process 700 (FIG. 7) for validating (block 724, FIG. 7) and exchanging (process block 732) by a consumer 130 for a reward 16 at a reward provider 120.

Example Databases in Currency System 100

Referring now to FIG. 4C, example databases for three types of reference tags are illustrated, generally at 4200.

Process block 430 illustrates an exemplary reference qualifying evidence 86 tags 47 database 921 that contains a record of reference qualifying evidence 86 tags 47 that correspond to qualifying evidence 86 tags 46 such as QE1, QE2, QE3, and QE4 in the example shown at block 407, FIG. 4A. This database 921 stores records in a non-transitory medium associated with a network processor 102 apparatus or other participant 101 apparatus 800. This database 921 enables transaction associating and other functions by selecting and validating records that match a detected qualifying evidence 86 tag 46 with a corresponding recorded reference qualifying evidence 86 tag 47. When the tags (46 and 47) match, a transaction 80 can be included among transactions-in-common 81 for evaluation for reward qualification. A reference qualifying evidence 86 tag 47 can be generated at block 5054, FIG. 5A, as described below.

Process block 440 illustrates an exemplary reference interoperability tags 31 database 922 that contains a record of each reference interoperability tag 31, namely exemplary i4, i5, i6, and i7 (from block 414, FIG. 4B), which correspond to timestamps Jan. 5, 2015 0300 through Jan. 8, 2015 0300. This database 922 enables redemption of voucher-tag-objects 12 by matching an interoperability tag 30 associated with a redeemed voucher-tag-object 12 with its corresponding reference interoperability tag 31 and, in one embodiment, with its timestamp. This database 922 can be used in conjunction with interoperability rules 71 as set forth herein.

Process block 450 illustrates an exemplary reference voucher identity tags 15 database 923 that contains a record of each reference voucher identity tag 15, namely vid1, vid2, vid3, and vid4 in the example shown at block 412, FIG. 4B. This database 923 further enables validation and redemption of voucher-tag-objects 12 issued by any reward system 100 or other participant 101 by matching the voucher identity tag 14 associated with each voucher-tag-object 12 submitted for redemption with its corresponding reference voucher identity tag 15.

Example Voucher-Tag-Object 12 Generation Process

Referring now to FIG. 5A (and continuing in FIG. 5B), an example qualification process 5100 is illustrated for a consumer 130 to qualify to receive, and for currency system 100 to generate, a voucher-tag-object 12 to exchange for a reward 16. Qualification entails collecting and associating qualifying evidence 86 and requires networked electronic transaction processing that participants 101 generally lack in multi-provider systems, exclusive of a payment network.

Process block 5002 discloses that process 5100 is implemented when qualification is performed by currency system 100. Process 5100 is distinguished from process 5200 (FIG. 5B) and process 5300 (FIG. 3A), described below, in which qualification is not performed by currency system 100 yet a voucher-tag-object 12 is issued. Qualification and related generation and other steps in process 5100 are disclosed from process block 5010 (FIG. 5A) through process block 5840 (FIG. 5C), inclusive. Process blocks 5004, 5006, and 5008 are precursor steps, in connection with interoperability tags 30, that can apply to processes 5100, 5200, or 5300. The qualification process 5100 determines whether a consumer 130 has satisfied qualification requirements 89 to earn a reward 16, and can be used to determine the quantity, denomination, restrictions, fees, and other parameters for generating one or more voucher-tag-objects 12. Typically qualification for a reward 16 occurs over a period of time comprising several transactions 80 by a consumer 130 at one or more members 112 in a reward system 110. Determining qualification can occur at any time after any transaction 80, and can occur several times in a series of transactions-in-common 81, wherein determining satisfaction of qualification requirements 89 changes over time with each added transaction 80. Each instance comprises a request for authorization to issue one or more voucher-tag-objects 12.

Process block 5004 illustrates an exemplary interoperability tag 30 generating module 810, a type of module 801 as described above (block 260, FIG. 2B, and block 413, FIG. 4B), comprising a random tag generator 232 that is used to generate an interoperability tag 30 at block 5006. An interoperability tag 30 generating module 810 executes in conjunction with an rule 70 module 802 (block 233, FIG. 2A) that enables applying, assessing, or comparing predetermined interoperability rules 71 to an interoperability tag 30 associated with a voucher-tag-object 12 when it is generated, issued, transmitted, detected, traded, or redeemed.

At process block 5006, an interoperability tag 30 is generated and recorded by an interoperability tag 30 generating module 810. This function can be performed at the beginning of each day, periodically, or at any time to ensure interoperability of voucher-tag-objects 12 and other currency system 100 elements and to provide for security and anti-fraud measures. An interoperability tag 30 generated at block 5006 can be applied to a voucher-tag-object 12 at block 5700, FIG. 5C, and validated upon redemption at block 724, FIG. 7. Further at block 5006, a corresponding reference interoperability tag 31 and optional elements such as a timestamp can be generated (not shown in FIG. 5A) and recorded at block 440, FIG. 4C.

At process block 5008, a reference interoperability tag 31 generated at block 5006 is transmitted or conveyed to participants 101 so they can possess updated versions. A record of reference interoperability tags 31 can enable a reward provider 120 to validate a plurality of voucher-tag-objects 12 without an electronic connection with a network processor 102.

Referring again to FIG. 5A, in preparation for a consumer 130 transaction 80 at block 5010, prerequisite elements of a currency system 100 are set up as illustrated in FIG. 3B. In one embodiment, said set up includes installing and interoperably configuring infrastructure including apparatuses 800, modules 801, software, and a network, at least one network processor 102, at least one reward system 110 including at least one of a plurality of members 112, a rewards program 108, databases 90, and at least one reward provider 120.

Further in reference to block 5010, for each reward system 130, rewards program 108 rules 78 can be established and recorded in one or more databases 90, and made known to consumers 130 and members 112 by public disclosure including by a message 91, a sign, a website, a mobile device, an e-mail, a social network, an advertisement, and other methods, wherein participants 101 can be informed of reward qualification requirements 89 (rules 70) for a given rewards program 108. Said rewards program 108 rules 78 can be programmable and adjustable from time to time including by remote methods, enabling a rewards program 108 implementer to provide incentives for certain behaviors, promote timely spending, control costs, manage reward 16 volumes, adapt rules 70 to local conditions, and the like. Reward-eligible inventory can be recorded and marked, and other set up procedures enacted.

Further in reference to block 5010, the present example comprises a qualification process 5100 corresponding to the first example embodiment described above in reference to FIG. 1. It will be assumed that the example rewards program 108 rules 78 (block 316, FIG. 3B) require that a consumer 130 complete at least one reward-eligible transaction 92 at each of two or more members 112 of a reward system 110, and that the aggregate sum of reward-eligible amounts transacted by the consumer 130 at all members 112 shall equal at least $120 within a 7-day period. In return for satisfying the rewards program 108 rules 78 for a reward system 110, the rules 70 provide that the consumer 130 will receive one or more voucher-tag-objects 12 equal to a total of $10 in face value for qualifying reward-eligible spending.

At process block 5010, following set up, a consumer 130 can engage in a transaction 80 (an action or behavior) with any member 112 of any reward system 110 in currency system 100 and purchase reward-eligible items, for example, totaling forty dollars ($40 U.S.) (arrow 174, FIG. 1) in a reward-eligible transaction 92 amount of forty-eight dollars ($48), $8 being ineligible for qualification purposes. The ineligible amount may or may not be recorded. The payment method can be of any type including a card (e.g., a credit/debit card, gift card, etc), cash, a check, a traveler's check, a mobile device payment, and an online payment. A member 112 can offer a (regular) transaction 80 or a reward-eligible transaction 92. In the present example, it is assumed this is a first reward-eligible transaction 92, wherein there is no prior qualifying transaction 80 or reward-eligible transaction 92 at any member 112 in the reward system 130. In other cases, a transaction 80 can be a subsequent transaction 80 wherein a previous transaction 80 in the rewards program 108 is recorded in a database 90 and associated with a generated qualifying evidence 86 tag 46.

Further in reference to block 5010, in one embodiment, a transaction 80 can be transacted in whole or in part by a consumer 130 using any apparatus 800, device, or website 888 associated with a participant 101 by clicking on, pressing, or activating an icon (not shown in Figures) comprising a button, text, a link, a screen image and the like that is displayed on a consumer interface 132 (FIG. 1), as a said icon is known in the art for transacting. In another embodiment, a reward icon 99 (FIG. 1), a currency system 100 element comprising a physical structure embedded in a physical medium comprising a module 801, and further comprising text, a graphic image, a button, an app, and the like that can be displayed on a consumer interface 132, can indicate that a product, a service, or other item ("item") associated with a said reward icon 99 is available for a reward-eligible transaction 92, a type of transaction 80, and is eligible to qualify for a voucher-tag-object 12, wherein 1) activation of a said reward icon 99, or 2) any corresponding action to transact in association with a said reward icon 99, can initiate or consummate, and comprises, a reward-eligible transaction 92 in currency system 100 as described herein. A said reward icon 99 1) can further indicate information such as "Rewardable™," "Reward-Eligible™," "Reward Me™" or the like, applied to one or more, or all, items displayed, for example, on a page or in a website 888; and 2) can enable a consumer 130 to engage in a reward-eligible transaction 92 comprising one or more items that can qualify for a reward 16. A said reward icon 99 comprises an element of currency system 100 and can be associated with any website 888, app, POS terminal, or other display screen.

At process block 5012, a member 112 apparatus 807 (FIG. 1, and block 260, FIG. 2B) can capture, detect, or generate qualifying evidence 86 comprising collection of transaction data 87, identifiers 50, reward-eligible itemizations, participant 101 data, tags 35, and the like. Qualifying evidence 86 can be collected 1) directly at a member 112's POS system or website 888 electronically; 2) in a kiosk, a consumer 130 device, or other apparatus 800 that can read or capture data, for example, from a printed or electronic document 78 or receipt 77 by detecting, scanning, and optical character recognition methods, as provided in U.S. patent application Ser. No. 12/942,693, which is hereby fully incorporated; or 3) from a member 112 transmission to a network processor 102; or 4) at block 5030/5032. Additional data can be provided by a consumer 130 including a residence zip code, a phone number, a loyalty account number, and the like, said consumer-provided additional data added optionally to any merchant-generated data at block 5012, which can be useful for any purpose. A consumer 130 can be prompted to present at least one of an identifier 50 comprising a consumer 130 identifier 52, a session identifier 55, or the like, as described above, that can later serve as a source for generating a qualifying evidence 86 tag 46. A said identifier 50 is recorded for each transaction 80 in a rewards program 108. Except for a string 83 associated with a pre-enrolled account, that personally identifies a consumer 130 or that can be subject to restrictions such as PCI DSS, and that is captured and transmitted to a network processor 102 prior to completion of a transaction 80 (for example, in a payment authorization request prior to transaction 80 completion), any string 83, session data 85, or combination thereof that comprises an identifier 50 associated with a consumer 130 can be used to identify a transaction 80. A said identifier 50 associated with a consumer 130 is intended, as a source for generating a qualifying evidence 86 tag 46 as provided above and at block 5042 below, to enable identifying a transaction 80 and its corresponding qualifying evidence 86, not necessarily to personally identify a consumer 130, thereby distinguishing it, as it is used in currency system 100, from a conventional form of consumer identification.

Further in reference to block 5012, qualifying evidence 86 captured by a reward eligibility detecting module 826, described above, can include an itemization of reward-eligible and reward-ineligible items, wherein a reward-eligible total for reward processing (for example, the $40 described above at block 5010) can be distinguished from a transaction 80 total for payment processing (for example, the $48).

Further in reference to process block 5012, in at least some embodiments, if a consumer 130 tenders a payment for a total transaction 80 amount ($48 in the present example) by an electronic payment method, the payment process can require an authorization (code) from a payment network (or processor) 118, comprising an element of qualifying evidence 86. Transaction 80 processing may not occur without an authorization or other message that can come from a payment network (or processor) or a third party that is not necessarily associated with currency system 100. A total price and data for payment purposes can differ from qualifying evidence 86 and data compiled and assessed for purposes of qualification for a reward 16 at block 5160 (FIG. 5B), and can contain a different amount and other data.

At process block 5020, upon consumer 130 payment for a transaction 80, a first member 112 receives payment, thereby acquiring a paying customer, achieving its primary goal and a tangible result in the currency system 100. Payment (when associated with a rewardable behavior) typically comprises completion of a transaction 80. In an embodiment disclosed in U.S. patent application Ser. No. 12/942,693, transaction 80 completion signifies that a member 112 owns the elements collected at block 5012, since authorization, if performed by a payment network that can require a third party proprietary account identifier, is completed and consequently no third party controls qualifying evidence 86, an identifier 50, tags 35, or tag-objects 60 associated with a transaction 80. Ownership of these elements enables a member 112 to engage reward processing by currency system 100 that is independent of a payment network or processor.

At process block 5022, a member 112 or a reward system 110 can issue qualifying evidence 86, for example, in the form of data, a paper or electronic receipt 77, a data file 59; a transmission to a participant 101 apparatus 800, a website 888, a consumer 130 device or account 88; or an address-type destination such as an e-mail or social network address; or the like.

At process block 5030 (or block 5022), a recipient of the qualifying evidence 86 issued at block 5022 can engage in a first session 84 comprising an interaction between a participant 101 and an apparatus 800 in which the collected qualifying evidence 86 can be compiled into and comprise session data 85 by adding or generating a code that can identify a transaction 80. Elements of session data 85, including identifiers 50, can be compiled at a kiosk, in a consumer 130 device, a POS terminal, or an apparatus 800. Qualifying evidence 86 collected at blocks 5012 or 5022 can also comprise session data 85.

At process block 5032, several types of elements of session data 85 are illustrated as described above (at blocks 251 and 252, FIG. 2B) and apply to block 5030.

At process block 5034, session data 85 compiled at block 5030 is associated as needed with a data container 82, comprising an object 61 (block 254, FIG. 2B, and block 405, FIG. 4A) such as a document 78, a receipt 77, or a data file 59, rendering it in a physical object 61.

Process block 5040 illustrates an exemplary qualifying evidence 86 tag 46 generating module 812, as described above (at block 406, FIG. 4A), which is used for generating a qualifying evidence 86 tag 46 at block 5042 below.

At process block 5042, a qualifying evidence 86 tag 46 (block 407, FIG. 4A) is generated by a qualifying evidence 86 tag 46 generating module 812 (at block 5040) from one or more identifiers 50 captured or generated at one or more of blocks 5012, 5030, or 5032.

Process block 5050 illustrates an exemplary qualifying evidence 86 tag-object 65 generating module 814, as described above (at block 408, FIG. 4A), used for generating a qualifying evidence 86 tag-object 65 at block 5052 below.

At process block 5052, a qualifying evidence 86 tag-object 65 (block 409, FIG. 4A) is generated by a qualifying evidence 86 tag-object 65 generating module 814 (block 5050), using a qualifying evidence 86, an identifier 50, a qualifying evidence 86 tag, and an object 61.

At process block 5054, a qualifying evidence 86 tag-object 65 can be transmitted to a network processor 102 for qualification processing in process 5100. A said transmission can occur in a first session 84, for example at block 5030 (or 5012) upon a transaction 80, or in a later second session 84 that can occur after a transaction 80, such as a consumer 130 session 84 with a consumer 130 smart phone, a computer, a website 888, a kiosk, and the like. For example, a consumer 130 can collect qualifying evidence 86 from several transactions 80 over a period of time in a smart phone and can transmit to a network processor 102 several qualifying evidence 86 tag-objects 65 in a single session 84 or in several sessions 84, which can occur at any time, each transmission comprising an authorization request to issue one or more voucher-tag-objects 12. Transmission of a qualifying evidence 86 tag-object 65 can be initiated by any suitable apparatus 800 including a member 112 POS terminal, a consumer 130 apparatus 808 such as a smart phone, a mobile device, or a computer, or a reward system 110 device such as a kiosk in a shopping center 114, an automatic teller machine (ATM), a vending machine, or a device such as a terminal in a public space. Transmission can be directed to a network processor 102 server or through a participant 101 website 888 or the Internet.

Further at process block 5054, FIG. 5A, a reference qualifying evidence 86 tag 47, corresponding to a said transmitted qualifying evidence 86 tag-object 65, can be generated and recorded (not shown at block 5054), when a network processor 102 receives a said transmission, in a reference qualifying evidence 86 tag 47 database 921 (block 430, FIG. 4C).

At process block 5060, control passes to process block 5101 in FIG. 5B.

Referring now to FIG. 5B, qualifying process 5100 adds several steps that follow process block 5054 in FIG. 5A, as distinguished from processes 5200 and 5400 in FIG. 5B.

At process block 5101, process 5100 continues from process block 5060 in FIG. 5A.

Process block 5110 illustrates an exemplary qualifying evidence 86 tag-object 65 detecting module 822 that is used to detect a qualifying evidence 86 tag-object 65 and its elements in the next step at block 5120. This detecting module 822 can be located at a network processor 102 or any participant 101 and can consist of a detection module comprising a scanner, a transponder, or any detector suitable to detect a qualifying evidence 86 tag 46.

At process block 5120, a qualifying evidence 86 tag-object 65 detecting module 822 receives and detects a qualifying evidence 86 tag-object 65 transmitted at block 5054, FIG. 5A.

At process block 5130, a qualifying evidence 86 tag-object 65 received at block 5120 is validated, recorded, and stored in a database 90. Validation occurs by comparing a qualifying evidence 86 tag 46 associated with a received qualifying evidence 86 tag-object 65 to its corresponding reference qualifying evidence 86 tag 47 previously recorded at block 5054 and stored in a non-transitory medium in a reference qualifying evidence 86 tags 47 database 921 (block 430, FIG. 4C).

At process block 5140 (coupled with block 5141) a transaction 80 processor (not shown in FIG. 5B) associated with a network processor 102 executes a process to associate a current transaction 80 with other transactions 80 by a consumer 130, by using, as described above, a generated qualifying evidence 86 tag 46 QE1 contained in a qualifying evidence 86 tag-object 65 received at block 5120 and QE1s previously stored at block 5130 that are associated with other transactions-in-common 81 and that match the QE1 in a current transaction 80.

At process block 5141, three exemplary qualifying evidence 86 tag-objects 65 are shown, labeled QETgObj1, QETgObj2, and QETgObj3 (using the nomenclature at block 409, FIG. 4A), to illustrate transaction association provided at block 5140 (also block 610, FIG. 6).

At process block 5150, current rules 70 including qualification requirements 89 that were established at process block 316 in FIG. 3B, or updated in the interim, are determined.

At process block 5151, a rule 70 implementer 106 executes a process to determine whether, for qualification to earn a voucher-tag-object 12, a consumer 130 has exhibited the desired behavior satisfying the rewards program 108 rules 78 by comparing the qualifying evidence 86 in qualifying evidence 86 tag-objects 65 at blocks 5140 and 5141 to qualification requirements 89 (rules 70) at block 5150. Qualification in process 5100 can be performed by a rule 70 implementer 106 comprising any participant 101 by summing or assessing the plurality of consumer 130's reward-related transaction 80 amounts linked to a rewards program 108 or by engaging in one or more rule 70-required behaviors. In another embodiment, qualification can be performed independently in process 5200 by a reward system 110 or a third party 150 and not by currency system 100, as shown at blocks 5200 to 5240, FIG. 5B as described above. In a typical embodiment, this step at block 5151 can occur in each of several transactions 80 that do not yet satisfy qualification requirements 89, but that lead progressively toward qualification that can be achieved in a future transaction 80.

At process block 5160, a rule 70 implementer 106 determines satisfaction of qualification requirements 89 (rules 70) to earn a reward 16 with a reward currency 11.

At process block 5161, a determination is made if the rules 70 requirements are met.

At process block 5170, when the rules 70 or the qualification requirements 89 are not satisfied or at any step at any time, a message 91 or adaptive voucher-tag-object 22 can be transmitted or conveyed via a communications system from any participant 101, apparatus 800, website 888, or entity to any participant 101 or person.

At process block 5171, when the rules 70 or qualification requirements 89 are satisfied, a message 91 or adaptive message 22 can be transmitted as described at block 5170.

At process block 5180, control passes to process block 5500 in FIG. 5C.

Referring again to FIG. 5B, process 5200, comprising blocks 5210, 5220, 5230, and 5240, illustrates steps for a voucher-tag-object 12 request comprising instructions 201 by a reward system 110, a third party 150 or other participant 101, herein called an instructing entity for purposes of process 5200. Process 5200 provides an alternative method to generate an interoperable voucher-tag-object 12 independently of qualification in process 5100, yet utilizing currency system 100 features and resources. This process 5200 can be suitable for a payment network 118, a merchant, or any entity that wishes to use voucher-tag-objects 12, a reward currency 11, rewards 16, reward providers 120, or other resources of currency system 100, or that otherwise does not require qualification to be performed by currency system 100.

At process block 5210, instructions 201 are compiled by a said instructing entity for a network processor 102 to generate and issue voucher-tag-objects 12 or other reward currency 11. It is assumed that the instructing entity has enrolled in currency system 100 and is configured, as provided above in process 320 in FIG. 3B. Among its functions, said instructions 201 can 1) establish a quantity of voucher-tag-objects 12 to issue; 2) allocate costs for voucher-tag-objects 12 and associated voucher fees 18; 3) establish rules 70, terms, restrictions, and the like that apply to voucher-tag-objects 12 to issue; 4) convey messages 91 and adaptive voucher-tag-objects 22; and 5) can replace or substitute for a proprietary reward currency of a third party 150. Any voucher-tag-object 12 issued as a result of an instruction 201 i) is functionally equivalent to one issued when currency system 100 performs the qualification function in process 5100, ii) is interoperable, and iii) can be aggregated for redemption as provided herein.

At process block 5220, instructions 201 compiled at process block 5210 are transmitted to and received by a network processor 102.

At process block 5230, a message 91 can be delivered to a consumer 130, for example, at a member 112's POS terminal, on a consumer interface 132 or in a website 888.

At process block 5240, control passes to process block 5540, FIG. 5C.

Process 5300, not shown in FIG. 5B, is a similar process by which a network processor 102 can on its own initiative, independently of a reward system 110, issue a voucher-tag-object 12 or reward currency 11 to sell or use for any purpose. It can determine the instructions 223, quantity, denomination, rules 70, terms, etc.

Referring now to FIG. 5C, an example voucher-tag-object 12 generation process 5400 is illustrated, generally at 5400.

At block 5500, example process 5400 continues from block 5180, FIG. 5B.

At process block 5510, rules 70 (set at block 316, FIG. 3B), further comprising instructions 223, for a voucher-tag-object 12 to be generated, are determined by a reward system 110. Said rules 70 can be set, modified, and executed by a network processor 102 comprising a rule 70 implementer 106 in blocks 5210 (FIG. 5B), 5510, 5520, 5530, and 5830 (FIG. 5C), and 770 (FIG. 7), and can comprise but are not limited to interoperability rules 71, qualification requirements 89, quantity rules, cost allocation rules, reward fee 20 rules, and redemption rules.

At process block 5520, a rule 70 implementer 106 can determine, in accordance with rules 70 determined at block 5510, a quantity of voucher-tag-objects 12 to generate as well as their denomination, redemption terms, restrictions, and the like. In the present example, if the transactions-in-common 81 associated with a consumer 130 collectively satisfy rules 70 by totaling at least $120 in reward-eligible purchases in seven days, a consumer 130 is eligible to receive one or more voucher-tag-objects 12 with a total value of ten dollars ($10).

At process block 5530 a network processor 102 can identify, based on rules 70 determined at process block 5510, redemption terms for one or more voucher-tag-objects 12 to be generated, including an expiration date and any restrictions as discussed above.

At process block 5540, a network processor 102 commences to perform database 90 functions associated with a determined quantity of voucher-tag-objects 12 to be generated, including functions in blocks 5550, 5610, 5700, 5710, 5720, 5730, and 5820, all in FIG. 5C

At process block 5550 a network processor 102 can record data corresponding to a session 84, a consumer 130, a member 112, a reward system 110, an identifier 50, a qualifying evidence 86 tag 46 (generated at block 5042, FIG. 5A) and other data as may be required.

Process block 5600 illustrates an exemplary voucher identity tag 14 generating module 830 (block 411, FIG. 4B) used to generate a voucher identity tag 14 at block 5610.

At process block 5610 a network processor 102, in association with a voucher tag 14 generating module 830, generates and associates a unique voucher identity tag 14 with each generated voucher-tag-object 12, as set forth above, and records corresponding data in voucher-tag-objects database 900, and other databases 90 as may be required.

At process block 5620, a reference voucher identity tag 15 is generated when a voucher identity tag 14 is generated at block 5610, and is recorded in reference voucher identity tags 15 database 923 (block 450, FIG. 4C).

At process block 5700 a network processor 102 can associate each generated voucher-tag-object 12 with an interoperability tag 30 generated at block 5006, FIG. 5A and record a corresponding reference interoperability tag 31 and a timestamp as provided above.

At process block 5710 a network processor 102 can associate and record for each voucher-tag-object 12 restrictions such as an expiration date, rewards program 108 rules 78, and redemption terms in appropriate databases 90, per rules 70 set at block 5510.

At process block 5720 a network processor 102 can apply to a voucher-tag-object 12 one or more anti-fraud measures, privacy measures, and identity protection measures. Methods of applying said measures include but are not limited to 1) applying a code, as set forth above, to tags 35, tag-objects 60, elements comprising a unit of reward currency 11, a voucher-tag-object 12, an apparatus 800, a website 888, a transaction 80, an instance of reward currency 11 generation, a reward currency 11 exchange for a reward 16, a session 84, a message 91, use of an identifier 50 comprising an identifier that does not personally identify a consumer, a participant 101, a communication or data transmission, and an instance or result of data collection, detection, processing, transmission, or storage, upon their configuration, generation, or use, and 2) detecting a said code, for example at blocks 314 and 334, FIG. 3B. Said anti-fraud and other measures can further comprise fingerprint, biometric, and similar safeguards; encryption, encoding, and data security measures; voucher-tag-object 12 issuance, validity, and redemption steps; anti-virus, anti-malware, anti-spyware, Internet security measures; and data security measures. Voucher-tag-objects 12 and other elements can be further associated with anti-fraud methods as set forth in U.S. patent application Ser. No. 12/942,693 and U.S. patent application Ser. No. 13/959,393, which are hereby fully incorporated.

At process block 5730 a network processor 102 can associate a generated voucher-tag-object 12 with a consumer 130 identifier 52 and members 112 at which qualifying spending or other behaviors occurred, and with data collected at blocks 5012 and 5030, FIG. 5A, and 5120, FIG. 5B, and other data. The data recorded at block 5730 can enable determination of each member 112's voucher fee 18 share to be collected at process block 5840 below.

Process block 5800 illustrates an exemplary currency outputting module 840, as described above (at block 415, FIG. 4B), used to generate a quantity of voucher-tag-objects 12.

At process block 5810, a network processor 102 can generate (output or issue to a consumer 130) a determined quantity of units of interoperable voucher-tag-objects 12. In one embodiment, a reward system 110 or a third party 150 can authorize issuance pursuant to process 5200, FIG. 5B, wherein a network processor 102 can then generate a voucher-tag-object 12. Generating or outputting of voucher-tag-objects 12 can be performed by any apparatus 800 configured as a currency outputting module 840. A message 91 or adaptive voucher-tag-object 22 can also be issued at block 5810 (not shown in FIG. 5C).

At process block 5820 a network processor 102 generates and, if necessary, transmits records associated with generated voucher-tag-objects 12, with corresponding tags 35 and data, for databases 90 of participants 101.

At process block 5830, a network processor 102 determines a voucher fee 18 amount due from each member 112, reward system 110, or third party 150 (e.g., a sponsor that shares costs), based on rules 70 determined at block 5510, FIG. 5C. Each participant 101's voucher fee 18 share can be calculated by any calculation method as agreed with a network administrator 104. While a total voucher fee 18 can equal the face value of voucher-tag-objects 12 generated, each member 112's share of a corresponding voucher fee 18 may be only a portion of the generated face value. For example, a total voucher fee 18 of $10 can be collected upon issuance of $10 in voucher-tag-objects 12, while a particular member 112's voucher fee 18 can be collected in proportion to its share of benefits received, that is, in that proportion to which its own transaction 80 bears to a reward-eligible total spent among a plurality of members 112. For example, a first shopping center member 112 can receive a $40 payment for a consumer 130 purchase. The purchase can be coupled with one or more additional consumer 130 purchases that total at least $80 among a second and third member 112 in the same shopping center 114. The combined amount of the purchases ($40+$80) satisfies a spending threshold of $120, which qualifies a consumer 130 to receive voucher-tag-objects 12 with a total face value of $10. To calculate each member 112's share of the voucher fee 18, the first member 112 can pay a one-third share of the voucher fee 18, corresponding to the share of spending received by the first member 112 in proportion to the total spent by the consumer 130 ($40/$120=⅓). That share (⅓) is then applied to the voucher fee 18 ($3.33 is one-third of $10). Hence, the first member 112 pays a $3.33 voucher fee 18 after receiving $40.00 in spending. By this method, the whole fee is paid yet each member 112 pays only in proportion to the benefit it receives. A fourth member 112 that receives no spending pays no voucher fee 18. In another embodiment, a reward system 110 can pay all or a portion of a voucher fee 18, the balance paid by its members 112 or other parties. In another embodiment, all or part of the voucher fee 18 can be paid by a sponsor, manufacturer, or other third party 150 as shown at arrow 190, FIG. 1. In each instance, a generated voucher-tag-object 12 is backed by a collected voucher fee 18 to sustain a reward fee 20 and other costs. Generating a voucher-tag-object 12 in currency system 100 can occur immediately at the POS upon a qualifying purchase and is not contingent upon prior receipt of payment by a payor of a voucher fee 18.

At process block 5840, a network processor 102 collects the voucher fees 18 due, as determined at process block 5830, generally by delivering an invoice to each payor for a time period. Collected voucher fees 18 can be deposited in one or more financial institutions, depositories, and the like. Each depository can maintain an apparatus and corresponding database in communication with the currency system 100 databases 90, to record relevant data.

At process block 5850, the process 5400 is repeated for each additional transaction 80 associated with a consumer 130, including transactions 80 at different reward systems 110, starting again at process block 5010.

Example Elements in A Voucher-Tag-Object 12 Redemption Process

Referring now to FIG. 6, a simplified example process is illustrated, generally at 600, for a consumer 130 to receive a generated voucher-tag-object 12 leading to its redemption for a reward 16. FIG. 6 illustrates selected elements of qualification process 5100 shown in FIGS. 5A and 5B, voucher-tag-object 12 generation process 5400 shown in FIG. 5C, and voucher-tag- object 12 redemption process 700 shown in FIG. 7.

At process block 610, three exemplary qualifying evidence 86 tag-objects 65 QETgObj 1, QETgObj 2, and QETgObj 3 are illustrated that comprise elements, shown under "Component Elements," associated with three transactions 80 executed by a consumer 130: 1) in a reward system 110 ("A"), 2) at different members 112 ("1", "2", and "3"), 3) each transaction 80 having its own qualifying evidence 86 ("X", "Y", and "Z"), 4) each transaction 80 associated with the same consumer 130 identifier 52 ("IDy") (a type of identifier 50), and 5) each associated with the same generated qualifying evidence 86 tag 46, QE1, wherein "IDy" comprises a common source element for generating identical QE1 tags These same components are also shown at blocks 401, 402, 403, 404, 405, 407, and 409 in FIG. 4A. Process blocks 610 and 620 illustrate simplified steps from block 5010, FIG. 5A, through block 5820, FIG. 5C, inclusive. Said three exemplary qualifying evidence 86 tag-objects 65 are depicted at block 409, FIG. 4A, generated at process block 5052, FIG. 5A, received and detected at block 5120, FIG. 5B, recorded at block 5130, FIG. 5B, and associated at blocks 5140 and 5141, FIG. 5B.

At process block 620, an exemplary voucher-tag-object 12 VTgObj1 is illustrated, which results from associating the three qualifying evidence 86 tag-objects 65 shown at block 610 and satisfying qualification requirements 89. Exemplary voucher-tag-object 12 VTgObj1 is shown at block 416, FIG. 4B, generated at block 5810 and recorded at block 5820, FIG. 5C.

At process block 622 (under the Component Elements column), exemplary components of voucher-tag-object 12 VTgObj1 at block 620 are illustrated. A voucher 10 "V1" is shown associated with a voucher identity tag 14 "vid1" and an interoperability tag 30 "i4".

At process block 640, four exemplary voucher-tag-objects 12 VTgObj1, VTgObj2, VTgObj3, and VTgObj4 are illustrated, signifying that they are aggregated by a consumer 130 to obtain a greater reward 16, as described above. These four voucher-tag-objects 12 are aggregated by a consumer 130 at block 710, FIG. 7, submitted at block 714, detected at block 722, validated at block 724, authorized at block 730, exchanged (redeemed) at block 732, and a fee paid at block 770, as further described below.

At process block 642, the interoperability tags 30, "i4", "i5", "i6", and "i7", corresponding to said voucher-tag-objects 12 VTgObj1, VTgObj2, VTgObj3, and VTgObj4, are illustrated, also shown at block 414, FIG. 4B. These different interoperability tags 30 signify that the four voucher-tag-objects 12 were each issued with a different timestamp, further corresponding to records in reference interoperability tags 31 database 922 (block 440, FIG. 4C).

At process block 644, the voucher identity tags 14 "vid1", "vid2", "vid3", and "vid4", also shown at block 412, FIG. 4B, correspond to said exemplary voucher-tag-objects 12 VTgObj1, VTgObj2, VTgObj3, and VTgObj4 and further correspond to records in reference voucher identity tags 15 database 923 at block 450, FIG. 4C.

At process block 650, a reward 16 is illustrated that is exchanged for the four aggregated voucher-tag-objects 12 shown at block 640. In FIG. 6, block 650 corresponds to block 732 in FIG. 7 which describes redemption process 700 in detail.

Example Voucher-Tag-Object 12 Redemption Process 700

Referring now to FIG. 7, a detailed example voucher-tag-object 12 redemption process 700 in currency system 100 is illustrated, generally at 700. Prior to inception of process 700, elements for a reward provider 120 are set up and configured as provided at blocks 330 to 336, FIG. 3B, enabling exchange or redemption of one or more voucher-tag-objects 12 for a reward 16. Voucher-tag-object 12 redemption is subject to rewards program 108 rules 78, terms, and conditions, for example, a voucher-tag-object 12 expiration date.

Further in reference to redemption process 700, one or more configured apparatuses 800 associated with a participant 101 can be employed for voucher-tag-object 12 redemption, including a currency redemption module 850 (at block 720) comprising a reader, detector, scanner, or device to redeem, exchange, or process any form of a voucher-tag-object 12 or a reward currency 11, to capture tags 35 including a voucher identity tag 14 and an interoperability tag 30, and data, and to communicate with a network processor 102. Technologies for voucher-tag-object 12 redemptions can include NFC, Bluetooth, radio frequency identification (RFID), the Internet, websites 888, a telephone network, social networks, or any technology or machine associated with a processor by which tags 35 and data can be detected and processed for a voucher-tag-object 12 to be redeemed. In one example, a currency redemption module 850 can detect a unique voucher identity tag 14 associated with a submitted voucher-tag-object 12 with a bar code reader, or can be configured for redemption-related data entry using a key pad. In another example, a consumer 130's smartphone or other object 61 associated with a voucher-tag-object 12 can interact with an RFID-enabled or NFC-enabled transponder associated with a merchant's POS equipment, or can access an account 88 stored in a "cloud" computing environment and transmit data to and from a reward provider 120 apparatus 809.

At process block 702, an example redemption is enabled when a consumer 130 receives one or more redeemable voucher-tag-objects 12 at block 5810, FIG. 5C. A consumer 130 can receive a plurality of voucher-tag-objects 12 at different times in one or more rewards programs 108 associated with one or more reward systems 110, and can aggregate and accumulate valid voucher-tag-objects 12 from any source for redemption, combining their values to exchange for a single reward 16, if so desired.

At process block 704, a consumer 130 can be informed of and can determine currently available reward provider 120 and reward 16 choices. Reward providers 120 and their rewards 16 can change from time to time, so determination of currently available rewards 16 can be required. Reward choice information can be available through several channels including at member 112 stores, or at a website 888 associated with a participant 101, or by accessing a consumer 130 account 88. Similar information can be accessed by means of messages 91, software apps, advertising, signs, and other media or channels. In one embodiment, a consumer 130 can determine a desired available reward 16 and its exchange value, that is, the face value of voucher-tag-objects 12 required to obtain the desired reward 16, which corresponds to the "price" of the reward 16. Additional information can disclose a reward provider 120's location and contact information, redemption rules 70, restrictions, expiration dates, and the like, to ensure that exchange for a desired reward 16 is feasible with a consumer 130's available voucher-tag-objects 12. In one embodiment, a voucher-tag-object 12 can be redeemed for an entry, as a reward 16, in a sweepstakes, a lottery, a game or gaming system, for example, to win or receive prize value. Operators of such systems are deemed to be reward providers 120.

At process block 706, a consumer 130 can compile voucher-tag-objects 12 or access a consumer 130 account 88 to determine available voucher-tag-objects 12 and aggregated value.

At process block 708, a consumer 130 can select a reward provider 120 that is active and that provides a desired reward 16, and can determine that the voucher-tag-object 12 total value or quantity required for redemption for a reward 16 matches the consumer 130's available voucher-tag-objects 12. Each voucher-tag-object 12 must be valid to be redeemed, wherein a consumer 130 further determines applicable rules 70 and restrictions.

At process block 710, if several voucher-tag-objects 12 are needed for a reward 16, a consumer 130 can aggregate the required quantity and value of voucher-tag-objects 12 from any sources, including several unaffiliated reward systems 110, trades, or purchases, including physical voucher-tag-objects 12 and electronic voucher-tag-objects 12 in an account 88.

At process block 712, a consumer 130 can physically visit or access online, by phone, or by any other method, a selected reward provider 120. At this point, a reward provider 120 can obtain a customer, generally satisfying its main marketing purpose, and can engage in various marketing techniques to inform and impress a consumer 130 about its goods and services, request consumer 130 contact information for future marketing, make offers, and the like.

At process block 714, a consumer 130 can present to a reward provider 120 one or more voucher-tag-objects 12 having a total face value corresponding to the designated reward 16 value ("price"). To do so, a consumer 130 can use a device with a consumer interface 132 shown in FIG. 1; transmit voucher-tag-objects from the consumer 130's account 88; present physical voucher-tag-objects 12; or submit voucher-tag-objects 12 by any method.

Process block 720 illustrates an exemplary currency redemption module 850 used to redeem a voucher-tag-object 12.

At process block 722, an exemplary reward provider 120's currency redemption module 850, further comprising an interoperability rule 71 module 802 applying interoperability rules 71, can detect or capture a voucher identity tag 14 and an interoperability tag 30, and collect data corresponding to each presented voucher-tag-object 12, and transmit it to a network processor 102 by any suitable apparatus 800 including by a reward provider 120's POS terminal or a consumer 130's smart phone. A said transmission comprises an authorization request.

At process block 724, upon receipt, a network processor 102 can authenticate a received voucher identity tag 14 and interoperability tag 30 associated with a voucher-tag-object 12 to determine if it is valid or invalid. A voucher identity tag 14 can be assessed by comparing it to various database 90 records, for example, to ensure that a voucher-tag-object 12 has not expired, that it has not been previously redeemed, and that it satisfies restrictions. Further, a voucher identity tag 14 can be compared to a reference voucher identity tag 15 in a reference voucher identity tags 15 database 923 (FIG. 4C), while an interoperability tag 30 can be compared to a reference interoperability tags 31 database 922 (FIG. 4C). Fraud detection, anti-fraud and other measures, including those at block 5720, FIG. 5C, can be applied to determine that a voucher-tag-object 12 has not been fraudulently used or abused, for example, by attempting to counterfeit or duplicate it.

At process block 725, a determination is made that a submitted voucher-tag-object 12 is valid or invalid.

At process block 726, if a voucher-tag-object 12 is deemed invalid or not authorized, a network processor 102 can transmit a rejection or message 91 that can include a rejection reason and an adaptive voucher-tag-object 22 to promote further spending, advertising, or information to a consumer 130.

At process block 728, if a submitted voucher-tag-object 12 is deemed valid, control passes to block 730.

At process block 730, when a voucher-tag-object 12 is deemed valid, a network processor 102 can transmit an authorization for a reward provider 120 to exchange a valid voucher-tag-object 12 for a reward 16 and to submit the voucher-tag-object 12 for payment of a reward fee 20. A said transmission can further include a timestamp, an adaptive voucher-tag-object 22, a message 91, and data. Upon authorization or rejection, a voucher-tag-object 12 record can be updated in databases 90 and accounts 88. In one embodiment, for certain reward providers 120 or if a connection or transmission fails, a voucher-tag-object 12 can be redeemed without an authorization signal, wherein accounts 88 can be settled following redemption.

At process block 732, a reward provider 120, having received an authorization, can exchange one or more authorized valid voucher-tag-objects 12 for a desired reward 16. In various redemptions, redeemed voucher-tag-objects 12 can have the same, or more, or less value than the reward 16 being exchanged. If a reward 16 to be exchanged has the same value as the voucher-tag-objects 12 submitted, a straight exchange of voucher-tag-objects 12 can be made for the reward 16. If a reward 16 to be exchanged has a greater value than the voucher-tag-objects 12 submitted, if acceptable to the reward provider 120, a consumer 130 can elect to apply voucher-tag-objects 12 as partial payment toward a higher priced reward 16 and pay the balance by any acceptable payment method. If a reward 16 to be exchanged has a lower price than the voucher-tag-objects 12 submitted, new voucher-tag-objects 12 can be generated or authorized as "change" for remaining unredeemed value, credited to a consumer 130's account 88. A voucher fee 18 may already be collected by a network administrator 104 for vouchertag-objects 12 that have remaining value. In one embodiment, excess voucher-tag-object 12 value can be retained, for example, by a network administrator 104. Further at process block 732, a reward provider 120 can signal a network processor 102 to identify a reward 16 exchanged.

At process block 740, a network processor 102 can disqualify or invalidate each redeemed voucher-tag-object 12 for further use, trade, or future redemption, update records as needed in databases 90, and prepare reports, analytics, and perform other steps.

At process block 750, reward fee 20 rules are determined, typically between a reward provider 120 and a network administrator 104, for a reward fee 20 payable upon submission of a voucher-tag-object 12 for reimbursement. Said reward fee 20 rules can be implemented by a rule 70 implementer 106, can be set or modified at any time, and can comprise but are not limited to redemption rules, terms in a negotiated reward fee agreement, and rewards program 108 rules 78. Each voucher-tag-object 12 can be associated with a rate, an amount, or other reimbursement in accordance with an applicable reward provider 120 contract. A reward fee 20 can be payable to reimburse a reward provider 120 in full or in part for the cost of a reward 16. Reward fee 20 amounts, terms, and the like can be established in a competitive bidding market and system as disclosed in U.S. patent application Ser. No. 12/942,693, which is hereby fully incorporated.

At process block 760, a reward provider 120 can submit one or more authorized redeemed voucher-tag-objects 12 to a network administrator 104 to obtain a reward fee 20.

At process block 770, a network administrator 104, coupled with a network processor 102 and a rule 70 implementer 106, can pay a reward fee 20 to a reward provider 120 in accordance with the reward fee 20 rules established at block 750. Each redeemed voucher-tag-object 12 can be recorded in a reward provider 120's account 88. Voucher-tag-objects 12 can be reconciled, reward fees 20 paid, and accounts 88 settled with one or more payments of a reward fee 20 in a time period. In some cases, a reward provider 120 can also serve as a member 112 that owes voucher fees 18, wherein all accounts 88 can be settled at once. Reward fees 20 can be disbursed by a network administrator 104 by any method. For example, a depository that receives voucher fees 18 can be utilized to disburse reward fees 20. Its corresponding database can record all relevant data. Reward fees 20 can be disbursed by fund transfer, check, credits to an account 88, or by any other method. A payment of a reward fee 20 provides the agreed tangible value of a voucher-tag-object 12 to a reward provider 120 to offset its cost of fulfilling a reward 16. In one embodiment, a reward fee 20 can be paid to any entity as a reward provider 120 approved by the network administrator 104, not necessarily to a contracted reward provider 120. For example, a non-profit charity as a reward provider 120 that receives donated voucher-tag-objects 12 can receive a reward fee 20 upon submission for reimbursement.

Voucher-Tag-Object 12 Sales. Trade, and Distribution

In one embodiment of currency system 100, pursuant to methods disclosed above, new voucher-tag-objects 12 can be generated, sold, or otherwise distributed by any participant 101 for any purpose, subject to network administrator 104 approval and management. For example, a participant 101 can generate and sell voucher-tag-objects 12 in bulk at, say, 50% or 75% of face voucher, thereby increasing the quantity of voucher-tag-objects 12 in circulation. Each valid voucher-tag-object 12 represents a likely redemption, driving traffic to reward providers 120, reward systems 110, and their members 112. Increasing voucher-tag-object 12 circulation can serve participant 101 interests. There are many purposes for a buyer to purchase voucher-tag-objects 12 in bulk, for example, an employer can provide bonuses to employees or a marketer can offer voucher-tag-objects 12 as a premium.

In one embodiment, the present invention provides for a proprietary reward currency (e.g., points) used by a reward system 110, such as a payment network 118, to be converted into, replaced by, or exchanged for voucher-tag-objects 12, for example, to enable its customers to aggregate voucher-tag-objects 12 and redeem them at reward providers 120. This can be done by an instruction from a reward system 110 under process 5200 as provided above.

Valid interoperable voucher-tag-objects 12 received by any method, possessed, or held can be transferred, bought, sold, traded, bartered, exchanged, conveyed, auctioned, gifted, donated, acquired, or transacted (herein called "traded") for any reason as may be agreed between any two parties, subject to provisions described herein.

Additional Configuration Considerations

Throughout this specification, plural instances can implement apparatuses 800, machines, modules 801, components, operations, or structures described as a single instance. Although individual operations of one or more methods are illustrated and described as separate operations, one or more of the individual operations can be performed concurrently, and nothing requires that the operations be performed in the order or sequence illustrated. One or more process or method steps can be omitted or one or more process or method steps can be added. Structures and functionality presented as separate components in example configurations can be implemented as a combined structure or component. Similarly, structures and functionality presented as a single component can be implemented as separate components. One or more processes or method steps can include a novel combination of separate components or operations that can exist in a dissimilar combination in an unrelated system. These and other variations, modifications, additions, and improvements fall within the scope of the subject matter herein. While various embodiments have been described they are not mutually exclusive and can be used in combination. Further, where there are a plurality of possible combinations, no preference is given any particular combination.

Certain embodiments are described herein as including logic or a number of components, modules 801, engines, or mechanisms. Modules 801 can constitute either hardware modules or tangible software modules (e.g., code embodied on a machine-readable medium). A hardware module is a tangible unit capable of performing certain operations and can be configured or arranged in a certain manner. In example embodiments, one or more computer systems (e.g., a standalone, client or server computer system) or one or more hardware modules of a computer system (e.g., a processor or a group of processors) can be configured by tangible software modules (e.g., an application or application portion) as a hardware module that operates to perform certain operations as described herein, e.g., as described or associated with respect to FIGS. 1, 2A, 2B, 3B, 4A, 4B, 5A, 5B, 5C, 6, and 7.

In various embodiments, a hardware module can be implemented mechanically or electronically. For example, a hardware module can comprise dedicated circuitry or logic that is permanently configured (e.g., as a special-purpose processor, such as a field programmable gate array (FPGA) or an application-specific integrated circuit (ASIC)) to perform certain operations. A hardware module can also comprise programmable logic or circuitry that is temporarily configured by a tangible software module to perform certain operations. It will be appreciated that the decision to implement a hardware module mechanically, in dedicated and permanently configured circuitry, or in temporarily configured circuitry (e. g., configured by a tangible software module) can be driven by cost and time considerations.

Accordingly, the term "hardware module" should be understood to encompass a tangible entity that is physically constructed, permanently configured (e. g., hardwired), or temporarily configured (e.g., programmed by a tangible software module) to operate in a certain manner or to perform certain operations described herein. As used herein, "hardware-implemented module" refers to a hardware module. Considering embodiments in which hardware modules are temporarily configured (e.g., programmed by a tangible software module), each of the hardware modules need not be configured or instantiated at any one instance in time.

Hardware modules can provide information to, and receive information from, other hardware modules. Accordingly, the described hardware modules can be regarded as being communicatively coupled. Where multiples of such hardware modules exist contemporaneously, communications can be achieved through a transmission (e.g., over appropriate circuits and buses) that connects the hardware modules. In embodiments in which multiple hardware modules are configured or instantiated at different times, communications between such hardware modules can be achieved, for example, through the storage and retrieval of tags 35 and information in tangible memory structures to which the multiple hardware modules have access. For example, one hardware module can perform an operation and store the output of that operation in a tangible memory device to which it is communicatively coupled, e.g., as described or associated with respect to FIGS. 1, 2A, 2B, 3B, 4A, 4B, 5A, 5B, 5C, 6, and 7. A further hardware module can then, at a later time, access the tangible memory device to retrieve and process the tangibly stored output. Hardware modules can also initiate communications with input or output devices, and can operate on a resource (e.g., a tag 35 or a set of information).

Similarly, the methods described herein can be processor-implemented. For example, a method can be performed by one or more processors or processor-implemented hardware modules. The performance of certain of the operations can be distributed among the one or more processors, not only residing within a single machine, but deployed across a number of machines. In some example embodiments, the one or more processors or processor-implemented modules 801 can be located in a single geographic location (e. g., within a network processor 102, reward system 110, a member 112, a reward provider 120, a third party 150, a home or office environment, a consumer 130 location, or a server farm). In other example embodiments, the one or more processors or processor-implemented modules 801 can be distributed across a number of geographic locations.

The one or more processors can also operate to support performance of the relevant operations in a "cloud computing" environment. For example, at least some of the operations can be performed by a group of computers (as examples of machines including processors), these operations being accessible via a network (for example, the Internet) and via one or more appropriate interfaces.

Some portions of this specification are presented in terms of algorithms or symbolic representations of operations on data or of operations that use the data and tags 35 stored as bits or binary digital transmissions within a tangible machine memory or other medium (e.g., a computer memory, or within an object 61 including a non-transitory machine-readable medium including a non-volatile memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical entities, tags 35, tag-objects 60, or quantities, that is, tangible embodiments embedded in a physical memory or medium. Such physical elements can take the form of electrical, magnetic, or optical embodiments capable of being stored, accessed, transferred, combined, compared, or otherwise manipulated by a machine. It is convenient at times, principally for reasons of common usage, to refer to such transmissions using words such as "voucher," "voucher-tag-object," "currency," "reward currency," "points," "identifier, " "consumer identifier," "voucher identifier," "voucher identity tag," "universal transaction associating identifier," "session identifier," "tag," "interoperability tag," "qualifying evidence tag," "tag-object," "digital signature," "string," "signal," "interoperable element," "reward," "rule," "terms," "timestamp," "rate," "message," "adaptive voucher-tag-object," "adaptive message," "element," "data," "session data," "content," "bits," "value," "amount," "symbol," "digit," "character," "number," "numeral," or the like. These words, however, are merely convenient labels and are to be associated respectively with appropriate tangible, physical elements, tags 35, entities, or embodiments embedded in a physical memory, medium, tag-object 60, or object 61. One or more said elements can be associated with data, yet not comprise data in its transitory or ethereal form. Said elements can further have tangible causes and effects, can be tied to a specific structure, architecture, or machine, and can be part of a process that leads to a significant tangible result.

Unless specifically stated otherwise, discussions herein using words such as "processing," "computing," "calculating," "determining," "assessing," "presenting," "displaying," or the like can refer to actions or processes of a machine (e.g., a computer) that manipulates or transforms data and tags 35 represented as physical (e.g., electronic, magnetic, or optical) embodiments, elements, or quantities within one or more memories (e.g., volatile memory, non-volatile memory, or a combination thereof), registers, objects 61, or other machine components that receive, store, transmit, or display information.

A voucher-tag-object 12 can be a physical and tangible real world item that is electronically represented in a database 90 or an object 61 as described above. The generation of voucher-tag-objects 12 can transform the tangible electronic representation of the voucher-tag-object 12 into a tangible physical voucher-tag-object 12, or into a voucher-tag-object 12 associated with a tangible voucher identity tag 14 rendering the voucher-tag-object 12 itself a physical entity, exchangeable for a tangible, real world reward 16. This transformation of a tangible electronically represented voucher-tag-object 12 into a tangible physical voucher-tagobject 12 that is exchangeable for a real world reward 16 is accomplished using the techniques described or associated, e.g., with respect to FIGS. 1, 3B, 4A, 4B, 5A, 5B, 5C, 6, and 7.

As used herein any reference to "one embodiment" or "an embodiment" or an "example" or "exemplary" means that a particular element, feature, structure, or characteristic described in connection with the embodiment is included in at least one embodiment. The appearances of the phrase "in one embodiment" or "example" in various places in the specification are not necessarily all referring to the same embodiment or example.

Some embodiments can be described using the expression "coupled" and "connected" along with their derivatives. For example, some embodiments can be described using the term "connected" to indicate that two or more elements are in direct physical or electrical contact with each other. In another example, some embodiments can be described using the term "coupled" to indicate that two or more elements are in direct physical or electrical contact. The term "coupled," however, can also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, system, tag-object 60, voucher-tag-object 12, identifier 50, or apparatus 800 that comprises a list of elements is not necessarily limited to only those elements but can include other elements not expressly listed or inherent to such process, method, article, system, tag-object 60, voucher-tag-object 12, identifier 50, or apparatus 800. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" or "the" are employed to describe elements and components of the embodiments herein. This is done merely for convenience and to give a general sense of the disclosed configuration. This description should be read to include one or at least one and the singular also includes the plural unless it is obvious that it is meant otherwise.

Upon reading this disclosure, those of skill in the art will appreciate still additional alternative structural and functional designs for a system, an apparatus, and a process for electronically generating a general reward currency 11, comprising voucher-tag-objects 12, rewards 16, tags 35, and tag-objects 60 through the disclosed principles herein. Thus, while particular embodiments and applications have been illustrated and described, it is to be understood that the disclosed embodiments are not limited to the precise construction and components disclosed herein, and the disclosure is to be accorded the widest scope consistent with the principles and features disclosed herein. Various modifications, changes and variations, which will be apparent to those skilled in the art, can be made in the arrangement, operation, and details of the methods and apparatuses disclosed herein without departing from the spirit and scope defined in the appended claims. The above description of the disclosed embodiments is provided to enable any person of ordinary skill in the art to make or use the disclosure.

What is claimed is:

1. An apparatus comprising:
   a consumer interface; and
   at least one currency outputting module for generating at least one of a unique tag and a corresponding tag-object, configured in accordance with at least one interoperability rule; and
   a network processor associated with the at least one currency outputting module and further associated with a currency system comprising a computer network and further comprising a computer system and further comprising at least one of a plurality of disparate groups comprising at least one of a plurality of unaffiliated and affiliated reward systems and further comprising participants and further comprising at least one of a participant comprising at least one of a member and a reward provider having at least one of a physical location and a website); and
   a machine readable non-transitory medium coupled to the network processor, the machine readable non-transitory medium comprising:
      a rule module associated with the at least one interoperability rule; and
      a unique tag embodied thereon for executing the at least one interoperability rule; and
      a first database comprising at least one of a plurality of database records, each database record corresponding to at least one unit of a plurality of units of an interoperable reward currency; and
      at least one instruction embodied thereon, executable by the network processor communicatively coupled to the consumer interface and the rule module and the unique tag; and
   wherein the at least one instruction, when executed causes the network processor to:
   configure the apparatus and the computer network for interoperability of at least one unit of a plurality of units of interoperable reward currency among the at least one of a plurality of unaffiliated and affiliated reward systems in the computer network; and
   generate in the non-transitory machine readable medium, in accordance with the at least one interoperability rule, a first unique tag comprising a string, the first unique tag associated with a unit of the plurality of units of the interoperable reward currency, the string further comprising a coupling of elements comprising:
      1) an interoperability tag for a plurality of units of the interoperable reward currency, and further comprising at least one of:
      2) a unique identifier comprising a voucher identity tag for each unit of the plurality of units of the interoperable reward currency; and
      3) additional data comprising at least one of
         a) data comprising one of transaction data tied to at least one of (i) a transaction, comprising a behavior or an act, and (ii) a session and (iii) qualifying evidence, the qualifying evidence associated with a first consumer comprising a consumer identifier and at least one of a reward system and a participant; and
         b) a code, comprising one of an identifier and a tag and a network processor generated code; and
      4) a rule; and
      5) an instruction; and 6) at least one example element for executing at least one computer operation comprising a process, the at least one example element comprising a matching of database elements, each unit of the interoperable reward currency comprising at least one of a plurality of forms or embodiments of an association of the generated first unique tag and a corresponding object comprising a physical or a digital tag-object; and each tag-object comprising a) a composite entity comprising an article of manufacture, and further comprising b) an embodiment of value comprising a unit of exchange interoperable in the computer network, and further comprising c) a corresponding entry in at least one database record; and the first unique tag further comprising a computer methodology for enabling at least one computer operation for any purpose via the first unique tag, the computer methodology comprising:

at least one feature, associated with each unit of the plurality of units of the interoperable reward currency, comprising an enabling of, and further comprising a capability for, an executing of at least one computer operation via the first unique tag, and further comprising a matching of elements in the plurality of database records, the elements comprising the data and further comprising the at least one example element, irrespective of the at least one of a plurality of forms or embodiments of a unit of the interoperable reward currency, and further comprising a reference tag, and further comprising a module, comprising the network processor, for executing an at least one computer operation via an at least one unique tag, the at least one computer operation comprising:

one or more of retrieving and associating and assessing and analyzing the plurality of database records comprising transaction data and further comprising qualifying evidence, and further comprising rendering interoperable each of the plurality of units of the interoperable reward currency in the computer network and further comprising self-authenticating an element associated with the first unique tag, and further comprising one or more of issuing and exchanging and trading of a unit of the interoperable reward currency comprising an exchange for a reward; and couple the generated first unique tag with a first object, comprising a first tag-object and further comprising a voucher-tag-object and further comprising a unit of the interoperable reward currency; and store, in the non-transitory machine readable medium, in the first database the first unique tag comprising a representation of the unit of a plurality of units of the interoperable reward currency and further comprising the first tag-object; and wherein the unit of a plurality of units of the interoperable reward currency is enabled for executing at least one computer operation via the first unique wherein each unit of the interoperable reward currency (11) comprises a unique tag.

2. The apparatus of claim 1 further comprising one or more of 1) the currency outputting module configured for generating units of the interoperable reward currency, 2) a detecting module for detecting at least one of a tag and a tag-object and qualifying evidence, 3) a currency redemption module configured for exchanging units of the interoperable reward currency, 4) a configuration module for configuring the apparatus for interoperability, 5) an interoperability tag generating module comprising one of a random tag generator and a barrel shifter unit, 6) a voucher identity tag generating module for applying a unique voucher identity tag to each unit of the interoperable reward currency, 7) a qualifying evidence tag generating module for generating a qualifying evidence tag, 8) a transaction associating module for retrieving and associating database records via at least one of a tag and a tag-object, and 9) an enrollment module for enrolling a participant in the computer network.

3. A computer-implemented method in a computer system comprising a computer network and further comprising a computer system for performing a computer methodology comprising enabling a computer operation comprising at least one of retrieving and associating and assessing and analyzing database records corresponding to at least one unit of a plurality of units of interoperable reward currency, the method further comprising:

configuring, by the computer system, the computer system and the computer network comprising a network processor and further comprising at least one of a first database comprising a plurality of database records, and further comprising at least one of a plurality of disparate groups comprising at least one of a plurality of unaffiliated and affiliated reward systems and further comprising participants and further comprising at least one of a participant comprising at least one of a member and a reward provider having at least one of a physical location and a website, for interoperability of units of interoperable reward currency among the at least one of the plurality of unaffiliated and affiliated reward systems in the computer network; and generating, by the computer system in a non-transitory machine readable medium, in accordance with at least one interoperability rule associated with a rule module and further associated with the computer network, a first unique tag comprising a string, the first unique tag associated with a unit of a plurality of units of the interoperable reward currency, the string further comprising a coupling of elements comprising:

1) an interoperability tag for a plurality of units of the interoperable reward currency, and further comprising at least one of:

2) a unique identifier comprising a voucher identity tag for each unit of the plurality of units of the interoperable reward currency, and 3) additional data comprising at least one of a) data comprising one of transaction data tied to at least one of (i) a transaction, comprising a behavior or an act, and (ii) a session and (iii) qualifying evidence, the qualifying evidence associated with a first consumer comprising a consumer identifier and at least one of a reward system and a participant, and b) a code, comprising one of an identifier and a tag and a computer system generated code; and 4) a rule; and 5) an instruction; and 6) at least one example element for executing at least one computer operation comprising a process, the at least one example element comprising a matching of database elements, each unit of the interoperable reward currency comprising at least one of a plurality of forms or embodiments of an association of the generated first unique tag and a corresponding object comprising a physical or a digital tag-object, and each tag-object comprising a) a composite entity comprising an article of manufacture, and further comprising b) an embodiment of value comprising a unit of exchange interoperable in the computer network, and further comprising c) a corresponding entry in at least one database record, and the first unique tag further comprising a computer methodology for enabling at least one computer operation for any purpose via the first unique tag, the computer methodology comprising:

at least one feature, associated with each unit of the plurality of units of the interoperable reward currency, comprising an enabling of, and further comprising a capability for, an executing of at least one computer operation via the first unique tag, and further comprising a matching of elements in the plurality of database records, the elements comprising the data and further comprising the at least one example element, irrespective of the at least one of a plurality of forms or embodiments of a unit of the interoperable reward currency, and further comprising a reference tag, and further comprising a module, comprising the network processor, for executing an at least one computer operation via an at least one unique tag, the at least one computer operation comprising:

one or more of retrieving and associating and assessing and analyzing the plurality of database records comprising transaction data and further comprising qualifying evidence, and further comprising rendering interoperable each of the plurality of units of the interoperable reward currency in the computer network and further comprising self-authenticating an element associated with the first unique tag, and further comprising one or more of issuing and exchanging and trading of a unit of the interoperable reward currency comprising an exchange for a reward; and coupling, by the computer system, the first unique tag with a first object, comprising a first tag-object and further comprising a voucher-tag-object and further comprising a unit of the interoperable reward currency; and storing, by the computer system in the non-transitory machine readable medium, in the first database the first unique tag comprising a representation of the unit of a plurality of units of the interoperable reward currency and further comprising the first tag-object; and wherein the unit of a plurality of units of the interoperable reward currency is enabled for executing at least one computer operation via the first unique tag.

4. The method of claim 3 wherein the at least one feature further comprises an enabling of, and further comprises a capability for, by the computer system, at least one of generating, recording, detecting, validating, updating, authorizing, retrieving, identifying, encoding, aggregating, associating, processing, issuing, distributing, transmitting, communicating, copying, converting, restricting, redeeming, invalidating, securing, exchanging, screening, combining, assessing, analyzing, tracking, funding, accounting for, displaying, using comprising qualifying for, and rendering the interoperability of, at least one tag- object comprising at least one unit of the interoperable reward currency.

5. The method of claim 3 wherein the at least one of a plurality of forms or embodiments of the coupling of the first object and the first unique tag, comprising the first tag-object, further comprises at least one of:

1) a first form comprising an electronic representation in a machine, and
2) a second form comprising at least one of a physical and a digital tag-object in any form, and
3) a third form comprising an embodiment in a machine-readable non-transitory medium, and
4) a fourth form comprising a representation recorded in the first database, the first unique tag comprising a standardized form; and wherein each form or embodiment of a first unit of interoperable reward currency is functionally equivalent to each other form or embodiment, each form or embodiment representing the first unit of the interoperable reward currency, each form or embodiment comprising at least one of enabling a computer operation comprising a) conveying and b) exchanging the interoperable reward currency.

6. The method of claim 3 wherein the form or embodiment of the tag-object comprising a unit of the interoperable reward currency further comprises a form or embodiment comprising at least one of a machine, an apparatus, a database, an electronic device, a consumer interface, a memory, a string, a code, a data container, a website element or icon, a device tied to the Internet comprising a device associated with an Internet of Things, a vehicle, a token, a card, a payment device, a payment object, an account, a wearable device, an implantable device, an accessory, a printed sheet, a voucher, a reward, a reward currency, a digital currency, a credit, a discount, a coupon, a monetary voucher-tag-object, a non-monetary voucher-tag-object, a dual use object, an adaptive voucher-tag-object, an article of manufacture comprising a non-transitory machine-readable medium, a marketing tool, an electronic form, a physical form, and a combination thereof.

7. The method of claim 3 further comprising:

generating, by the computer system, a second unique tag corresponding to a second unit of the interoperable reward currency comprising a second tag-object, comprising a second transaction; and wherein the method further comprises the computer methodology via at least a common portion of at least one of the first and the second generated unique tags or tag-objects.

8. The method of claim 3 further comprising at least one of conveying, by the computer system, at least one unit of the interoperable reward currency, and further comprising conveying by one of distributing, issuing, communicating, detecting, transmitting, transferring, storing, aggregating, converting, exchanging, and redeeming, and further comprising conveying to one of the first consumer, a consumer device, a participant device, a computer network device, a website, an account, a non-transitory medium, a machine, an object, and a database.

9. The method of claim 3 further comprising detecting, by the computer system, the first unique tag for any purpose.

10. The method of claim 3 further comprising applying, by the computer system, a restriction to at least one unit of the interoperable reward currency, the restriction comprising one or more of a term or condition and further comprising one of a) an expiration date, and b) a redemption requirement, and c) one of a requirement and no requirement comprising one of a proprietary third party restriction and a prior enrollment and a use of a type of device and a personal identification of the first consumer, and d) a restriction associated with one of a reward system errand a participant and a rewards program and a consumer.

11. The method of claim 3 further comprising:
associating, by the computer system, an icon with a consumer interface comprising at least one of a module and an apparatus and a website and a display screen for enabling at least one of the transaction comprising a reward-eligible transaction; and
marking, by the computer system, at least one reward-eligible item of a plurality of reward-eligible items, comprising applying a first reward-eligibility tag to the at least one reward-eligible item; and
associating, by the computer system, the icon with the at least one reward-eligible item; and
associating, by the computer system, the icon with the first consumer identifier corresponding to the first consumer; and
activating, by the computer system, the icon, comprising transacting the reward-eligible item; and
associating, by the computer system, the reward-eligible transaction with at least one of a plurality of reward-eligible transactions; and
wherein activating the icon comprises at least one of an initiation and a consummation, by the computer system, of the at least one reward-eligible transaction for the at least one reward-eligible item, via activating the icon, comprising generating a unique tag and further comprising generating at least one corresponding tag-object comprising at least one unit of the interoperable reward currency, and further comprising enabling the computer methodology.

12. The method of claim 3 wherein the tag further comprises a computer methodology for qualifying, by the computer system, the first consumer, associated with at least one transaction of a plurality of transactions, for receiving at least one unit of the interoperable reward currency, wherein the tag comprises a qualifying evidence tag associated with the first consumer and the at least one transaction.

13. The method of claim 3 further comprising aggregating, by the computer system, units of the interoperable reward currency.

14. The method of claim 3 further comprising converting, by the computer system, a proprietary currency associated with a reward system or a marketing system, and further comprising replacing or exchanging the proprietary currency, with one or more units of the interoperable reward currency, via the first unique tag.

15. The method of claim 3 wherein the first database further comprises a plurality of database records corresponding to a fee comprising a voucher fee and a reward fee and further corresponding to at least one unit of the interoperable reward currency, the method further comprising at least one of establishing the fee amount and allocating the fee and collecting the fee and paying the fee, by the computer system, via at least a portion of the first unique tag.

16. The method of claim 3 further comprising applying, by the computer system, a security measure comprising one of an anti-fraud measure and a privacy measure and an identity protection measure, to at least one of the first unique tag and the first tag-object.

17. The method of claim 3 further comprising applying, by the computer system, a cost-control measure comprising one or more of 1) a fee limit, and 2) reward-eligibility of an item, and 3) an adjustable requirement for controlling, in a time period, at least one of (a) a quantity of the units of the interoperable reward currency distributed, and (b) a value of the units of the interoperable reward currency generated, and (c) one of a number and a percentage of consumers to receive the interoperable reward currency, and (d) a qualification requirement, and e) timing associated with a cost-control measure.

18. The method of claim 3 further comprising generating, by the computer system, a message, in response to detecting the first tag-object comprising the first unique tag, the message comprising one or more of an indication of an authorization, a qualification requirement, a list of rewards for exchanging, a list of at least one participant, an incentive, an offer, an advertisement, and information associated with an interoperable reward currency unit.

19. The method of claim 3 further comprising generating, by the computer system, an adaptive voucher-tag-object comprising an embodiment of the interoperable reward currency and further comprising a coupon that is one of adaptive to, responsive to, associated with, contingent upon, and targeted via all or a portion of the first unique tag.

20. A system associated with units of interoperable reward currency, the system comprising:
a currency system comprising a computer network comprising at least one of a plurality of disparate groups comprising at least one of a plurality of unaffiliated and affiliated reward systems and further comprising participants and further comprising at least one of a participant comprising at least one of a member and a reward provider having at least one of a physical location and a website; and
a network processor coupled to the computer network; and
a machine readable non-transitory medium, coupled to the network processor, the machine readable non-transitory medium comprising:
a first database comprising a plurality of database records, each database record corresponding to at least one unit of a plurality of units of an interoperable reward currency; and
at least one instruction, that when executed by the network processor cause the network processor to be further configured to:
configure the computer system and the computer network for interoperability of the units of the interoperable reward currency among the at least one of the plurality of unaffiliated and affiliated reward systems in the computer network; and
generate in the non-transitory machine readable medium, in accordance with at least one interoperability rule associated with a rule module associated with the computer system, a first unique tag comprising a string, the first unique tag associated with a unit of the plurality of units of the interoperable reward currency, the string further comprising a coupling of elements comprising:
1) an interoperability tag for a plurality of units of the interoperable reward currency, and further comprising at least one of:
2) a unique identifier comprising a voucher identity tag for each unit of the plurality of units of the interoperable reward currency, and
3) additional data comprising at least one of
a) data comprising one of transaction data tied to at least one of (i) a transaction, comprising a behavior or an act, and (ii) a session and (iii) qualifying evidence, the qualifying evidence associated with a first consumer comprising a consumer identifier and at least one of a reward system and a participant, and b) a code, comprising one of an identifier and a tag and a network processor generated code, and 4) a rule, and 5) an instruction, and 6) at least one example element for executing at least one computer operation comprising a process, the at least one example element comprising a matching of database elements, each unit of the interoperable reward currency comprising at least one of a plurality of forms or embodiments of an association of the generated first unique tag and a corresponding object comprising a physical or a digital tag-object, and each tag-object comprising a) a composite entity comprising an article of manufacture, and further comprising b) an embodiment of value comprising a unit of exchange interoperable in the computer network, and further comprising c) a corresponding entry in at least one database record, and the first unique tag further comprising a computer methodology for enabling at least one computer operation for any purpose via the first unique tag, the computer methodology comprising:

at least one feature, associated with each unit of the plurality of units of the interoperable reward currency, comprising an enabling of, and further comprising a capability for, an executing of at least one computer operation via the first unique tag, and further comprising a matching of elements in the plurality of database records, the elements comprising the data and further comprising the at least one example element, irrespective of the at least one of a plurality of forms or embodiments of a unit of the interoperable reward currency, and further comprising a reference tag, and further comprising a module, comprising the network processors for executing an at least one computer operation via an at least one unique tag, the at least one computer operation comprising:

one or more of retrieving and associating and assessing and analyzing the plurality of database records comprising transaction data and further comprising qualifying evidence, and further comprising rendering interoperable each of the plurality of units of the interoperable reward currency in the computer network and further comprising self-authenticating an element associated with the first unique tag, and further comprising one or more of issuing and exchanging and trading of a unit of the interoperable reward currency (11) comprising an exchange for a reward; and couple the generated first unique tag with a first object, comprising a first tag-object and further comprising a voucher-tag-object and further comprising a unit of the interoperable reward currency; and store, in the non-transitory machine readable medium, in the first database the generated first unique tag comprising a representation of the first tag-object; and wherein the unit of a plurality of units of the interoperable reward currency is enabled for executing at least one computer operation via the first unique tag.

21. The system of claim 20 wherein the at least one feature further comprises an enabling of, and further comprises a capability for, at least one of generating, recording, detecting, validating, updating, authorizing, retrieving, identifying, encoding, aggregating, associating, processing, issuing, distributing, transmitting, communicating, copying, converting, restricting, redeeming, invalidating, securing, exchanging, screening, combining, assessing, analyzing, tracking, funding, accounting for, displaying, using comprising qualifying for, and rendering the interoperability of, at least one tag-object comprising at least one unit of the interoperable reward currency.

22. The system of claim 20 wherein the at least one of a plurality of forms or embodiments of the coupling of the first object and the first unique tag, comprising the first tag-object, further comprises at least one of:

1) a first form comprising an electronic representation in a machine, and 2) a second form comprising at least one of a physical and a digital tag-object in any form, and 3) a third form comprising an embodiment in a machine-readable non-transitory medium, and 4) a fourth form comprising a representation recorded in the first database, the first unique tag comprising a standardized form; and wherein each form or embodiment of a first unit of interoperable reward currency is functionally equivalent to each other form or embodiment, each form or embodiment representing the first unit of the interoperable reward currency, each form or embodiment comprising the computer methodology comprising enabling a computer operation comprising a) conveying and b) exchanging the interoperable reward currency.

23. The system of claim 20 wherein the form or embodiment of the tag-object comprising a unit of the interoperable reward currency further comprises a form or embodiment comprising at least one of a machine, an apparatus, a database, an electronic device, a consumer interface, a memory, a string, a code, a data container, a website element or icon, a device tied to the Internet comprising a device associated with an Internet of Things, a vehicle, a token, a card, a payment device, a payment object, an account, a wearable device, an implantable device, an accessory, a printed sheet, a voucher, a reward, a reward currency, a digital currency, a credit, a discount, a coupon, a monetary voucher-tag-object, a non-monetary voucher-tag-object, a dual use object, an adaptive voucher-tag-object, an article of manufacture comprising a non-transitory machine-readable medium, a marketing tool, an electronic form, a physical form, and a combination thereof.

24. The system of claim 20 wherein the at least one instruction further causes the network processor to be configured for:

generating a second unique tag corresponding to a second unit of the interoperable reward currency comprising a second tag-object, comprising a second transaction; and wherein the system further comprises the computer methodology via at least a common portion of at least one of the first and the second generated unique tags.

25. The system of claim 20 wherein the at least one instruction further causes the network processor be configured for conveying at least one unit of the interoperable reward currency, and further comprising conveying by one of distributing, issuing, communicating, detecting, transmitting, transferring, storing, aggregating, converting, exchanging, and redeeming, and further comprising conveying to one of the first consumer, a consumer device, a participant device, a computer network device, a website, an account, a non-transitory medium, a machine, an object, and a database.

26. The system of claim 20 wherein the at least one instruction further causes the network processor to be configured for detecting the first unique tag for any purpose.

27. The system of claim 20 wherein the at least one instruction further causes the network processor to be configured for applying a restriction to at least one unit of the interoperable reward currency, the restriction comprising one or more of a term or condition and further comprising one of a) an expiration date, and b) a redemption requirement, and c) one of a requirement and no requirement comprising one of a proprietary third party restriction and a prior enrollment and a use of a type of device and a personal identification of the first consumer, and d) a restriction associated with one of a reward system and a participant and a rewards program and a consumer.

28. The system of claim 20 wherein the at least one instruction further causes the network processor to be configured for:
  associating an icon with a consumer interface comprising at least one of a module and an apparatus and a website and a display screen for enabling at least one of the transaction comprising a reward-eligible transaction; and
  marking at least one reward-eligible item of a plurality of reward-eligible items, comprising applying a first reward-eligibility tag to the at least one reward-eligible item; and
  associating the icon with the at least one reward-eligible item; and
  associating the icon with the first consumer identifier corresponding to the first consumer; and
  activating the icon, comprising transacting the item; and
  associating the reward-eligible transaction with at least one of a plurality of reward-eligible transactions; and
  wherein activating the icon comprises at least one of an initiation and a consummation of the at least one reward-eligible transaction for the at least one reward-eligible item, via activating the icon, comprising generating a unique tag and further comprising generating at least one corresponding tag-object comprising at least one unit of the interoperable reward currency, and further comprising enabling the computer methodology.

29. The system of claim 20 wherein the tag comprises the computer methodology for qualifying the first consumer, associated with at least one transaction of a plurality of transactions, for receiving at least one unit of the interoperable reward currency, wherein the tag comprises a qualifying evidence tag associated with the first consumer and the at least one transaction.

30. The system of claim 20 wherein at least one instruction further causes the network processor to be configured for aggregating, by the first consumer, units of the interoperable reward currency.

31. The system of claim 20 wherein at least one instruction further causes the network processor to be configured for converting a proprietary currency associated with a reward system or a marketing system, and further comprising replacing or exchanging the proprietary currency with one or more units of the interoperable reward currency, via the first unique tag.

32. The system of claim 20 wherein the first database further comprises a plurality of database records corresponding to a fee comprising a voucher fee and a reward fee and further corresponding to at least one unit of the interoperable reward currency, wherein the at least one instruction when executed by the network processor causes the network processor to be configured for at least one of establishing the fee amount and allocating and collecting and paying the fee, via at least a portion of the first unique tag.

33. The system of claim 20 wherein the at least one instruction further causes the network processor to be configured for applying a security measure, comprising one of an anti-fraud measure and a privacy measure and an identity protection measure, to at least one of the first unique tag and the first tag-object.

34. The system of claim 20 wherein the at least one instruction further causes the network processor to be configured for applying a cost-control measure comprising one or more of 1) a fee limit, and 2) reward-eligibility of an item, and 3) an adjustable requirement for controlling, in a time period, at least one of (a) a quantity of the units of the interoperable reward currency distributed, and (b) a value of the units of the interoperable reward currency generated, and (c) one of a number and a percentage of consumers to receive the interoperable reward currency, and (d) a qualification requirement, and e) timing associated with a cost-control measure.

35. The system of claim 20 wherein the at least one instruction further causes the network processor to be configured for generating a message, in response to detecting the first tag-object comprising the first unique tag, the message comprising one or more of an indication of an authorization, a qualification requirement, a list of rewards for exchanging, a list of at least one participant, an incentive, an offer, an advertisement, and information associated with an interoperable reward currency unit.

36. The system of claim 20 wherein the at least one instruction further causes the network processor to be configured for generating an adaptive tag-object comprising an embodiment of the interoperable reward currency and further comprising a coupon that is one of adaptive to, responsive to, associated with, contingent upon, and targeted via all or a portion of the first unique tag.

37. A non-transitory machine readable medium containing program instructions for performing a computer methodology comprising enabling a computer operation comprising at least one of retrieving and associating and assessing and analyzing database records, each database record corresponding to a unit of a plurality of units of an interoperable reward currency, wherein execution of the program instructions by one or more network processors of a currency system comprising a computer network and further comprising a computer system causes the one or more network processors to carry out the steps of:
  configuring the non-transitory machine readable medium and the computer network, comprising at least one of a first database comprising a plurality of database records, the currency system comprising at least one of a plurality of disparate groups comprising at least one of a plurality of unaffiliated and affiliated reward systems and further comprising participants and further comprising at least one of a participant comprising at least one of a member and a reward provider having at least one of a physical location and a website, for interoperability of units of an interoperable reward currency among the at least one of the plurality of unaffiliated and affiliated reward systems in the computer network; and
  generating in the non-transitory machine readable medium, in accordance with at least one interoperability rule associated with a rule module associated with the computer network, a first unique tag comprising a string, the first unique tag associated with a unit of a plurality of units of the interoperable reward currency, the string further comprising a coupling of elements comprising:
1) an interoperability tag for a plurality of units of the interoperable reward currency, and further comprising at least one of:
2) a unique identifier comprising a voucher identity tag for each unit of the plurality of units of the interoperable reward currency, and
3) additional data comprising at least one of
   a) data comprising one of transaction data tied to at least one of (i) a transaction, comprising a behavior or an act, and (ii) a session and (iii) qualifying evidence, the qualifying evidence associated with a first consumer comprising a consumer identifier and at least one of a reward system and a participant, and
   b) a code, comprising one of an identifier and a tag and a network processor generated code, and
4) a rule, and
5) an instruction, and
6) at least one example element for executing at least one computer operation comprising a process, the at least one example element comprising a matching of database elements,
each unit of the interoperable reward currency comprising at least one of a plurality of forms or embodiments of an association of the generated first unique tag and a corresponding object comprising a physical or a digital tag-object, and
each tag-object comprising a) a composite entity comprising an article of manufacture, and further comprising b) an embodiment of value comprising a unit of exchange interoperable in the computer network, and further comprising c) a corresponding entry in at least one database record, and
the first unique tag further comprising a computer methodology for enabling at least one computer operation for any purpose via the first unique tag, the computer methodology comprising:
   at least one feature, associated with each unit of the plurality of units of the interoperable reward currency, comprising an enabling of, and further comprising a capability for, an executing of at least one computer operation via the first unique tag, and further comprising
   a matching of elements in the plurality of database records, the elements comprising the data and further comprising the at least one example element, irrespective of the at least one of a plurality of forms or embodiments of a unit of the interoperable reward currency, and further comprising
   a reference tag, and further comprising
   a module, comprising the network processor, for executing an at least one computer operation via an at least one unique tag,
   the at least one computer operation comprising:
      one or more of retrieving and associating and assessing and analyzing the plurality of database records comprising transaction data and further comprising qualifying evidence, and further comprising
      rendering interoperable each of the plurality of units of the interoperable reward currency in the computer network and further comprising
      self-authenticating an element associated with the first unique tag, and further comprising
      one or more of issuing and exchanging and trading of a unit of the interoperable reward currency comprising an exchange for a reward; and
   coupling the first unique tag with a first object, comprising a first tag-object and further comprising a voucher-tag-object and further comprising a unit of the interoperable reward currency; and
   storing, in the non-transitory machine readable medium, in the first database record in the first database the first unique tag comprising a representation of the unit of a plurality of units of the interoperable reward currency and further comprising the first tag-object; and
   wherein the unit of a plurality of units of the interoperable reward currency is enabled for executing at least one computer operation via the first unique tag.

38. The non-transitory machine readable medium of claim 37 wherein the at least one of a plurality of forms or embodiments of the coupling of the first object and the first unique tag, comprising the first tag-object, further comprises at least one of:
1) a first form comprising an electronic representation in a machine, and
2) a second form comprising at least one of a physical and a digital tag-object in any form, and
3) a third form comprising an embodiment in a machine readable non-transitory medium, and
4) a fourth form comprising a representation recorded in the first database, the first unique tag comprising a standardized form; and
wherein each form or embodiment of a first unit of interoperable reward currency is functionally equivalent to each other form or embodiment, each form or embodiment representing the first unit of the interoperable reward currency, each form or embodiment comprising the computer methodology comprising enabling a computer operation comprising a) conveying and b) exchanging the interoperable reward currency.

* * * * *

UNITED STATES PATENT AND TRADEMARK OFFICE
CERTIFICATE OF CORRECTION

PATENT NO.          : 10,157,400 B1
APPLICATION NO.     : 14/633012
DATED               : December 18, 2018
INVENTOR(S)         : Randolph Georgi Page 1 of 2

It is certified that error appears in the above-identified patent and that said Letters Patent is hereby corrected as shown below:

In the Claims

Claim 1, Line 37 (Column 64 Line 40):
Change "of interoperable" to --of an interoperable--

Claim 1, Line 45 (Column 64 Line 48):
Change "of elements comprising" to --of elements, the elements comprising--

Claim 1, Line 52 (Column 64 Line 56):
Change "one of" to --one of:--

Claim 1, Line 61 (Column 64 Line 65):
Change "processor generated" to --processor-generated--

Claim 1, Line 123 (Column 65 Line 60):
Change "first unique wherein each" to --first unique tag--

Claim 1, Line 124 (Column 65 Line 61):
Delete "unit of the interoperable reward currency (11) com-"

Claim 1, Line 125 (Column 65 Line 62):
Delete "prises a unique tag."

Claim 3, Line 7 (Column 66 Line 20):
Change "of interoperable" to --of an interoperable--

Claim 3, Line 30 (Column 66 Line 43):
Change "of elements comprising" to --of elements, the elements comprising--

Signed and Sealed this
Ninth Day of April, 2019

Andrei Iancu
*Director of the United States Patent and Trademark Office*

CERTIFICATE OF CORRECTION (continued)
U.S. Pat. No. 10,157,400 B1

Claim 3, Line 37 (Column 66 Line 50):
Change "one of" to --one of:--

Claim 3, Line 46 (Column 66 Line 59):
Change "system generated" to --system-generated--

Claim 5, Line 12 (Column 68 Lines 11-12):
Change "the first database, the first unique tag comprising a" to
--the first database,
the first unique tag comprising a--

Claim 10, Line 10 (Column 69 Line 2):
Change "reward system errand a participant" to --reward system and a participant--

Claim 20, Line 1 (Column 70 Line 21):
Change "of interoperable" to --of an interoperable--

Claim 20, Line 21 (Column 70 Line 42):
Change "cause" to --causes--

Claim 20, Line 34 (Column 70 Lines 55-56):
Change "of elements" to --of elements, the elements--

Claim 22, Line 12 (Column 72 Lines 22-23):
Change "the first database, the first unique tag comprising a" to
--the first database,
the first unique tag comprising a--

Claim 37, Line 32 (Column 75 Lines 5-6):
Change "of elements" to --of elements, the elements--

Claim 37, Line 40 (Column 75 Line 13):
Change "one of" to --one of:--

Claim 37, Line 49 (Column 75 Line 22):
Change "processor generated" to --processor-generated--

Claim 38, Line 13 (Column 76 Lines 44-45):
Change "the first database, the first unique tag comprising a" to
--the first database,
the first unique tag comprising a--